(12) United States Patent
Dai et al.

(10) Patent No.: US 12,804,276 B2
(45) Date of Patent: Nov. 17, 2026

US012804276B2

(54) HYBRID IMAGE SENSORS WITH VIDEO FRAME INTERPOLATION

(71) Applicant: OMNIVISION TECHNOLOGIES, INC., Santa Clara, CA (US)

(72) Inventors: Tiejun Dai, Santa Clara, CA (US); Bo Mu, San Jose, CA (US); Menghan Guo, Shanghai (CN); Wenlei Yang, Shanghai (CN); Qinyi Wang, West Coast Vale (SG); Andreas Suess, San Jose, CA (US); Luis Eduardo Garcia Capel, Jurong East (SG)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/938,080

(22) Filed: Nov. 5, 2024

(65) Prior Publication Data

US 2025/0159376 A1 May 15, 2025

Related U.S. Application Data

(60) Provisional application No. 63/597,638, filed on Nov. 9, 2023.

(51) Int. Cl.
*H04N 25/47* (2023.01)
*H04N 23/45* (2023.01)
(Continued)

(52) U.S. Cl.
CPC ......... *H04N 25/47* (2023.01); *H04N 23/6811* (2023.01); *H04N 23/683* (2023.01);
(Continued)

(58) Field of Classification Search
CPC ............... H04N 25/47; H04N 23/6811; H04N 23/683; H04N 23/81; H04N 23/843;
(Continued)

(56) References Cited

U.S. PATENT DOCUMENTS

| | | | | |
|---|---|---|---|---|
| 11,288,818 | B2 * | 3/2022 | Daniilidis | G06N 3/088 |
| 11,785,200 | B1 | 10/2023 | Smits et al. | |

(Continued)

OTHER PUBLICATIONS

Pan, et al., "Bringing a Blurry Frame Alive at High Frame-Rate with an Event Camera", retrieved from: https://openaccess.thecvf.com/content_CVPR_2019/papers/Pan_Bringing_a_Blurry_Frame_Alive_at_High_Frame-Rate_With_an_CVPR_2019_paper.pdf, 2019, 6820-6829.

(Continued)

*Primary Examiner* — Chiawei Chen
(74) *Attorney, Agent, or Firm* — Dorsey & Whitney LLP

(57) ABSTRACT

Hybrid image sensors with video frame interpolation (and associated systems, devices, and methods) are disclosed herein. In one embodiment, an imaging system comprises one or more event vision sensor (EVS) pixels, and a plurality of CMOS image sensor (CIS) pixels. Each EVS pixel can be configured to capture event data corresponding to contrast information of light incident on the EVS pixel. Each CIS pixel can be configured to capture CIS data corresponding to intensity of light incident on the CIS pixel. The imaging system can further comprise a deblur circuit configured to deblur the CIS data captured by the plurality of CIS pixels using a first portion of the event data captured by the one or more EVS pixels, and a system processor configured to interpolate a video frame using the deblurred CIS data and all or a subset of the event data.

27 Claims, 23 Drawing Sheets

(51) Int. Cl.

| | |
|---|---|
| ***H04N 23/68*** | (2023.01) |
| ***H04N 23/81*** | (2023.01) |
| ***H04N 23/84*** | (2023.01) |
| ***H04N 25/42*** | (2023.01) |
| ***H04N 25/46*** | (2023.01) |
| ***H04N 25/53*** | (2023.01) |
| ***H04N 25/531*** | (2023.01) |
| ***H04N 25/616*** | (2023.01) |
| ***H04N 25/62*** | (2023.01) |
| ***H04N 25/707*** | (2023.01) |
| ***H04N 25/76*** | (2023.01) |
| ***H04N 25/766*** | (2023.01) |
| ***H04N 25/767*** | (2023.01) |
| ***H04N 25/78*** | (2023.01) |
| ***H04N 25/79*** | (2023.01) |

(52) U.S. Cl.

CPC ........... *H04N 23/81* (2023.01); *H04N 23/843* (2023.01); *H04N 25/42* (2023.01); *H04N 25/46* (2023.01); *H04N 25/53* (2023.01); *H04N 25/616* (2023.01); *H04N 25/62* (2023.01); *H04N 25/707* (2023.01); *H04N 25/76* (2023.01); *H04N 25/766* (2023.01); *H04N 25/767* (2023.01); *H04N 25/78* (2023.01); *H04N 25/79* (2023.01); *H04N 23/45* (2023.01); *H04N 25/531* (2023.01)

(58) Field of Classification Search

CPC ........ H04N 25/42; H04N 25/46; H04N 25/53; H04N 25/616; H04N 25/62; H04N 25/707; H04N 25/76; H04N 25/766; H04N 25/767; H04N 25/78; H04N 25/79; H04N 23/45; H04N 25/531

See application file for complete search history.

(56) References Cited

U.S. PATENT DOCUMENTS

| | | | | |
|---|---|---|---|---|
| 2013/0058587 | A1* | 3/2013 | Wang | G06T 5/73 382/255 |
| 2015/0146037 | A1 | 5/2015 | Keelan | |
| 2017/0187961 | A1 | 6/2017 | Katz et al. | |
| 2018/0189937 | A1* | 7/2018 | Bala | G06T 5/50 |
| 2020/0389582 | A1* | 12/2020 | Herman | H04N 23/745 |
| 2021/0174092 | A1 | 6/2021 | Zhao et al. | |
| 2021/0344867 | A1 | 11/2021 | Gao et al. | |
| 2022/0284593 | A1 | 9/2022 | Naganuma et al. | |
| 2022/0329771 | A1* | 10/2022 | Perrone | G06T 7/30 |
| 2023/0030562 | A1 | 2/2023 | Seo et al. | |
| 2023/0042364 | A1 | 2/2023 | Ye et al. | |
| 2023/0230212 | A1 | 7/2023 | García Capel et al. | |
| 2023/0254579 | A1* | 8/2023 | Perrone | G06T 5/73 348/208.6 |
| 2024/0169492 | A1* | 5/2024 | Ollila | G06F 3/013 |
| 2024/0236517 | A1* | 7/2024 | Kim | H04N 25/47 |
| 2025/0159367 | A1 | 5/2025 | Dai et al. | |
| 2025/0159370 | A1 | 5/2025 | Dai et al. | |
| 2025/0159371 | A1 | 5/2025 | Dai et al. | |
| 2025/0159375 | A1 | 5/2025 | Dai et al. | |
| 2025/0240538 | A1* | 7/2025 | Liu | G06V 10/803 |
| 2025/0373939 | A1 | 12/2025 | Miyatani et al. | |
| 2025/0386115 | A1* | 12/2025 | Kim | H04N 25/47 |

OTHER PUBLICATIONS

Non-Final office action received in U.S. Appl. No. 18/938,125 dated Feb. 27, 2026, pp all.

Notice of Allowance received in U.S. Appl. No. 18/937,933 dated Mar. 17, 2026, pp all.

Non-Final Office Action received in U.S. Appl. No. 18/938,184 dated Feb. 24, 2026, pp all.

U.S. Non-Final Office Action received in U.S. Appl. No. 18/938,208 dated May 8, 2026, pp all.

* cited by examiner

HYBRID IMAGE SENSORS WITH VIDEO FRAME INTERPOLATION

CROSS-REFERENCE TO RELATED APPLICATION(S)

The present application claims the benefit of U.S. Provisional Patent Application No. 63/597,638, filed Nov. 9, 2023, which is incorporated by reference herein in its entirety.

This application contains subject matter related to cofiled, copending, and coassigned U.S. patent application Ser. No. 18/938,208, filed Nov. 5, 2024, and titled "HYBRID IMAGE SENSORS WITH ON-CHIP IMAGE DEBLUR," which is incorporated herein by reference in its entirety.

This application contains subject matter related to cofiled, copending, and coassigned U.S. patent application Ser. No. 18/938,184, filed Nov. 5, 2024, and titled "HYBRID IMAGE SENSORS WITH ON-CHIP IMAGE DEBLUR AND ROLLING SHUTTER DISTORTION CORRECTION," which is incorporated herein by reference in its entirety.

This application contains subject matter related to cofiled, copending, and coassigned U.S. patent application Ser. No. 18/938,125, filed Nov. 5, 2024, and titled "METHODS FOR OPERATING HYBRID IMAGE SENSORS HAVING DIFFERENT CIS-TO-EVS RESOLUTIONS," which is incorporated herein by reference in its entirety.

This application contains subject matter related to cofiled, copending, and coassigned U.S. patent application Ser. No. 18/937,933, filed Nov. 5, 2024, and titled "HYBRID IMAGE SENSORS WITH ADJUSTABLE CONTRAST THRESHOLDS," which is incorporated herein by reference in its entirety.

TECHNICAL FIELD

This disclosure relates generally to image sensors. For example, several embodiments of the present technology relate to hybrid image sensors with video frame interpolation. As a specific example, several embodiments of the present technology relate to hybrid image sensors that utilize event-based vision sensor (EVS) data to (a) interpolate video/image frames using complementary metal oxide semiconductor (CMOS) image sensor (CIS) data and/or (b) deblur and/or correct for rolling-shutter distortion in the CIS data.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference numbers are used to refer to like or similar components throughout unless otherwise specified.

Figure 1:
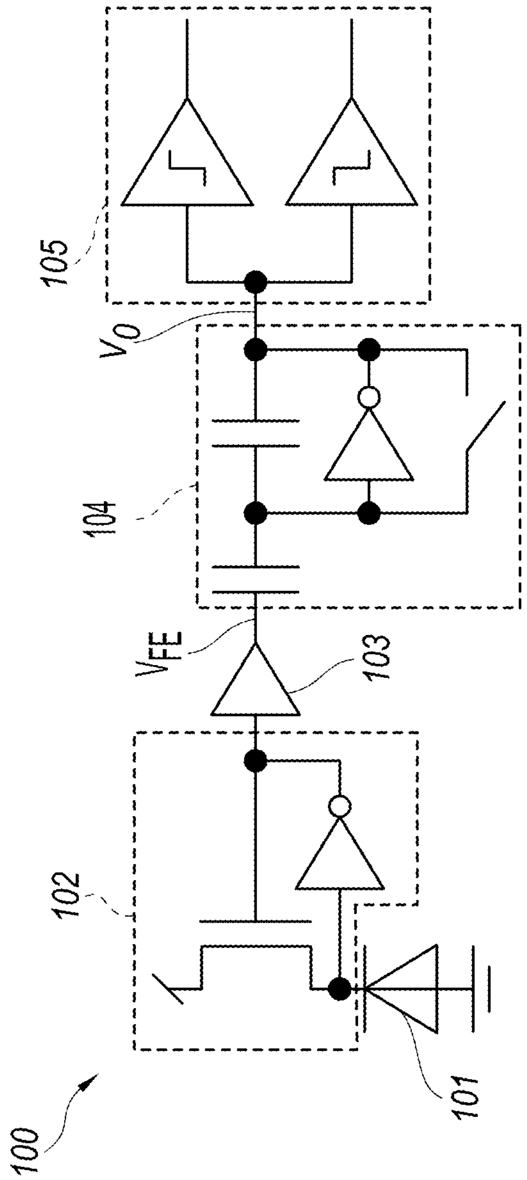
FIG. 1 is a partially schematic diagram of an EVS pixel configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures, or described in detail below, to avoid unnecessarily obscuring the description of various aspects of the present technology.

DETAILED DESCRIPTION

The present disclosure relates generally to imaging systems with video frame interpolation. For example, several embodiments disclosed herein relate to imaging systems that utilize event-based vision sensor (EVS) data to interpolate video/image frames using complementary metal oxide semiconductor (CMOS) image sensor (CIS) data. In some embodiments, the imaging systems also utilize EVS data to deblur the CIS data using accumulated event data to generate deblurred image/video data that is corrected for rolling-shutter distortion. The imaging systems can include EVS sensors and separate active (CIS) sensors. In other embodiments, the imaging systems include hybrid image sensors that include both EVS sensing and active sensing components. In at least some of these embodiments, deblurring the CIS data and/or correcting the CIS data for rolling-shutter distortion using the EVS data can be performed at least partially on-chip and then output to a downstream processor (e.g., an application processor) of the imaging system.

In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

An active pixel sensor employs an array of pixels that are used to capture intensity images/video of an external scene. More specifically, the pixels are used to obtain CIS information (e.g., intensity information) corresponding to light from the external scene that is incident on the pixels. CIS information obtained during an integration period is read out at the end of the integration period and used to generate a corresponding intensity image of the external scene.

The pixels of an active pixel sensor typically have an integration time that is globally defined. Thus, pixels in an array of an active pixel sensor typically have an identical integration time, and each pixel in the array is typically converted into a digital signal regardless of its content (e.g., regardless of whether there has been a change in an external scene that was captured by a pixel since the last time the pixel was read out). As such, a relatively large amount of memory and power can be required to operate an active pixel sensor at high frame rates. Thus, due in part to memory and power constraints, it is difficult to use an active pixel sensor on its own to obtain intensity images/video of an external scene at ultra-high frame rates.

Moreover, when motion or other changes occur in an external scene during an integration period, motion artifacts can be observed as blurring in the resulting intensity image of the external scene. Blurring can be especially prominent in low light conditions in which longer exposure times are used. As such, active pixel image sensors on their own are not great at obtaining sharp intensity images/video of highly dynamic scenes.

In comparison, event vision sensors (e.g., event driven sensors or dynamic vision sensors) employ EVS pixels that are usable to obtain non-CIS information (e.g., contrast information, intensity changes, event data) corresponding to light from an external scene that is incident on those EVS pixels. Event vision sensors read out an EVS pixel and/or convert a corresponding pixel signal into a digital signal only when the EVS pixel detects a change (e.g., an event) in the external scene. In other words, EVS pixels of an event vision sensor that do not detect a change in the external scene are not read out and/or pixel signals corresponding to such EVS pixels are not converted into digital signals (thereby saving power). Thus, each EVS pixel of an event vision sensor can be independent from other EVS pixels of the event vision sensor, and only EVS pixels that detect a change in the external scene need be read out and/or have their corresponding pixel signals converted into digital signals. As a result, unlike active pixel sensors with synchronous integration times, event vision sensors do not suffer from limited dynamic ranges and are able to accurately capture high-speed motion. Thus, event visions sensors are often more robust than active pixel sensors in low lighting conditions and/or in highly dynamic scenes because they are not affected by under/over exposure or motion blur associated with a synchronous shutter. Stated another way, event vision sensors can be used to provide ultra-high frame rates and to accurately capture high-speed motions.

Hybrid image sensors employ an array of pixels that includes a combination of (i) active (CIS) pixels usable to obtain CIS information corresponding to light from an external scene and (ii) EVS pixels usable to obtain non-CIS information corresponding to light from the external scene. Such hybrid image sensors are therefore able to simultaneously capture (a) intensity images/video of an external scene and (b) events occurring within the external scene. Event data captured by the EVS pixels can be used to resolve/mitigate (i) the low frame-rate intensity image problem discussed above and (ii) the blurry effect inherent in intensity images captured using CIS pixels in the presence of motion. For example, using an event-based double integral (EDI) model, high frame-rate intensity images/video of an external scene can be reconstructed from a single (e.g., blurry) intensity image and its event sequence.

A description of the EDI model is provided here for the sake of clarity and understanding. Instantaneous intensity (or irradiance/flux) at a pixel (x, y) at any time t, related to the rate of photon arrival at that pixel (x, y), is known as a latent image $L_{xy}(t)$. The latent image $L_{xy}(t)$ is not directly output from a hybrid image sensor corresponding to the pixel (x, y). Instead, the hybrid image sensor outputs (i) an intensity image (e.g., a blurry image) that represents a combination of multiple latent images (including the latent image $L_{xy}(t)$) captured by one or more CIS pixels over an exposure period, and (ii) a sequence of events captured during the exposure period that record changes in intensity between the latent images. A description of how events can be detected is provided below, followed by a description of how detected events may be used to obtain the latent image $L_{xy}(t)$ for a pixel. Because each pixel of an image sensor can be treated separately, the subscripts x, y are omitted from the equations and variables that follow for readability. One should appreciate, however, that the latent image $L_{xy}(t)$ for a pixel of a pixel array at a given time represents a portion of a latent image $L_F(t)$ for the full pixel array at that given time. Thus, the latent image $L_F(t)$ for the full pixel array at the given time can be obtained by determining the latent image $L_{xy}(t)$ of every pixel in the array at that given time.

FIG. 1 is a partially schematic diagram of an EVS pixel 100 configured in accordance with various embodiments of the present technology. The EVS pixel 100 is also referred to herein as an "event sensing front-end circuit." As shown, the EVS pixel 100 includes a photosensor 101, a logarithmic amplifier 102, a buffer 103, a difference detector 104, and up/down comparators 105.

The photosensor 101 is configured to photogenerate image charge (photocurrent) in response to incident light. Photocurrent photogenerated by the photosensor 101 at time t is directly proportional to the latent image L(t) (e.g., irradiance of the incident light) at time t, as indicated by Equation 1 below:

$$I_{photo}(t) \propto L(t) \qquad \text{Equation 1}$$

As discussed above, the latent image L(t) denotes the instantaneous intensity at the EVS pixel 100 at time t, related to the rate of photon arrival at the EVS pixel 100.

Photocurrent photogenerated by the photosensor 101 is fed into the logarithmic amplifier 102. In turn, the logarithmic amplifier 102 transduces (a) the photocurrent that is linearly proportional to the latent image L(t) into (b) a voltage $V_{FE}$ that is logarithmically dependent on the latent image L(t), as indicated by Equation 2 below:

$$V_{FE} \propto \ln[I_{photo}(t)]) \propto \ln[L(t)] \qquad \text{Equation 2}$$

Temporal contrast (also referred to herein as "linear contrast") is defined as a change in light contrast on the EVS pixel 100 (e.g., on the photosensor 101) relative to a reference time $t_0$, and is provided by Equation 3 below:

$$C_{lin} = \frac{L(t) - L(t_0)}{L(t_0)} = \frac{L(t)}{L(t_0)} - 1 \qquad \text{Equation 3}$$

The difference detector 104 of the EVS pixel 100 is used to monitor temporal contrast of light incident on the photosensor 101. More specifically, when reset, the difference detector 104 samples the voltage $V_{FE}$ at a reference time $t_0$ and thereafter generates an output $V_O$ shown by Equation 4 below:

$$V_o = \alpha + \beta \cdot \ln\left(\frac{I_{photo}(t)}{I_{photo}(t_0)}\right) \qquad \text{Equation 4}$$

The output $V_O$ of the difference detector 104 tracks a change of the voltage $V_{FE}$ over time relative to the voltage $V_{FE}$ at the reference time $t_0$. As shown by Equation 5 below, as the voltage $V_{FE}$ changes over time, the corresponding change in the output $V_O$ of the difference detector 104 is proportional to the log of the temporal contrast:

$$\Delta V_o = \beta \cdot \ln\left(\frac{L(t)}{L(t_0)}\right) = \beta \cdot \ln(I + C_{lin}) = \beta \cdot C_{log} \quad \text{Equation 5}$$

The output $V_O$ of the difference detector 104 is fed into the up/down comparators 105. In turn, the up/down comparators 105 compare the output $V_O$ to corresponding threshold voltages $V_{+TH}$ and $V_{-TH}$ that are given by Equation 6 below in which $C_{log\text{-}TH}$ is a contrast threshold parameter determining whether an event should be recorded. As shown by Equation 7 below, the up comparator detects an event when the output $V_O$ of the difference detector 104 exceeds the threshold voltage $V_{+TH}$. As shown by Equation 8 below, the down comparator detects an event when the output $\Delta V_O$ of the difference detector 104 is less than the threshold voltage $V_{-TH}$.

$$V_{\pm TH} = \pm\beta \cdot C_{log-TH} \quad \text{Equation 6}$$

$$\Delta V_o \geq V_{+TH} \Rightarrow \text{event} \Rightarrow \ln\left(\frac{L(t)}{L(t_0)}\right) \geq C_{log-TH} \quad \text{Equation 7}$$

$$\Delta V_o \leq V_{-TH} \Rightarrow \text{event} \Rightarrow \ln\left(\frac{L(t)}{L(t_0)}\right) \leq C_{log-TH} \quad \text{Equation 8}$$

Using the log ratio rule, Equations 7 and 8 provide Equations 9 and 10, respectively, that specify when an event is detected by the EVS pixel 100:

$$\ln[L(t_i)] \geq \ln[L(t_{i-1})] + C_{log-TH} \quad \text{Equation 9}$$

$$\ln[L(t_i)] \leq \ln[L(t_{i-1})] - C_{log-TH} \quad \text{Equation 10}$$

Time $t_i$ in the above equations corresponds to each time an event is detected, and time $t_{i-1}$ denotes the timestamp of the previous event. When an event is triggered in an EVS pixel, $L(t_{i-1})$ is updated to a new intensity level (e.g., by resetting the difference detector 104 such that the difference detector 104 newly samples the voltage $V_{FE}$). Detection of an event at time $t_i$ therefore indicates that a change in log intensity exceeding the contrast threshold parameter $C_{log\text{-}TH}$ has occurred relative to the previous event detected at time $t_{i-1}$. In other words, each detected event indicates intensity changes between latent images (a current latent image $L(t_i)$ and a previous latent image $L(t_{i-1})$). Therefore, Equations 9 and 10 above provide Equation 11 below in which c is equivalent to $C_{log\text{-}TH}$ and $p_i$ is event polarity:

$$\ln[L(t_i)] = \ln[L(t_{i-1})] + c \cdot p_i \quad \text{Equation 11}$$

Event polarity $p_i$ at each time $t_i$ is given by Equation 12 below. A polarity $p_i$ of +1 denotes an increase in irradiance of light incident on the photosensor 101, and a polarity $p_i$ of −1 denotes a decrease in irradiance of light incident on the photosensor 101.

$$p_i = \begin{Bmatrix} +1 \text{ if } \ln\left(\frac{L(t_i)}{L(t_i-1)}\right) \geq C_{log-TH} \\ -1 \text{ if } \ln\left(\frac{L(t_i)}{L(t_i-1)}\right) \leq C_{log-TH} \end{Bmatrix} \quad \text{Equation 12}$$

Figure 2:
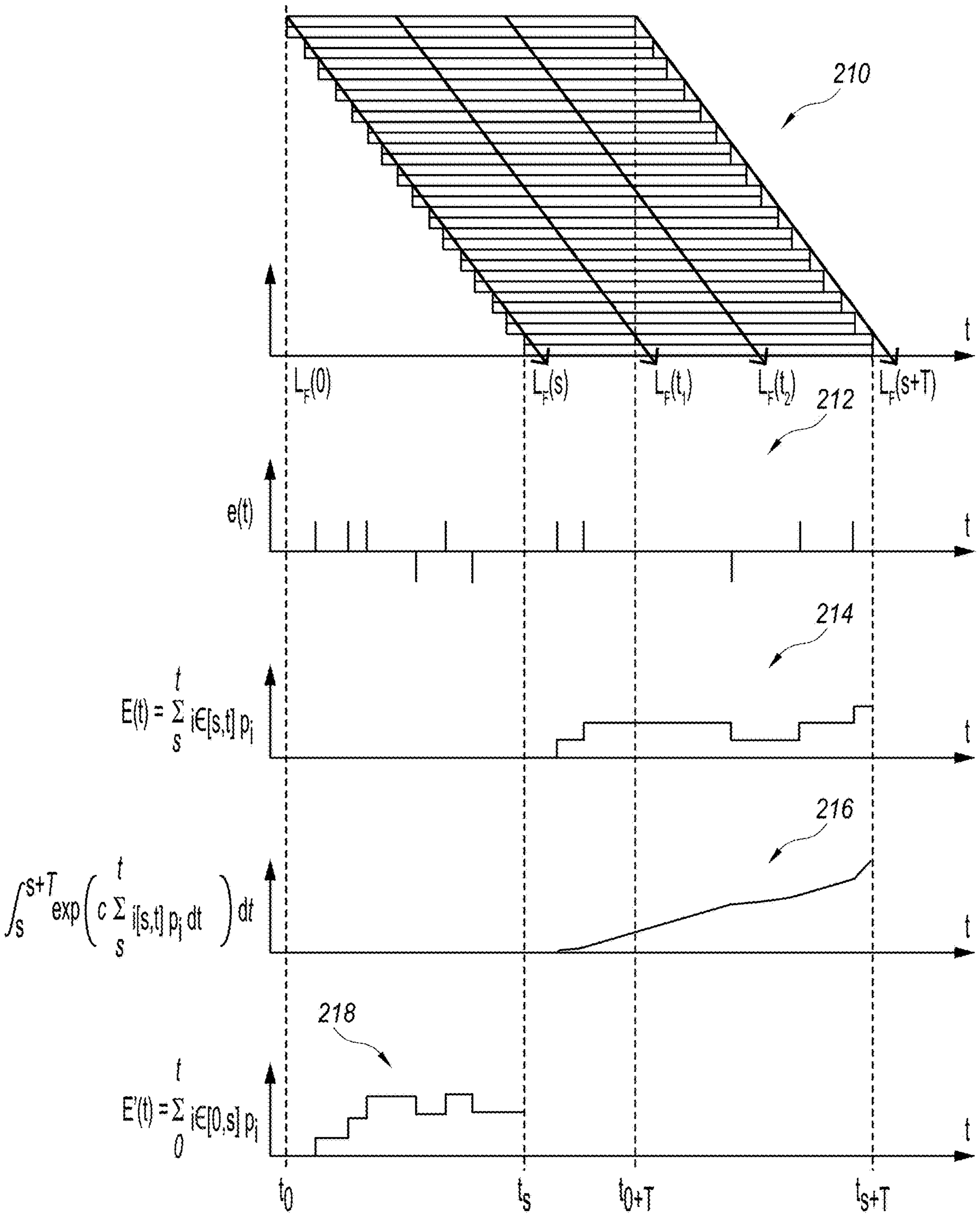
FIG. 2 are plots illustrating (a) an exposure period, (b) a sequence of event pulses formed into a time continuous signal, (c) sums of the event pulses of the sequence over time, and (d) the integral of the sum of the event pulses of the sequence over time.

Events detected at each time $t_i$ can be modeled using a unit impulse (Dirac function 8) multiplied by a corresponding polarity $p_i$. Detected events can be defined as a function of continuous time. For example, FIG. 2 illustrates various plots 210, 212, 214, 216, and 218. Plot 210 illustrates exposure periods for rows of CIS pixels in a pixel array, for one image frame. A rolling shutter is used such that exposure periods and readouts for the rows of pixels in the pixel array are staggered. The exposure period for a top two rows of the CIS pixel array extends between time $t_0$ and time $t_{0+T}$, and the exposure period for a bottom two rows of the CIS pixel array extends between time $t_s$ and $t_{s+T}$. Plot 212 illustrates a sequence of events detected by an EVS pixel that corresponds to the bottom two rows of the CIS pixel array. More specifically, the sequence of events detected between time $t_0$ and time $t_{s+T}$ is plotted as a time continuous signal e(t) comprising a sequence of unit impulses. The time continuous signal e(t) is modeled by Equation 13 below:

$$e(t) = p_i \cdot \delta(t - t_i) \quad \text{Equation 13}$$

Because each event detected by the EVS pixel indicates a change between latent images captured at different times, a proportional change in intensity on pixels of the bottom two rows of the CIS pixel array over the exposure period for these pixel rows can be provided by the sum (or combination) of events detected by the corresponding EVS pixel between time $t_s$ and time t, as shown in Equation 14 below:

$$E(t) = \int_s^t e(\xi)d\xi = \sum_{i\in[s,t]} p_i \quad \text{Equation 14}$$

Plot 214 of FIG. 2 illustrates the time continuous signal E(t) that represents a sum of the events in the time continuous signal e (t) of the plot 212 of FIG. 2 between time $t_s$ and time $t_{s+T}$, corresponding to the exposure period for the bottom two rows of the CIS pixel array.

Using Equations 11 and 12 above, one can determine $\ln[L(t_i)]$ when $\ln[L(t_{i-1})]$ is known. Therefore, given a sequence of events specified by time continuous signal e (t), and assuming that c in Equation 11 above remains constant, one can (in the linear domain) determine a latent image L(t) at any given time t for CIS pixels of the bottom two rows of the array by incrementing over all events from a starting latent image L(s) at time $t_s$ to time t, as shown by Equation 15 below:

$$L(t) = L(s)\exp(cE(t)) = L(s)\exp\left(c\int_s^t e(\xi)d\xi\right)L(s)\exp\left(c\sum_{i\in[s,t]} p_i\right) \quad \text{Equation 15}$$

As discussed above with reference to Equation 1, photocurrent photogenerated by the photosensor 101 is proportional to the latent image L(t) (or irradiance) at time t. Thus, the integral of the latent image L(t) over an exposure period extending between time $t_s$ and time $t_{s+T}$ corresponds to "charge" and can be related to frame information captured by CIS pixels of a frame-based image sensor. Moreover, as discussed above, a blurry intensity image captured by a frame-based image sensor can be regarded as the integral of a sequence of latent images over—or a combination of multiple latent images captured by the frame-based image sensor within—an exposure period extending between time $t_s$ and time $t_{s+T}$ during which events are accumulated. Therefore, a blurry frame B captured by a frame-based image sensor can, using Equation 15 above, be expressed by Equation 16 below:

$$B = \frac{1}{T}\int_s^{s+T} L(t)dt = \frac{L(s)}{T}\int_s^{s+T} \exp\left(c\int_s^t e(\xi)d\xi\right)dt = \frac{L(s)}{T}\int_s^{s+T} \exp\left(c\sum\nolimits_{i\in[s,t]} p_i\right)dt \quad \text{Equation 16}$$

Plot 216 of FIG. 2 illustrates the integral of the time continuous signal E(t) of the plot 214 of FIG. 2 over time from the time $t_s$ to the time $t_{s+T}$.

Equation 16 above is known as the EDI model and provides a relation between a blurry frame B captured by a frame-based image sensor and a latent image L(s) at a CIS pixel at time $t_s$ (corresponding to the start of the frame/exposure period for that CIS pixel). This relation can be rearranged to find the latent image L(s), as shown by Equation 17 below:

$$L(s) = \frac{T \cdot B}{\int_s^{s+T} \exp\left(c\sum\nolimits_{i\in[s,t]} p_i\right)dt} \quad \text{Equation 17}$$

The latent image L(s) in Equation 17 above takes the interpretation of a deblurred frame based on (a) the blurry frame B captured by a frame-based image sensor and (b) events detected by an EVS pixel across a corresponding exposure period. In other words, because events detected by the EVS pixel during an exposure period indicate changes between latent images captured by one or more active (CIS) pixels during the exposure period, the detected events can be used to perform event-guided deblur.

As discussed above, a rolling shutter can be used to capture and read out CIS information. For example, the exposure period for the top two rows of the CIS pixel array shown in the plot 210 of FIG. 2 starts at time $t_0$, which is before time $t_s$ at which the exposure period for the bottom two rows of the pixel array starts. Thus, at least some of the CIS information captured by CIS pixels of the top two rows is captured at different times than at least some of the CIS information captured by CIS pixels of the bottom two rows. As such, when (a) CIS information captured by CIS pixels of the top two and bottom two rows of the CIS pixel array are read out and (b) the latent images L(0) for the CIS pixels of the top two rows and the latent images L(s) for the CIS pixels of the bottom two rows are determined using Equation 17 above, the latent image $L_F(s)$ obtained from CIS information captured by CIS pixels of the entire array can include rolling shutter distortion (e.g., due to motion in an imaged scene that occurred between time $t_0$ and time $t_s$).

Events detected by the EVS pixel corresponding to the bottom two rows of the pixel array can be used to correct such distortion. More specifically, events detected by the EVS pixel between time $t_0$ and time $t_s$ (shown in plot 218 of FIG. 2) can be used to provide rolling shutter correction for CIS information captured by CIS pixels of the bottom two rows. In particular, a proportional change in intensity over the time period between time $t_0$ (corresponding to the start of the exposure period for the top two pixel rows of the CIS pixel array) and time $t_s$ (corresponding to the start of the exposure period for the bottom two rows of the CIS pixel array) can be provided by the sum (or combination) of events detected by the corresponding EVS pixel between time $t_0$ and time $t_s$, as shown in Equation 18 below:

$$E'(t) = \int_0^s e(\xi)d\xi = \sum\nolimits_{i\in[0,s]} p_i \quad \text{Equation 18}$$

The plot 218 of FIG. 2 illustrates a time continuous signal E' (t) that represents a sum of the events in the time continuous signal e (t) of the plot 212 of FIG. 2 between time $t_0$ and time $t_s$.

As discussed above, Equations 11 and 12 can be used to determine $\ln[L(t_i)]$ when $\ln[L(t_{i-1})]$ is known. Therefore, given the sequence of events specified by the time continuous signal e (t) between time $t_0$ and time $t_s$, and assuming that c in Equation 11 above remains constant, one can (in the linear domain) determine a latent image L(s) for a CIS pixel at time $t_s$ by (i) integrating/incrementing over all events detected by a corresponding EVS pixel from time $t_0$ to time $t_s$ and (ii) multiplying the accumulated events by a starting latent image L(0), as shown by Equation 19 below:

$$L(s) = L(0)\exp(cE'(t)) = L(0)\exp\left(c\int_0^s e(\xi)d\xi\right) = L(0)\exp\left(c\sum\nolimits_{i\in[0,s]} p_i\right) \quad \text{Equation 19}$$

Therefore, given Equations 17 and 19 above, one can solve for the latent image L(0) of a CIS pixel and obtain it using Equation 20 below:

$$L(0) = \frac{L(s)}{\exp\left(c\sum\nolimits_{i\in[0,s]} p_i\right)} = \frac{T \cdot B}{\exp\left(c\sum\nolimits_{i\in[0,s]} p_i\right)\int_s^{s+T} \exp\left(c\sum\nolimits_{i\in[s,t]} p_i\right)dt} \quad \text{Equation 20}$$

L(0) in Equation 20 above corresponds to a deblurred, rolling-shutter-distortion-corrected latent frame. Thus, the latent frame $L_F(0)$ for the entire pixel array can be obtained using the latent frames L(0) for individual CIS pixels in the array.

As discussed above, Equation 15 can be used to determine a latent image L(t) at any given time t for CIS pixels by incrementing over all events corresponding to those CIS pixels from a starting latent image L(s) at time $t_s$ to time t. Using Equation 15 and Equation 19 above, the latent image L(t) at any given time t can be expressed in terms of a starting latent image L(0) corresponding to time $t_0$ (corresponding to the start of the exposure period for the top two pixel rows of the CIS pixel array shown in FIG. 2), as shown by Equation 21 below:

$$L(t) = L(0)\cdot\exp\left(c\sum\nolimits_{i\in[0,s]}p_i\right)\cdot\exp\left(c\sum\nolimits_{i\in[s,t]}p_i\right) \quad \text{Equation 21}$$

As discussed in greater detail below, Equation 15 and/or Equation 21 can be used for video frame interpolation. Video frame interpolation (VFI) is a technique that involves generating additional (e.g., otherwise non-existent) frames of video/image data between consecutive video/image frames. For example, referring again to the plot 210 of FIG. 2, three additional frames of video/image data corresponding to time $t_1$, time $t_2$, and time $t_{s+T}$ can be generated using a starting latent image L(s) and Equation 15 above. Time $t_1$, time $t_2$, and time $t_{s+T}$ occur after a start time (time $t_s$) of the image frame illustrated in FIG. 2 and before a start of a next image frame (not shown). Thus, the latent images $L(t_1)$, $L(t_2)$, and $L(t_{s+T})$ can be used as three additional video/image frames that occur between the image frame in FIG. 2 and the next image frame.

Video frame interpolation is often used to make video playback smoother and more fluid, such as by making videos appear to have a higher refresh rate. Video frame interpolation is also commonly used in various video processing applications, such as video compression and video restoration. Additionally, or alternatively, video frame interpolation can be used to achieve slow motion video.

Several embodiments of the present technology described in detail below are directed to imaging systems with event-guided video frame interpolation. For example, several embodiments of the present technology are directed to imaging systems with hybrid image sensors that capture CIS data and corresponding EVS data. Continuing with this example, the hybrid image sensors can be configured to accumulate EVS data and output the accumulated EVS data to downstream components (e.g., application processors) of the imaging systems. In turn, the accumulated EVS data can be used to generate one or more interpolated video frames based on the CIS data.

In at least some of these embodiments, the imaging systems can further utilize the EVS data (e.g., raw EVS data or accumulated EVS data) to deblur and/or correct for rolling-shutter distortion in the CIS data. Such deblurring and/or rolling-shutter-distortion correction can be performed on-chip (e.g., on the hybrid image sensors) such that the hybrid image sensors are configured to output deblurred and/or rolling-shutter-distortion-corrected CIS data to the downstream application processors or image signal processors of the imaging systems. On-chip deblurring and/or on-chip rolling-shutter-distortion correction can avoid many of the drawbacks discussed in detail below with reference to off-chip deblurring and/or off-chip rolling-shutter-distortion-correction techniques. In other embodiments of the present technology, deblurring and/or rolling-shutter-distortion correction can be performed off-chip (e.g., off of the hybrid images sensors, such as after the hybrid image sensors output raw CIS data, raw EVS data, and/or accumulated EVS data).

As discussed above, many event-guided-deblur solutions use an active image sensor to capture CIS data and a separate event vision sensor to capture EVS data. Such dual-sensor configurations, however, have several shortcomings, such as parallax errors introduced because the sensors are not collocated, complexities in spatial and temporal synchronization of the CIS data and the EVS data, and added costs (e.g., due to the need for two pairs of lenses, packages, etc.). Although these shortcomings can be overcome by using hybrid image sensors, all existing event-guided-deblur solutions known to the inventors of the present disclosure output CIS data and EVS data to application processors external to the hybrid image sensors, for the application processors to perform event-guided deblur and rolling-shutter distortion off-chip. Such off-chip, event-guided-deblur solutions and rolling-shutter-correction solutions suffer from several additional shortcomings, many of which are discussed below with reference to FIG. 3.

Figure 3:
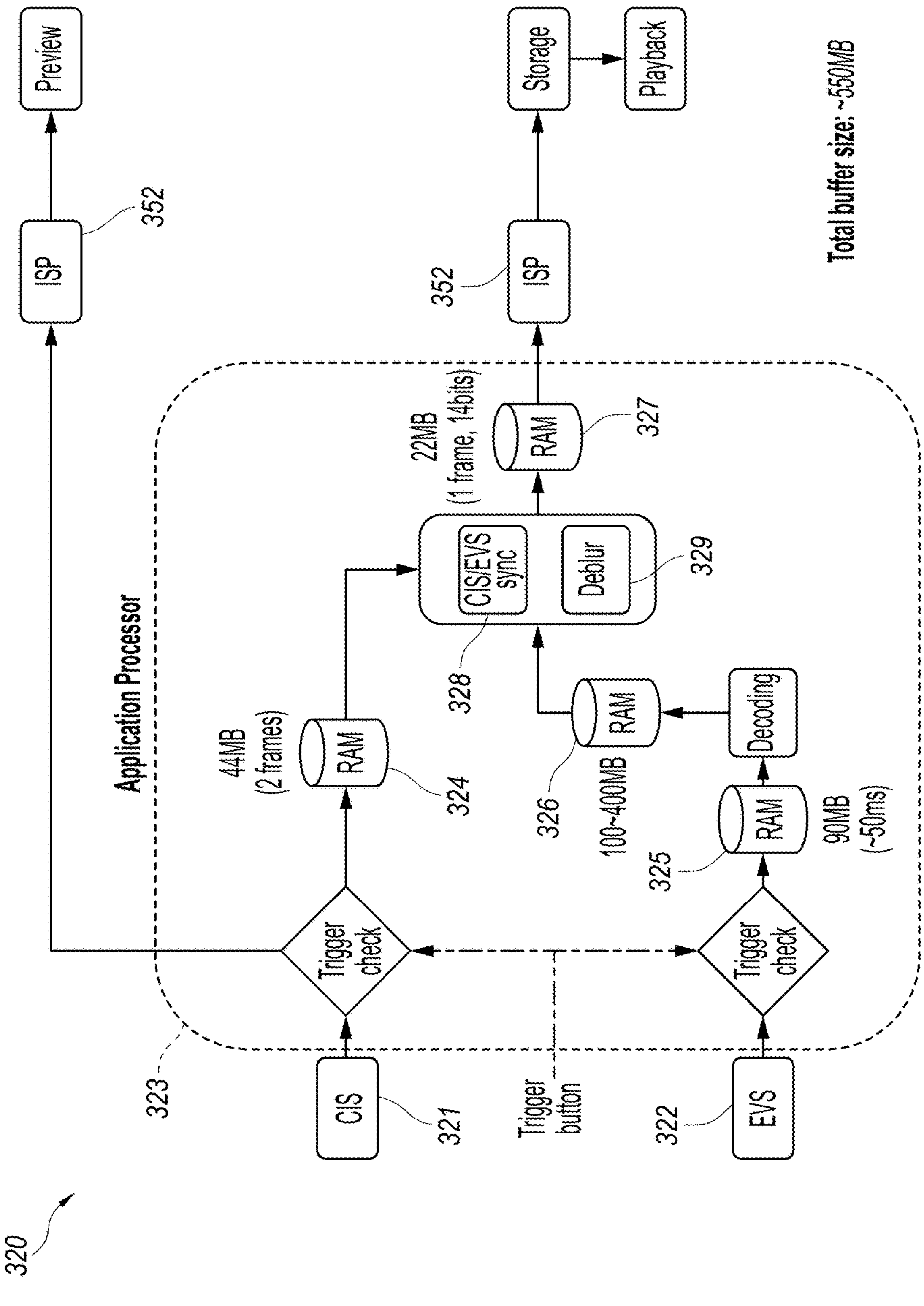
FIG. 3 is a partially schematic diagram illustrating an example of an imaging system with off-chip image deblur.

FIG. 3 is a partially schematic diagram illustrating an example of an imaging system 320 that performs event-guided deblur off-chip. As shown, CIS data 321 and EVS data 322 is output to an application processor 323 of the imaging system 320 from either (a) a hybrid image sensor (not shown) of the imaging system 320 or (b) an active pixel sensor (not shown) and a separate event vision sensor (not shown) of the imaging system 320. The application processor 323 is configured to (a) perform event-guided deblur of the CIS data 321 using the EVS data 322 and (b) output deblurred image frames to an image signal processor 352.

One drawback of off-chip, event-guided-deblur solutions is the need for a relatively large amount of memory. For example, to perform event-guided deblur, the application processor 323 uses a first buffer 324, a second buffer 325, a third buffer 326, and a fourth buffer 327. More specifically, the first buffer 324 is used to store two frames of CIS image data. One of the frames is used to sync the CIS data 321 with the EVS data 322 at a CIS/EVS sync block 328 of the application processor 323, and the other of the frames is deblurred by the application processor 323 using the EVS data 322 at a deblur block 329 of the application processor 323. In one example, the first buffer 324 can be approximately 44 MB in size for a 12-megapixel image sensor. The second buffer 325 is used to store the EVS data 322 prior to decoding, and the third buffer 326 is used to store the EVS data 322 after decoding. In one example, the second buffer 325 can be configured to store approximately 50 ms of the EVS data 322 and can therefore be approximately 90 MB in size. As such, depending on the decoding, the third buffer 326 can be approximately 100-400 MB in size. The fourth buffer 327 can be configured to store a deblurred image frame and can therefore be approximately 22 MB in size for a 12-megapixel image sensor. As such, continuing with the above examples, the application processor 323 can require approximately 550 MB of memory to perform event-guided deblur of the CIS data 321 using the EVS data 322.

Other drawbacks of off-chip, event-guided deblur solutions include that such solutions (i) suffer from relatively large latency and (ii) cannot support real-time video. For example, as shown in FIG. 3, the CIS data 321 and the EVS data 322 is output to the external application processor 323 (causing a 1-frame delay). In addition, the application processor 323 introduces additional delays while performing the event-guided beblur calculation. For example, the application processor 323 can take up to 1 second to process one 12-megapixel image. As a result, the off-chip, event-guided deblur solution illustrated by FIG. 3 is only able to process still images, meaning that this solution cannot support real-time video.

Still other drawbacks of off-chip, event guided deblur solutions include (i) the requirement for relatively high input/output (IO) bandwidth between the image sensor(s) and an external application processor, and (ii) consumption of a relatively large amount of power. For example, as shown in FIG. 3, both the CIS data 321 and the EVS data 322 are output from the image sensor(s) to the application processor 323, which requires a relatively high IO throughput (e.g., approximately 20 Gbps for a 12-megapixel, 30 fps image sensor). Such high IO throughput and long data processing time (e.g., up to 1 second, as discussed above) leads to consumption of a relatively large amount of power.

One other drawback of off-chip, event guided deblur solutions is the complexity of the interface between the image sensor(s) and downstream components of an imaging system. For example, rather than outputting deblurred image frames, the image sensor(s) (not shown) of the imaging system 320 of FIG. 3 output(s) raw CIS data 321 and raw EVS data 322, requiring a relatively complex application processor 323 and corresponding interface with the image sensor(s).

To address at least some of these concerns, several embodiments of the present technology described herein are generally directed to hybrid image sensors with on-chip image deblur and rolling shutter distortion correction capabilities. For example, several embodiments of the present technology described in detail below are directed to image sensors with the following on-chip capabilities: (a) synchronization of CIS data captured using active (CIS) pixels with EVS data captured using EVS pixels, (b) image deblur, and/or (c) rolling shutter distortion correction. In some embodiments, the on-chip image deblur can include on-chip, event-guided deblur. In these and other embodiments, the on-chip rolling shutter distortion correction can include on-chip, event-guided rolling shutter distortion correction.

Embodiments of the present technology that include on-chip image deblur and/or on-chip rolling-shutter-distortion correction are expected to offer several advantages. For example, in comparison to the off-chip, event-guided deblur solutions discussed above, the present technology is expected to reduce or minimize (a) an amount of memory required to perform image deblur and rolling shutter distortion correction; (b) latency associated with performing image deblur and rolling shutter distortion correction; (c) required IO bandwidth/throughput; and/or (d) an amount of power required to perform image deblur and rolling shutter distortion correction. As such, the present technology is also expected to support real-time video in addition to the processing of still images. Moreover, because image deblur and rolling shutter distortion correction are performed on-chip (e.g., entirely or partially internal the image sensor, and/or without first outputting or needing to first output raw CIS data and/or raw EVS data from the image sensor), images sensors configured in accordance with various embodiments of the present technology are able to output deblurred, rolling-shutter-distortion-corrected image frames (e.g., in addition to or in lieu of raw CIS data and/or raw EVS data), meaning that the interface between such images sensors and downstream components of corresponding imaging systems can be simplified in comparison to the off-chip, event-guided deblur solutions discussed above.

Figure 4A:
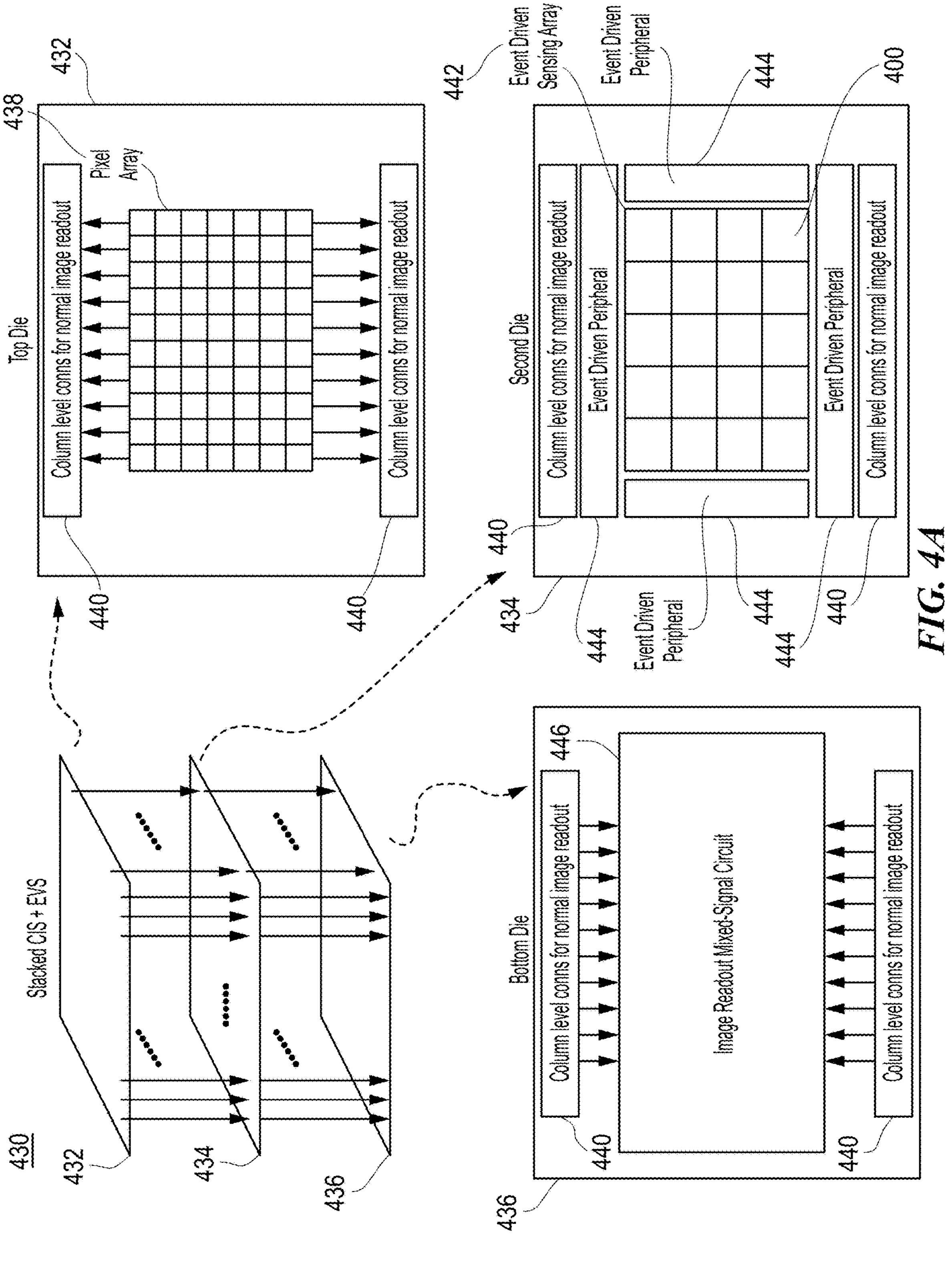
FIG. 4A is a partially schematic diagram of a stacked hybrid complementary metal oxide semiconductor (CMOS) image sensor (CIS) and event-based vision sensor (EVS) system, configured in accordance with various embodiments of the present technology.

B. Selected Embodiments of Hybrid Image Sensors With Video Frame Interpolation, and Associated Systems, Devices, and Methods FIG. 4A is a partially schematic diagram of a stacked complementary metal oxide semiconductor (CMOS) image sensor (CIS) with an event-based vision sensor (EVS) system 430 ("the stacked system 430" or "the image sensor 430"), configured in accordance with various embodiments of the present technology. As shown, the stacked system 430 includes a first die 432, a second die 434, and a third die 436 that are stacked and coupled together in a stacked chip scheme. In some embodiments, the first die 432, the second die 434, and the third die 436 are semiconductor dies that include a suitable semiconductor material (e.g., silicon). In illustrated embodiment, the first die 432 (also referred to herein as the "top die") includes a pixel array 438. The third die 436 (also referred to herein as the "bottom die") includes image readout circuitry 446 (also referred to herein as "image readout mixed-signal circuitry"). The image readout circuitry 446 can be coupled to the pixel array 438 of the first die 432 through column level connections for normal image readout 440. In some embodiments, the column level connections for normal image readout 440 are implemented from column bitlines of the pixel array 438 with through silicon vias (TSVs) that extend between the first die 432 and the third die 436, and that are routed through the second die 434.

In some embodiments, the pixel array 438 is a two-dimensional (2D) array including a plurality of pixel cells (also referred to as "pixels") that each includes at least one photosensor (e.g., at least one photodiode) exposed to incident light. As shown in the illustrated embodiment, the pixels are arranged into rows and columns. Some of the pixels can be configured as CMOS image sensor (CIS) pixels that are configured to acquire image data of a person, place, object, etc., which can then be used to render images and/or video of a person, place, object, etc. For example, each CIS pixel is configured to photogenerate image charge in response to the incident light. After each CIS pixel has acquired its image charge, the corresponding analog image charge data can be read out by the image readout circuitry 446 in the third die 436 through the column bit lines. In some embodiments, the image charge from each row of the pixel array 438 may be read out in parallel through column bit lines by the image readout circuitry 446. As discussed in greater detail below, others of the pixels of the pixel array 438 can be configured as event vision sensor (EVS) pixels.

The image readout circuitry 446 in the third die 436 can include amplifiers, analog to digital converter (ADC) circuitry, associated analog support circuitry, associated digital support circuitry, etc., for normal image readout and processing. In some embodiments, the image readout circuitry 446 may also include event driven readout circuitry, which will be described in greater detail below. In operation, the photogenerated analog image charge signals are read out from the pixel cells of pixel array 438, amplified, and converted to digital values in the image readout circuitry 446. In some embodiments, image readout circuitry 446 may read out a row of image data at a time. In other examples, the image readout circuitry 446 may read out the image data using a variety of other techniques (not illustrated), such as a serial readout or a full parallel readout of all pixels simultaneously. The image data may be stored or even manipulated by applying post image effects (e.g., crop, rotate, remove red eye, adjust brightness, adjust contrast, and the like).

In the illustrated embodiment, the second die 434 (also referred to herein as the "middle die") includes an event driven sensing array 442 that is coupled to at least some of the pixels (e.g., EVS pixels) of the pixel array 438 in the first die 432. In some embodiments, the event driven sensing array 442 is coupled to the pixels of the pixel array 438 through hybrid bonds between the first die 432 and the second die 434. The event driven sensing array 442 can include an array of event driven circuits. In some embodiments, each one of the event driven circuits in the event driven sensing array 442 is coupled to at least one of the plurality of pixels of the pixel array 438 through hybrid bonds between the first die 432 and the second die 434 to asynchronously detect events that occur in light that is incident upon the pixel array 438 in accordance with the teachings of the present disclosure.

In some embodiments, corresponding event detection signals are generated by the event driven circuits (e.g., that are similar to the event sensing front-end circuit illustrated in FIG. 1) in the event driven sensing array 442. The event detection signals can be received and processed by event driven peripheral circuitry 444 that, in some embodiments, is arranged around the periphery of the event driven sensing array 442 in the second die 434, as is shown in FIG. 4A. The embodiment illustrated in FIG. 4A also illustrates column level connections for normal image readout 440 that are routed through the second die 434 between the first die 432 and the third die 436.

Figure 4B:
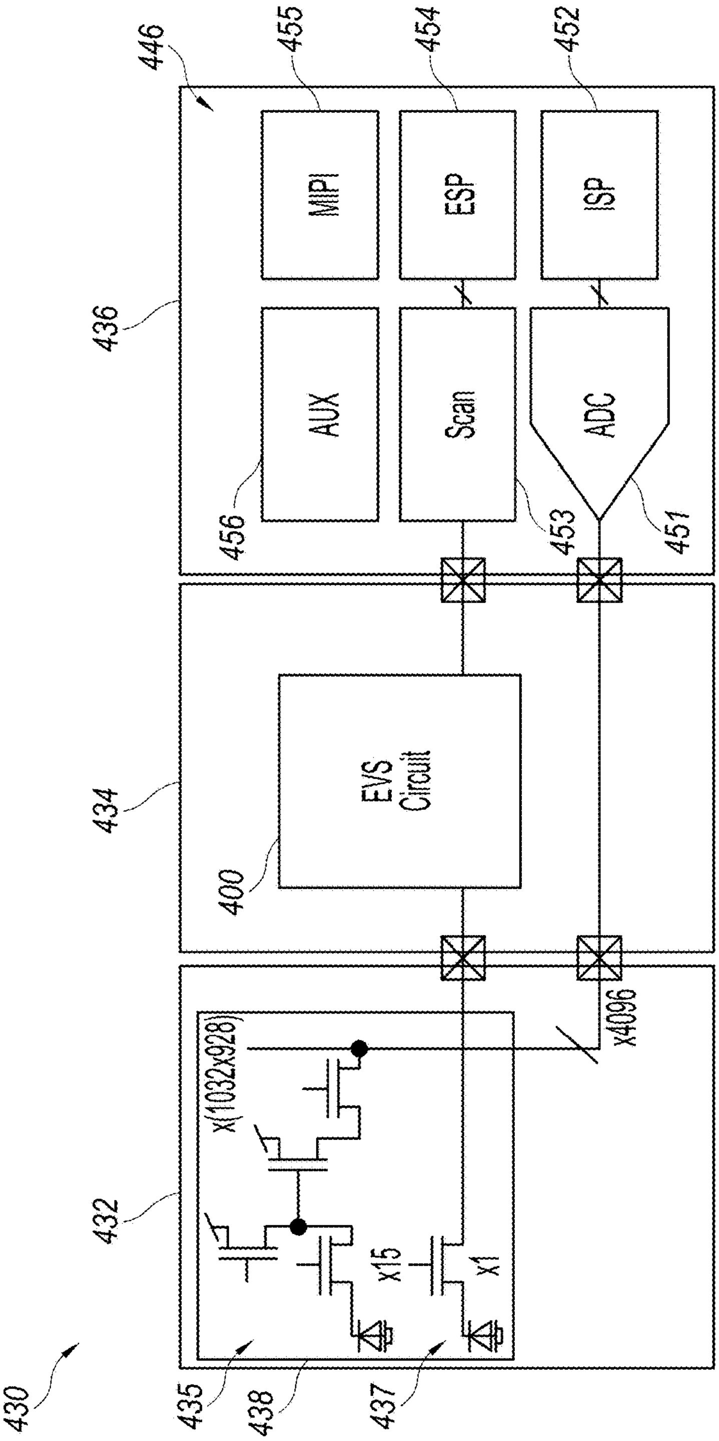
FIG. 4B is a partially schematic diagram of a specific example of the system of FIG. 4A.

FIG. 4B is a partially schematic diagram of a specific example of the stacked system 430 of FIG. 4A. As shown in FIG. 4B, the stacked system 430 includes the pixel array 438 on the first die 432 (only a portion of the pixel array 438 is shown in FIG. 4B), an event driven circuit 400 of the event driven sensing array 442 on the second die 434, and image readout circuitry 446 on the third die 436. The image readout circuitry 446 includes analog-to-digital converters 451 ("the ADC 451"), an image signal processor 452, scan readout circuitry 453, an event signal processor 454, a synchronous communications interface 455 (e.g., a mobility industry processor interfaces (MIPI) transmitter and/or receiver), and various auxiliary circuits 456. As discussed in greater detail below, the image readout circuitry 446 can also include a deblur circuit (e.g., for performing event-guided deblur and/or rolling shutter distortion correction of CIS data).

Figure 4C:
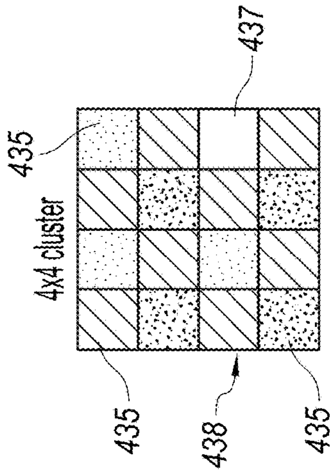
FIG. 4C is a partially schematic diagram of a 4×4 pixel cluster configured in accordance with various embodiments of the present technology.

The portion of the pixel array 438 shown in FIG. 4B corresponds to a 4×4 cluster of pixels in the pixel array 438. Such a cluster can be repeated across the pixel array 438. In the illustrated embodiment, fifteen (15) of the pixels of the cluster are configured as active (CIS) pixels 435 to capture CIS information (e.g., intensity information) corresponding to light incident on photosensors of those pixels. In addition, one of the pixels of the cluster is configured as an EVS pixel 437 to capture non-CIS information (e.g., contrast information, event data) corresponding to light incident on a photosensor of the EVS pixel 437. FIG. 4C illustrates a specific example of the 4×4 pixel cluster of FIG. 4B in which the CIS pixels 435 are arranged in a Bayer pattern to capture CIS (frame) information corresponding to light incident on the cluster, and the EVS pixel 437 is arranged to detect EVS (asynchronous event) information corresponding to light incident on the cluster. The CIS pixels 435, of course, can be arranged in another pattern besides a Bayer pattern in other embodiments of the present technology.

Referring again to FIG. 4B, the CIS pixels 435 of the cluster and the EVS pixel 437 of the cluster are read out independently. More specifically, CIS information captured by the CIS pixels 435 are read out through the second die 434 to the ADC 451 on the third die 436 using corresponding row/column control circuitry (not shown). Non-CIS information captured by the EVS pixel 437 is read out to the event driven circuit 400 on the second die 434 using corresponding row/column control circuitry (not shown), and events detected by the event driven circuit 400 are read out by the scan readout circuitry 453 on the third die 436. The CIS information captured by the CIS pixels 435 of the pixel array 438 is frame-based and can be readout out from the CIS pixels 435 row-by-row at the end of an exposure period. By contrast, the non-CIS information captured by the EVS pixel 437 is used by the event driven circuit 400 to asynchronously detect/trigger events, and the events can be read out according to a row scan readout scheme or a column scan readout scheme. Row scan readout schemes are discussed in greater detail below.

In some embodiments, row/column control circuitry corresponding to the CIS pixels 435 can be allocated on a same die as—or a different die from—the die (e.g., the third die 436) on which the ADC 451 is allocated. In these and other embodiments, row/column control circuitry corresponding to the EVS pixels 437 can be allocated on a same die as—or a different die from—the die (e.g., the third die 436) on which the scan readout circuitry 453 is allocated. In these and still other embodiments, the ADC 451 and/or the row/column control circuitry corresponding to the CIS pixels 435 can be allocated on a same die as—or a different die from—the die (e.g., the third die 436) on which the scan readout circuitry 453 and/or the row/column control circuitry corresponding to the EVS pixel 437 is/are allocated.

In the illustrated embodiment, the EVS pixel 437 is dedicated to capturing non-CIS (EVS) information while the CIS pixels 435 are dedicated to capturing CIS information. In other embodiments, the EVS pixel 437 and/or one or more of the CIS pixels 435 can be switched between being configured to capture CIS information and non-CIS information. This can enable the stacked system 430 to operate in a CIS-only mode in which all of the pixels 435 and the pixel 437 are used to capture CIS information, an EVS-only mode in which all of the pixels 435 and the pixel 437 are used to capture non-CIS (EVS) information, and/or a hybrid CIS and EVS mode in which a first subset of the pixels 435, 437 are used to capture CIS information and a second subset of the pixels 435, 437 are used to capture non-CIS (EVS) information.

In some embodiments, the event driven circuit 400 on the second die 434 has a same die size as the 4×4 pixel cluster on the first die 432. In other embodiments, the event driven circuit 400 can have a different die size from the 4×4 pixel cluster. Additionally, or alternatively, although the ratio of CIS pixels to EVS pixels is 15:1 in the 4×4 pixel cluster, other ratios of CIS pixels to EVS pixels (e.g., 14:2, 12:4, 8:8, 4:12, 2:14, 15:1) are possible and fall within the scope of the present technology. Moreover, although the EVS pixel 457 of FIG. 4B corresponds to a 4×4 pixel cluster, other arrangements (e.g., an EVS pixel corresponding to 1×1 pixels clusters, 4×2 pixel clusters, etc.) are possible and within the scope of the present technology. Furthermore, although one row of EVS pixels (e.g., the row including the EVS pixel 457) corresponds to four rows of CIS pixels in FIG. 4B, other arrangements are possible and within the scope of the present technology. For example, each row of EVS pixels can correspond to (a) one row of CIS pixels, (b) to two rows of CIS pixels, (c) to three rows of CIS pixels, or (d) to more than four rows of CIS pixels. Examples of other CIS pixel resolutions to EVS pixel resolutions are described in the cofiled, copending, and coassigned application titled "METHODS FOR OPERATING HYBRID IMAGE SENSORS HAVING DIFFERENT CIS-TO-EVS RESOLUTIONS," which has been incorporated by reference herein in its entirety above.

Figure 5:
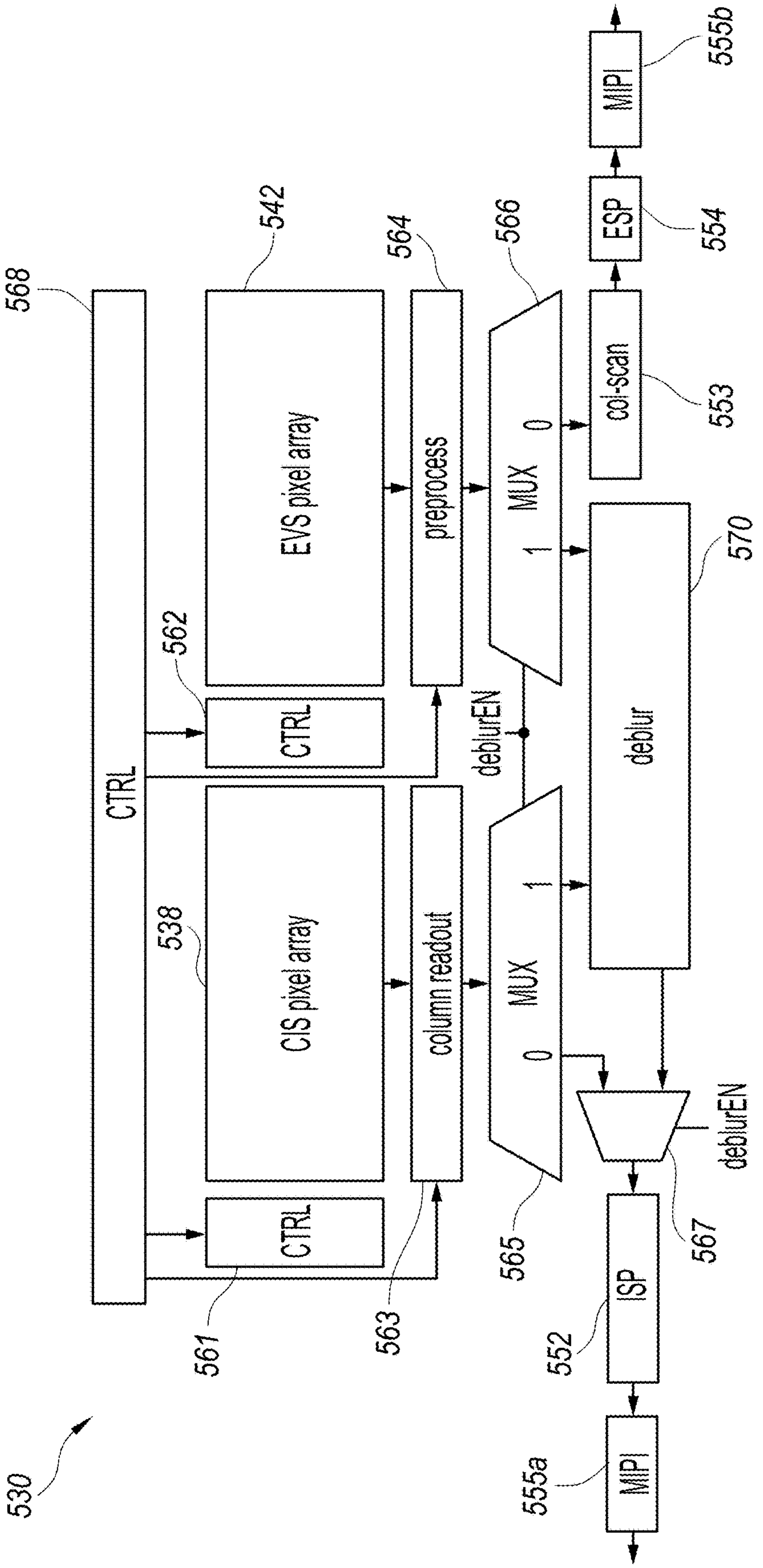
FIG. 5 is a partially schematic block diagram of an image sensor configured in accordance with various embodiments of the present technology.

As discussed above, event data captured using EVS pixels can be used to perform event-guided deblur and/or rolling shutter distortion correction of CIS (frame) information captured using CIS pixels. To this end, FIG. 5 is a partially schematic block diagram of an image sensor 530 that can include on-chip image deblur and/or rolling shutter correction capabilities and that is configured in accordance with various embodiments of the present technology. The image sensor 530 can be an example of the stacked system 430 of FIG. 4A and/or FIG. 4B described above, or of other image sensors configured in accordance with the present technology.

As shown, the image sensor 530 includes a CIS pixel array 538 (e.g., similar to the pixel array 438 of FIG. 4A, FIG. 4B, and/or FIG. 4C) and/or an event driven sensing array 542 (e.g., similar to the event driven sensing array 442 of FIG. 4A, FIG. 4B, and/or FIG. 4C). The image sensor 530 further includes (a) row/column control circuitry 561 and column readout circuitry 563 for controlling operation and readout of CIS pixels included in the pixel array 538, and (b) row/column control circuitry 562 for controlling operation and readout of EVS pixels included in the event driven sensing array 542. The image sensor 530 may optionally include a preprocessing circuit 564 for performing various operations (e.g., denoising) on EVS data read out from EVS pixels of the event driven sensing array 542.

The image sensor 530 further includes a common control block 568 for synchronizing operation of the pixel array 538 with operation of the event driven sensing array 542. More specifically, although CIS pixels of the pixel array 538 and EVS pixels of the event driven sensing array 542 include their own row/column control circuitry and are independently read through their own readout circuitry, the common control block synchronizes operation (e.g., reset, exposure start times, exposure end times) of the CIS pixels, the EVS pixels, the row/column control circuits, and/or the readout circuits. This synchronization is described in greater detail below with reference to FIGS. 10-12.

In some embodiments, the image sensor 530 can include a first multiplexer 565, a second multiplexer 566, and/or a third multiplexer 567. As shown, the first multiplexer 565, the second multiplexer 566, and the third multiplexer 567 can be controlled using a deblur enable signal deblurEN. When the deblur enable signal deblurEN is un-asserted (e.g., is in a low or '0' state), the first multiplexer 565 and the third multiplexer 567 can stream CIS data (e.g., raw intensity image frames, blurry intensity image frames) to an image signal processor 552 of the image sensor 530, such as in lieu of streaming the raw CIS data to a deblur and rolling-shutter-distortion correction circuit 570 ("the deblur circuit 570" or "the rolling shutter distortion correction circuit 570") of the image sensor 530. In turn, the image signal processor 552 can provide the CIS data to a synchronous communications interface 555*a* (e.g., a MIPI interface/transmitter), such as for output from the image sensor 530.

Additionally, or alternatively, when the deblur enable signal deblurEN is un-asserted (e.g., is in a low or '0' state), the second multiplexer 566 can stream EVS data to the column-scan readout circuitry 553, such as in lieu of streaming the EVS data to the deblur circuit 570. In turn, the column-scan readout circuitry 553 can provide the EVS data to an event signal processor 554 of the image sensor 530, and the event signal processor 554 can provide the EVS data to a synchronous communications interface 555*b* (e.g., a MIPI interface/transmitter), such as for output from the image sensor 530.

In the illustrated embodiment, the synchronous communications interface 555*a* and the synchronous communications interface 555*b* can be independent physical interfaces. Alternatively, the synchronous communications interface 555*a* and the synchronous communications interface 555*b* can be merged. For example, CIS data and EVS data can be output from the image sensor 530 via a shared synchronous communications interface 555 (e.g., a shared MIPI interface, a shared virtual channel, embedded line).

Referring again to the first multiplexer 565, the second multiplexer 566, and the third multiplexer 567, when the deblur enable signal deblurEN is asserted (e.g., is in a high or '1' state), the first multiplexer 565 is enabled to stream CIS information read from CIS pixels of the pixel array 538 into the deblur circuit 570, and the second multiplexer 566 is enabled to stream EVS information read from EVS pixels of the event driven sensing array 542 into the deblur circuit 570. For example, when the deblur enable signal deblurEN is asserted, EVS information read from EVS pixels of the event driven sensing array 542 can be constantly streamed into the deblur circuit 570 via the second multiplexer 566 (e.g., while CIS pixels of the pixel array 538 integrate photogenerated charge over an exposure period). Additionally, or alternatively, when CIS information is read out from CIS pixels of the pixel array 538 after the exposure period, digitized CIS information can be streamed into the deblur circuit 570 via the first multiplexer 565.

In turn, the deblur circuit 570 (*a*) can compute a fused image/video stream from the CIS data and the EVS data received via the first multiplexer 565 and the second multiplexer 566, respectively, and (b) can output the fused image/video stream into the third multiplexer 567 for streaming to the image signal processor 552. The fused image/video stream may then be provided from the image signal processor 552 to the synchronous communications interface 555*a* for output from the image sensor 530. The fusion computations performed by the deblur circuit 570 can be targeted at deblurring the CIS frame information captured by CIS pixels of the pixel array 538, correcting for rolling shutter artifacts, and/or creating interpolated video frames. On-chip deblurring of CIS frame information and rolling shutter correction of CIS frame information are discussed in greater detail below with reference to FIGS. 6-20.

In embodiments in which the image sensor 530 is a stacked system, components of the deblur circuit 570 can be positioned on one or more of the dies (e.g., a top die, a middle die, or a bottom die) of the stacked system. As a specific example, the image sensor 530 can be generally similar to the stacked system 430 of FIGS. 4A and 4B described above, and the deblur circuit 570 of the image sensor 530 can be positioned on a third (or bottom) die of the image sensor 530. In other embodiments, at least a portion of the deblur circuit 570 can be positioned off-chip (e.g., off of the image sensor 530), such as on a downstream application processor of an imaging system that includes the image sensor 530. In these embodiments, at least part of the deblur and/or rolling-shutter-distortion correction can be performed off-chip, such as part of video frame interpolation computations.

In some embodiments, the first multiplexer 565, the second multiplexer 566, and/or the third multiplexer 567 shown in FIG. 5 can be omitted. In at least some of these embodiments, the image sensor 530 can be operated in a manner generally similar to how the image sensor 530 illustrated in FIG. 5 would operate if the deblur enable signal deblurEN was perpetually in the asserted state (e.g., by always streaming CIS information and EVS information into the deblur circuit 570 for the deblur circuit 570 to compute a fused image/video stream). Additionally, or alternatively, the image sensor 530 can be configured to output the raw CIS data and/or the EVS data. For example, the image sensor 530 can output the raw CIS data and/or the EVS data in addition to or in lieu of outputting a fused image/video steam based on the raw CIS data and the EVS data. Furthermore, although the image signal processor 552 of the image sensor 530 illustrated in FIG. 5 is configured to process the fused image/video stream output by the deblur circuit 570 when the deblur enable signal deblurEN is asserted, the image signal processor 552 in other embodiments can be configured to process CIS information read out from CIS pixels of the pixel array 538 prior to the deblur circuit 570 computing a fused image/video stream. In such embodiments, after processing the CIS information read out from CIS pixels of the pixel array 538, the image signal processor 552 can output the processed CIS information to the deblur circuit 570 for the deblur circuit 570 to compute a fused image/video stream based on the processed CIS information (e.g., as opposed to based on the raw CIS information).

Figure 6:
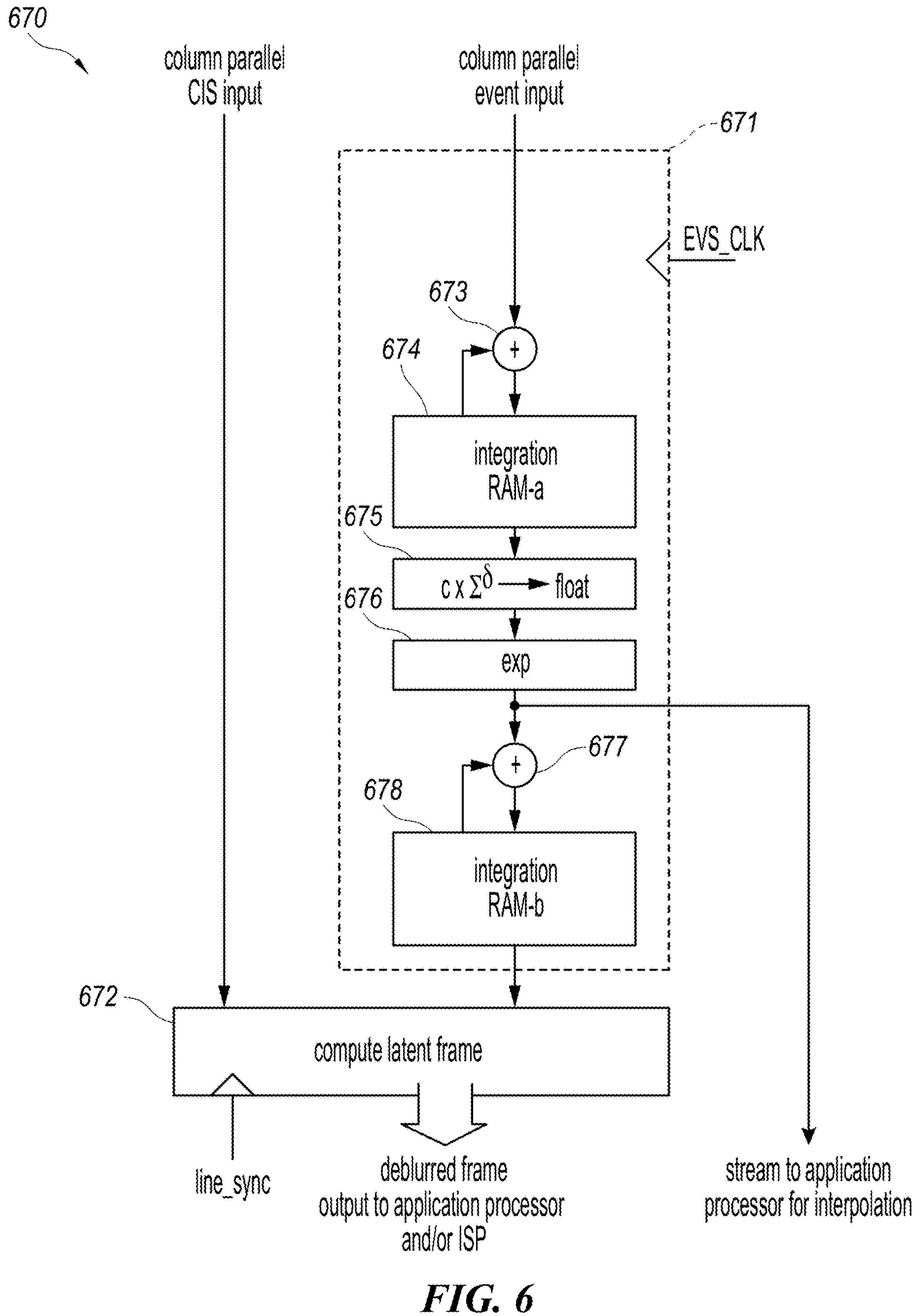
FIG. 6 is a partially schematic diagram of a deblur circuit configured in accordance with various embodiments of the present technology.

FIG. 6 is a partially schematic diagram of a deblur circuit 670 configured in accordance with various embodiments of the present technology. The deblur circuit 670 can be an example of the deblur circuit 570 of FIG. 5, or of other deblur circuits configured in accordance with the present technology. As discussed in greater detail below, the deblur circuit 670 can implement event-guided deblur of CIS data, such as on-chip (e.g., on the image sensor 530 of FIG. 5), and thereafter output a deblurred image frame to a downstream image signal processor and/or a downstream application processor.

As shown in FIG. 6, the deblur circuit 670 includes an event-based double integral (EDI) computation block 671 and a latent frame computation block 672. Operation of at least a portion of the EDI computation block 671 can be clocked by a control signal EVS_CLK that at least generally follows the time continuous signal e (t) of Equation 13 above, an example of which is shown in plot 212 of FIG. 2. In other words, operation of at least a portion of the EDI computation block 671 can be enabled whenever an event is triggered and read out from an EVS pixel. Operation of the latent frame computation block 672 can be clocked by a control signal line_sync. The control signal line-sync can be provided/controlled by a common control block of an image sensor corresponding to the deblur circuit 670, such as the common control block 568 of the image sensor 530 of FIG. 5. In some embodiments, the control signal line_sync can correspond to the duration of the exposure period T, as shown in Equations 16 and 17 above.

In the illustrated embodiment, the EDI computation block 671 includes a plurality of EDI components. More specifically, the EDI computation block 671 includes a counter 673, a first integration buffer 674, a product computation block 675, an exponential computation block 676, an integration computation block 677, and a second integration buffer 678. The counter 673 can be an integer counter (e.g., an up/down counter) or another suitable type of counter for computing a running sum of events detected by each EVS pixel during an exposure period, and the first integration buffer 674 can be configured to track/store the running sums for the exposure period.

The counter 673 and the first integration buffer 674 can be configured to compute the first, inner integral of the EDI model described above. For example, as event data is streamed into the deblur circuit 670 during the exposure period, the counter 673 can be enabled via the control signal EVS_CLK whenever an event is detected, which can cause the counter 673 to increment or decrement (depending on the polarity of the detected event) a running sum maintained by the first integration buffer 674 for the EVS pixel that detected the event. The running sum for each of the EVS pixels over time is equivalent to E(t) shown in Equation 14 above, an example of which is shown in plot 214 of FIG. 2. The buffer size of the first integration buffer 674 can be relatively small for such an implementation. As a specific example, assuming the duration of an exposure period between time $t_s$ and time $t_{s+T}$ is 33 ms, the first integration buffer 674 can include a buffer size of 10 bits/pixel. In some embodiments, a floating point calculator can be used in lieu of the counter 673. In such embodiments, the first integration buffer 674 may have a larger or smaller buffer size.

The product computation block 675, the exponential computation block 676, the integration computation block 677, and the second integration buffer 678 can be configured to compute the second, outer integral of the EDI model described above. For example, the product computation block 675 can multiply the running sums stored in the first integration buffer 674 by the contrast threshold parameter c, which is equivalent to $C_{log\text{-}TH}$ (described above with reference to Equations 6-12, 15-17, and 19-21) and is assumed to remain constant. Thus, for each EVS pixel, the output of the product computation block 675 can be equivalent to $c\Sigma_{i\in[s,t]}p_i$. Thereafter, for each EVS pixel, the exponential computation block 676 can determine the exponential of the output of the product computation block 675, resulting in $\exp(c\Sigma_{i\in[s,t]}p_i)$ at the output of the exponential computation block 676.

As shown in FIG. 6, the output of the exponential computation block 676 (representing the exponential of the output of the product computation block 675) can be provided (i) to the integration computation block 677 and (ii) to a downstream application processor, such as an off-chip application processor of an imaging system that includes a hybrid image sensor incorporating the deblur circuit 670. As discussed in greater detail below, the application processor can be configured to use the output of the exponential computation block 676 to perform video frame interpolation. Because the exponential at the output of exponential computation block 676 includes accumulated EVS data, corresponding raw EVS data read out of the EVS pixels of a corresponding hybrid image sensor can be discarded in some embodiments without reading the corresponding raw EVS data out of the hybrid image sensor and/or to the application processor. Alternatively, the corresponding raw EVS data can be read out of the hybrid image sensor and/or to the application processor, such as in addition to the accumulated EVS data and/or the output of the exponential computation block 676. In some embodiments, accumulated EVS data stored to the first integration buffer 674 can be read out to the downstream application processor (e.g., for performing video frame interpolation), such as without first providing the accumulated EVS data to the product computation block 675 and/or the exponential computation block 676. In these embodiments, the downstream application processor can include one or more EDI components, such as a product computation block and/or an exponential computation block, used for deblurring corresponding CIS data and/or for interpolating additional video/image frames.

The integration computation block 677 of the EDI computation block 671 can, for each EVS pixel, continuously integrate the output of the exponential computation block 676 over time. More specifically, the integration computation block 677 can integrate each of the outputs of the exponential computation block 676 from time $t_s$ (corresponding to the start of the current exposure period) to time t, ending at time $t_{s+T}$ (corresponding to the end of the current exposure period). The second integration buffer 678 can track/store the results of this time continuous integration, which are each equivalent to $$\int_{s}^{s+T} \exp\left(c\sum\nolimits_{i\in[s,t]} p_i\right)dt$$

at the end of the exposure period. Example results for an EVS pixel output by the integration computation block 677 are shown in the plot 216 of FIG. 2.

Each of the computations performed by the product computation block 675, the exponential computation block 676, the integration computation block 677, and the second integration 678 can be performed in floating point representation, such as 9-bit mantissa and 4-bit exponent. In addition, although operation of the counter 673 and/or the first integration buffer 674 can be clocked by the control signal EVS_CLK, the product computation block 675, the exponential computation block 676, the integration computation block 677, and/or the second integration buffer 678 can be enabled to continuously perform their respective operations over time. As a specific example, in some embodiments, operation of the integration computation block 677 is not clocked by the control signal EVS_CLK nor triggered by events. Rather, the integration computation block 677 is configured to continuously integrate the outputs of the exponential computation block 676 over time, at least between time $t_s$ and time $t_{s+T}$ corresponding to the start and stop times, respectively, of a corresponding exposure period/EVS accumulation period. In these embodiments, operation of the product computation block 675 and/or the exponential computation block 676 can be clocked by the control signal EVS_CLK or enabled to continuously perform their respective operations over time.

Furthermore, because events detected at each EVS pixel are accumulated by the EDI computation block 671, raw EVS data input into the EDI computation block 671 of the deblur circuit 670 can be discarded once events of the raw EVS data have been accumulated by the EDI computation block 671. As a result, the second integration buffer 678 need only store/maintain the accumulated results of the integration computation block 677, meaning that the second integration buffer 678 can have a relatively small buffer size (e.g., ~9 MB, such as about 8.625 MB or about 13 bits/pixel) in comparison to buffers utilized in off-chip, event-guided deblur solutions. In addition, because the raw EVS data can be discarded rather than output from an image sensor corresponding to the deblur circuit 670, IO throughput and power consumption can be reduced in comparison to off-chip, event-guided deblur solutions in which the raw EVS data is output from the image sensor to an external application processor. In other embodiments of the present technology, all or a subset of the raw EVS data can be stored and/or output from the image sensor after events in the raw EVS data are accumulated.

After the exposure period ends, CIS data can be read out from CIS pixels of the image sensor and streamed into the latent frame computation block 672 of the deblur circuit 670. At this point, the latent frame computation block 672 can deblur the CIS data by combining/fusing the CIS data with the accumulated EVS data stored in the second integration buffer 678 of the EDI computation block 671. More specifically, the latent frame computation block 672 can compute a latent image frame L(s) corresponding to time $t_s$ (the start of the exposure period) by performing the operation specified in Equation 17 above for each EVS pixel. The final, deblurred image data (e.g., the latent image frame L(s)) can be output from the latent frame computation block 672 to the application processor and/or an image signal processor of a corresponding imaging system. Because the CIS data can be read directly into the latent frame computation block 672 after the exposure period and because the accumulated EVS data from the second integration buffer 678 is readily available and already aligned at this time (as discussed in greater detail below), no CIS frame buffer is required to perform on-chip deblur using the deblur circuit 670. Therefore, the deblur circuit 670 and/or the corresponding image sensor can lack a CIS frame buffer in some embodiments. In other embodiments, the deblur circuit 670 and/or the corresponding image sensor can include a CIS frame buffer, such as in embodiments in which raw CIS data can be output in addition to fused image/video data.

As discussed above, the output of the exponential computation block 676 (or the first integration buffer 674) can be streamed to a downstream application processor for the application processor to perform video frame interpolation. In addition, after (i) the exposure period ends, (ii) the CIS data is read out from CIS pixels of the image sensor, and/or (iii) the latent frame computation block 672 computes the latent image frame L(s) corresponding to time $t_s$, the latent image frame L(s) computed by the latent frame computation block 672 can be output to a CIS key frame buffer, such as of the downstream application processor. Additionally, or alternatively, raw CIS data can be read out from the CIS pixels of the image sensor and provided to the downstream application processor. In turn, the downstream application processor can (using the output of the exponential computation block 676 or the first integration buffer 674, the latent image frame L(s) and/or the raw CIS data, and Equation 15 above) perform video frame interpolation to compute one or more latent image frames L(t) corresponding to one or more times t between time $t_s$ and time $t_{s+T}$ (the end of the exposure period). The one or more latent image frame L(t) can represent one or more additional, interpolated image frames that, for example, can be used to increase frame rate of the imaging system and/or be used to produce slow motion video.

Figure 7:
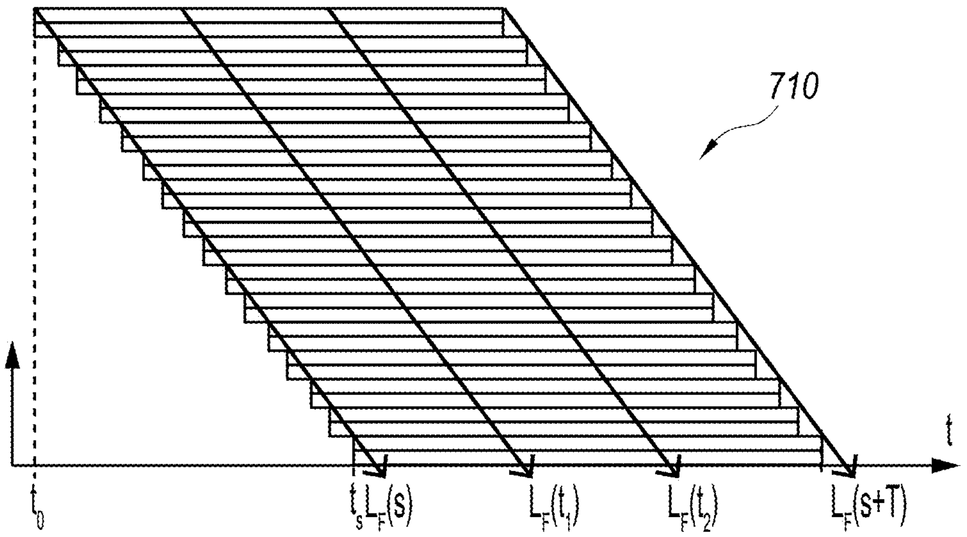
FIG. 7 is a plot illustrating (a) exposure periods for an example image frame and (b) four corresponding latent image frames that have been deblurred in accordance with various embodiments of the present technology.

FIG. 7 is a plot 710 illustrating exposure periods for an image frame and four corresponding latent image frames $L_F(s)$, $L_F(t_1)$, $L_F(t_2)$, and $L_F(t_{s+T})$ that can be computed using corresponding CIS data and EVS data, in accordance with various embodiments of the present technology. More specifically, in accordance with the discussion of FIG. 6 above, a deblur circuit (e.g., the deblur circuit 570 of FIG. 5, the deblur circuit 670 of FIG. 6, an on-chip deblur circuit) can compute a latent image frame $L_F(s)$ corresponding to time $t_s$ (representing a start time of exposure periods for a last few CIS pixel rows) by deblurring CIS data using corresponding EVS data accumulated during the exposure periods illustrated in FIG. 7.

In addition, three additional latent frames $L_F(t_1)$, $L_F(t_2)$, and $L_F(t_{s+T})$ can be generated using video frame interpolation. For example, a downstream application processor (a) can receive accumulated EVS data from the deblur circuit during the exposure periods illustrated in FIG. 7, and (b) can utilize the accumulated EVS data, the latent image frame $L_F(s)$ computed by the deblur circuit, and/or raw CIS data captured during the exposure periods to interpolate the three additional latent frames $L_F(t_1)$, $L_F(t_2)$, and $L_F(t_{s+T})$ shown in FIG. 7, such as using Equation 15 above. As part of this process, the downstream application processor can (a) synchronize the accumulated EVS data with the latent image frame $L_F(s)$ and/or corresponding CIS data, (b) calibrate (e.g., set or adjust) a contrast threshold c, (c) deblur the latent image frame $L_F(s)$ and/or the corresponding CIS data with respect to time $t_1$, time $t_2$, and time $t_{s+T}$, and/or (d)

compute the latent frames $L_F(t_1)$, $L_F(t_2)$, and $L_F(t_{s+T})$ that serve as interpolated video/image frames in addition to the latent image frame $L_F(s)$.

As shown in FIG. 7, CIS data can be captured using a rolling shutter. In particular, an exposure period for a first two rows of CIS pixels shown in FIG. 7 starts at time $t_0$, and an exposure period for a last two rows of CIS pixels shown in FIG. 7 can start at time $t_s$. In other words, due to use of a rolling shutter, there is a delay between when the exposure period for the first two CIS pixels rows begins and when the exposure periods for each of the other CIS pixels rows (including the last two CIS pixel rows) begin. Therefore, rolling shutter distortion can be present in portions of the latent image frame $L_F(s)$ and/or portions of the latent image frames $L(t_1)$, $L(t_2)$, and $L(t_{s+T})$ that correspond to CIS pixels of pixel rows that have exposure periods that begin at a time occurring after time $t_0$, especially when there is motion in an external scene that occurs between time $t_0$ and a start time of those exposure periods.

As such, in embodiments in which a rolling shutter is used, at least some deblur circuits configured in accordance with various embodiments of the present technology can additionally include rolling shutter distortion correction components that are usable to correct for rolling-shutter distortion that may be present in computed latent image frames $L_F(s)$ and $L_F(t)$. Two such deblur circuits are described in greater detail below with reference to FIGS. 9A and 9B.

Figure 8:
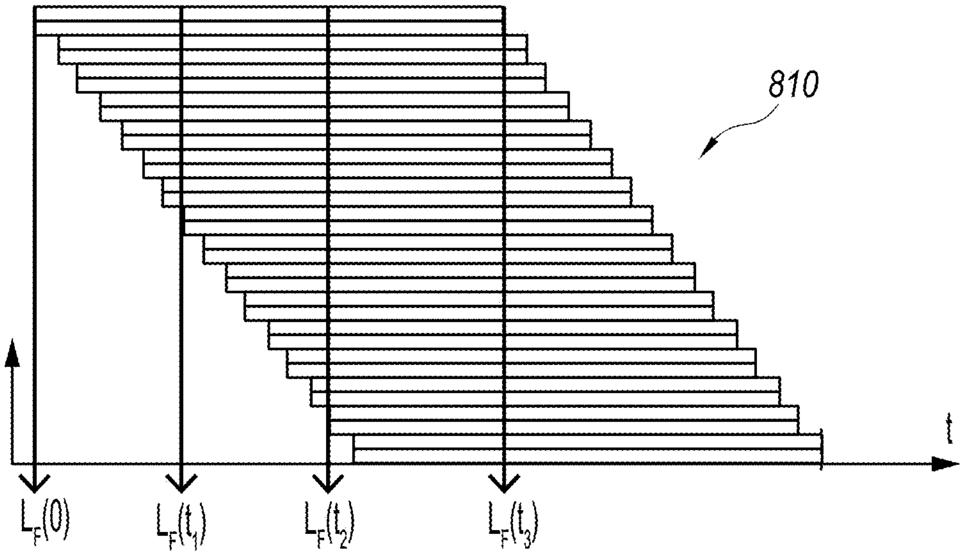
FIG. 8 is a plot illustrating (a) exposure periods for an example image frame and (b) four corresponding latent images frames that have been corrected for deblur and rolling-shutter distortion in accordance with various other embodiments of the present technology.

FIG. 8 is a plot 810 illustrating exposure periods for an image frame and four corresponding latent image frames $L_F(0)$, $L_F(t_1)$, $L_F(t_2)$, and $L_F(t_3)$ that have each been corrected for rolling-shutter distortion in accordance with various embodiments of the present technology. The four latent image frames $L_F(0)$, $L_F(t_1)$, $L_F(t_2)$, and $L_F(t_3)$ can be computed using corresponding CIS data and EVS data. More specifically, in accordance with the discussion of FIGS. 9A and 9B below, a deblur circuit (e.g., the deblur circuit 570 of FIG. 5, the deblur circuit 970*a* of FIG. 9A, the deblur circuit 970*b* of FIG. 9B, an on-chip deblur circuit) can compute a latent image frame $L_F(0)$ corresponding to time $t_0$ (representing a start time of an exposure period for a first few CIS rows) by (i) deblurring CIS data using corresponding EVS data accumulated during the exposure periods illustrated in FIG. 8 and (ii) correcting the CIS data for rolling-shutter distortion using EVS data accumulated prior to the starts of one or more of the exposure periods illustrated in FIG. 8.

In addition, three additional latent frames $L_F(t_1)$, $L_F(t_2)$, and $L_F(t_3)$ can be generated using video frame interpolation. For example, a downstream application processor (a) can receive accumulated EVS data from the deblur circuit before and during the exposure periods illustrated in FIG. 8, and (b) can utilize the accumulated EVS data, the latent image frame $L_F(0)$ computed by the deblur circuit, and/or raw CIS data captured during the exposure periods to interpolate the three additional latent frames $L_F(t_1)$, $L_F(t_2)$, and $L_F(t_3)$ shown in FIG. 8, such as using Equation 21 above. As part of this process, the downstream application processor can (a) synchronize the accumulated EVS data with the latent image frame $L_F(0)$ and/or corresponding CIS data; (b) calibrate a contrast threshold c; (c) deblur the latent image frame $L_F(s)$ and/or the corresponding CIS data with respect to time $t_1$, time $t_2$, and time $t_3$; (d) correct the latent image frame $L_F(0)$ for rolling shutter distortion with respect to time $t_1$, time $t_2$, and time $t_3$; and/or (e) compute the latent frames $L_F(t_1)$, $L_F(t_2)$, and $L_F(t_3)$ that serve as interpolated video/image frames in addition to the latent image frame $L_F(0)$.

Figure 9A:
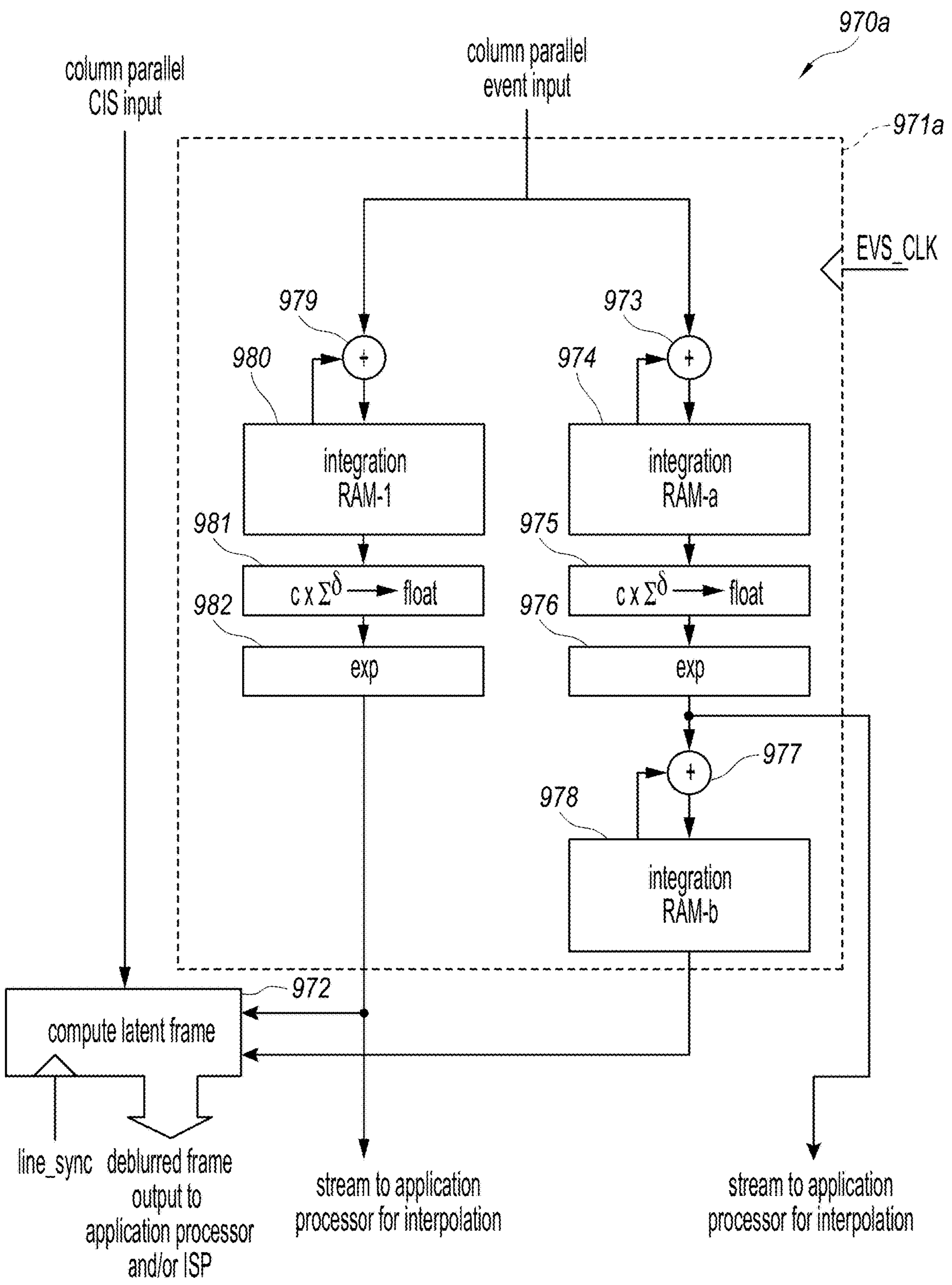
FIG. 9A is a partially schematic diagram of a deblur and rolling-shutter-distortion-correction circuit configured in accordance with various embodiments of the present technology.

FIG. 9A is a partially schematic diagram of a deblur and rolling shutter distortion correction circuit 970*a* ("deblur circuit 970*a*" or "rolling shutter distortion correction circuit 970*a*") configured in accordance with various embodiments of the present technology. The deblur circuit 970*a* can be an example of the deblur circuit 570 of FIG. 5, or of other deblur circuits configured in accordance with the present technology. As shown, the deblur circuit 970*a* includes a rolling shutter distortion correction and event-based double integral (EDI) computation block 971*a* ("computation block 971*a*") and a latent frame computation block 972. Operation of at least a portion of the computation block 971*a* can be clocked by a control signal EVS_CLK that at least generally follows the time continuous signal e(t) of Equation 13 above, an example of which is shown in plot 212 of FIG. 2. In other words, operation of at least a portion of the computation block 971*a* can be enabled whenever an event is triggered and read out from an EVS pixel. Operation of the latent frame computation block 972 can be clocked by a control signal line_sync. The control signal line_sync can be provided/controlled by a common control block of an image sensor corresponding to the deblur circuit 970*a*, such as the common control block 568 of the image sensor 530 of FIG. 5. In some embodiments, the control signal line_sync can correspond to the duration of the exposure period T, as shown in Equations 16 and 17 above. In these and other embodiments, the control signal line_sync can correspond to a duration of time extending between (i) a start of an exposure period for a first row of CIS pixels in a CIS pixel array and (ii) an end of an exposure period of a last row of CIS pixels in a CIS pixel array.

In the illustrated embodiment, the computation block 971*a* includes EDI components. The EDI components can be generally similar to the EDI components of the computation block 671 of the deblur circuit 670 of FIG. 6. For example, the EDI components of the computation block 971*a* include a counter 973, a first integration buffer 974, a product computation block 975, an exponential computation block 976, an integration computation block 977, and a second integration buffer 978. The counter 973 is also referred to herein as a "first counter," the product computation block 975 is also referred to herein as a "first product computation block," and the exponential computation block 976 is also referred to herein as a "first exponential computation block." The first integration buffer 974 and the second integration buffer 978 are also referred to herein as "EDI integration buffers."

The counter 973 can be an integer counter (e.g., an up/down counter) or another suitable type of counter for computing a running sum of events detected by each EVS pixel during an exposure period for CIS pixels corresponding to the EVS pixel, and the first integration buffer 974 can be configured to track/store the running sums. More specifically, the counter 973 and the first integration buffer 974 can be configured to compute the first, inner integral of the EDI model described above. For example, as event data is detected by an EVS pixel and streamed into the deblur circuit 970*a* during an exposure period for CIS pixels corresponding to that EVS pixel, the counter 973 can be enabled via the control signal EVS_CLK, which can cause the counter 973 to increment or decrement (depending on the polarity of the detected event) a running sum maintained by the first integration buffer 974 for that EVS pixel. For each EVS pixel, the running sum maintained by the first integration buffer 974 over time is equivalent to E(t) shown in Equation 14 above, an example of which is shown in plot 214 of FIG. 2. The buffer size of the first integration buffer 974 can be relatively small for such an implementation. As a specific example, assuming the duration of an exposure period for CIS pixels corresponding to an EVS pixel is 33 ms, the first integration buffer 974 can include a buffer size of approximately 10 bits/pixel. In some embodiments, a floating-point calculator can be used in lieu of the counter 973. In such embodiments, the first integration buffer 974 may have a larger or smaller buffer size.

The product computation block 975, the exponential computation block 976, the integration computation block 977, and the second integration buffer 978 can be configured to compute the second, outer integral of the EDI model described above. For example, the product computation block 975 can multiply running sums stored in the first integration buffer 974 by a contrast threshold parameter c, which is equivalent to $C_{log\text{-}TH}$ (described above with reference to Equations 6-12 and 15-17) and is assumed to remain constant. Thus, for each EVS pixel, the output of the product computation block 975 can be equivalent to $c\Sigma_{i\in[s,t]}p_i$. Thereafter, for each EVS pixel, the exponential computation block 976 can determine the exponential of the output of the product computation block 975, resulting in $\exp(c\Sigma_{i\in[s,t]}p_i)$ at the output of the exponential computation block 976.

As shown in FIG. 9A, the output of the exponential computation block 976 (representing the exponential of the output of the product computation block 975) can be provided (i) to the integration computation block 977 and (ii) to a downstream application processor, such as an off-chip application processor of an imaging system that includes a hybrid image sensor incorporating the deblur circuit 970*a*. As discussed in greater detail below, the application processor can be configured to use the output of the exponential computation block 976 to perform video frame interpolation. Because the exponential of the output of exponential computation block 976 includes accumulated EVS data, corresponding raw EVS data read out of the EVS pixels of a corresponding hybrid image sensor can be discarded in some embodiments without reading the corresponding raw EVS data out of the hybrid image sensor and/or to the application processor. Alternatively, the corresponding raw EVS data can be read out of the hybrid image sensor and/or to the application processor, such as in addition to the accumulated EVS data and/or the output of the exponential computation block 976. In some embodiments, accumulated EVS data stored to the first integration buffer 974 can be read out to the downstream application processor (e.g., for performing video frame interpolation), such as without first providing the accumulated EVS data to the product computation block 975 and/or the exponential computation block 976. In these embodiments, the downstream application processor can include one or more EDI components, such as a product computation block and/or an exponential computation block, used for deblurring corresponding CIS data and/or for interpolating additional video/image frames.

The integration computation block 977 of the deblur circuit 970*a* can, for each EVS pixel, continuously integrate the output of the exponential computation block 976 over time. More specifically, the integration computation block 977 can integrate each of the outputs of the exponential computation block 976 from time $t_s$ (corresponding to the start of an exposure period for CIS pixels corresponding to a respective EVS pixel) to time t, ending at time $t_{s+T}$ (corresponding to the end of the exposure period for the CIS pixels corresponding to the respective EVS pixel). The second integration buffer 978 can track/store the results of this time continuous integration, which are each equivalent to $$\int_{s}^{s+T}\exp\left(c\sum\nolimits_{i\in[s,t]}p_i\right)dt$$

at the end of each corresponding exposure period. Example results for an EVS pixel output by the integration computation block 977 are shown in the plot 216 of FIG. 2.

Each of the computations performed by the product computation block 975, the exponential computation block 976, the integration computation block 977, and the second integration buffer 978 can be performed in floating point representation, such as 9-bit mantissa and 4-bit exponent. In addition, although operation of the counter 973 and/or the first integration buffer 974 can be clocked by the control signal EVS_CLK, the product computation block 975, the exponential computation block 976, the integration computation block 977, and/or the second integration buffer 978 can be enabled to continuously perform their respective operations over time. As a specific example, in some embodiments, operation of the integration computation block 977 is not clocked by the control signal EVS_CLK nor triggered by events. Rather, the integration computation block 977 is configured to continuously integrate the outputs of the exponential computation block 976 over time, at least between time $t_s$ and time $t_{s+T}$ corresponding to the start and stop times, respectively, of a corresponding exposure period. In these embodiments, operation of the product computation block 975 and/or the exponential computation block 976 can be clocked by the control signal EVS_CLK or enabled to continuously perform their respective operations over time.

Because events detected at each EVS pixel during a corresponding exposure period are accumulated by the EDI components of the computation block 971*a*, raw EVS data input into the computation block 971*a* of the deblur circuit 970*a* during a corresponding exposure period can be discarded once events of the raw EVS data have been accumulated by the EDI components of the computation block 971*a*. As a result, in some embodiments, the second integration buffer 978 stores/maintains only the accumulated results of the integration computation block 977, meaning that the second integration buffer 978 can have a relatively small buffer size (e.g., ~9 MB, such as about 8.625 MB or about 13 bits/pixel) in comparison to buffers utilized in off-chip, event-guided deblur solutions. In addition, because the raw EVS data can be discarded rather than output from an image sensor corresponding to the deblur circuit 970*a*, IO throughput and power consumption can be reduced in comparison to off-chip, event-guided deblur solutions in which the raw EVS data is output from the image sensor to an external application processor. In other embodiments of the present technology, all or a subset of the raw EVS data can be stored and/or output from the image sensor after events in the raw EVS data are accumulated.

After the exposure period ends, CIS data can be read out from CIS pixels of the image sensor and streamed into the latent frame computation block 972 of the deblur circuit 970*a*. At this point, the latent frame computation block 972 can deblur the CIS data by combining/fusing the CIS data with the accumulated EVS data stored in the second integration buffer 978 of the computation block 971*a*. More specifically, for one or more of the CIS pixels, the latent frame computation block 972 can compute one or more latent image frames L(s), each corresponding to a time $t_s$ (representing a start of a corresponding exposure period), by performing the operation specified in Equation 17 above using CIS data captured by the one or more CIS pixels and corresponding EVS data accumulated in the second integration buffer 978. Because CIS data can be read directly into the latent frame computation block 972 at or after the end of an exposure period and because EVS data accumulated in the second integration buffer 978 is readily available and already aligned with the CIS data at this time (as discussed in greater detail below), no CIS frame buffer is required to perform on-chip deblur using the deblur circuit 970*a*. Therefore, the deblur circuit 970*a* and/or the corresponding image sensor can lack a CIS frame buffer in some embodiments. In other embodiments, the deblur circuit 970*a* and/or the corresponding image sensor can include a CIS frame buffer, such as in embodiments in which raw CIS data can be output in addition to fused image/video data.

As discussed above with reference to FIGS. 7 and 8, a rolling shutter can be used to capture and read out CIS data from the CIS pixel array. Therefore, due to use of a rolling shutter, there is a delay between when the exposure period for a first few CIS pixels rows begins and when the exposure periods for each of the other pixels rows (including last few pixel rows) begin. As a result, rolling shutter distortion can be present in latent image frames L(s) computed using the EDI components of the computation block 971*a*, especially when there is motion in an external scene that occurs between a start of a first exposure period for an image frame and a start time of another exposure period corresponding to the image frame. As such, in embodiments in which a rolling shutter is used, the computation block 971*a* of FIG. 9A can additionally include rolling shutter distortion correction components that are usable to correct latent image frame L(s) for rolling shutter distortion.

As shown in FIG. 9A, rolling shutter distortion correction components of the computation block 971*a* can include a counter 979 (also referred to herein as a "second counter"), an integration buffer 980 (also referred to herein as a "third integration buffer"), a product computation block 981 (also referred to herein as a "second product computation block"), and an exponential computation block 982 (also referred to herein as a "second exponential computation block"). The integration buffer 980 is also referred to herein as a rolling shutter distortion correction (RSDC) integration buffer.

The counter 979 can be an integer counter (e.g., an up/down counter) or another suitable type of counter for computing a running sum of events detected by each EVS pixel between time $t_0$ (corresponding to a start of a first exposure period for a given image frame) and time $t_s$ (representing a start of another exposure period for CIS pixels corresponding to the EVS pixel, for the given image frame). In addition, the integration buffer 980 can be configured to store/maintain, for each EVS pixel, the running sum computed by the counter 979 between time $t_0$ and time $t_s$. More specifically, the counter 979 and the integration buffer 980 can be configured to compute, for each EVS pixel, an integral of events occurring between (i) time $t_0$ and (ii) a start of an exposure period for CIS pixels corresponding to the EVS pixel (also referred to herein as time $t_s$).

For example, consider the last two CIS pixel rows shown in the plot 810 of FIG. 8. Referring to FIGS. 8 and 9A together, when an EVS pixel corresponding to the last two CIS pixel rows detects events between time $t_0$ and time $t_s$, corresponding event data can be read out from the EVS pixel into the computation block 971*a* of the deblur circuit 970*a*. In turn, the counter 979 of the deblur circuit 970*a* can be enabled (e.g., via the control signal EVS_CLK or another control signal) to increment or decrement (depending on the polarities of the detected events) a running sum maintained by the integration buffer 980 for that EVS pixel. The running sum for the EVS pixel over time is equivalent to E' (t) shown in Equation 18 above, an example of which is shown in plot 218 of FIG. 2. In some embodiments, starting at time $t_s$ (corresponding to the start of the exposure period for CIS pixels of the last two rows of CIS pixels), events detected by the EVS pixel can then be accumulated by the EDI components of the computation block 971*a* (e.g., as opposed to the rolling shutter distortion correction components of the computation block 971*a*).

Referring again to FIG. 9A, the buffer size of the integration buffer 980 can be relatively small in some embodiments. As a specific example, assuming a readout speed of 30 frames per second, a maximum delay between a start of a first exposure period for a given frame and a start of a last exposure period for the given frame can be approximately 33 ms. Continuing with this example, assuming (a) use of a 12 megapixel CIS pixel array, (b) use of a 3 megapixel EVS pixel array, and (c) use of an EVS readout rate of approximately 50 nanosecond per row (meaning the entire EVS pixel array can be read out once every 33 ms), the counter 979 and the integration buffer 980 can be expected to accumulate up to 400 events between a start of a first exposure period for the given frame and a start of a last exposure period for the given frame. Because events have a positive or negative polarity, possible values of running sums computed by the counter 979 and the integration buffer 980 for each EVS pixel can therefore range from approximately −400 to approximately +400. As such, the integration buffer 980 can include a buffer size of approximately 10 bits/pixel in some embodiments. In these and other embodiments, a floating-point calculator can be used in lieu of the counter 979. In such embodiments, the integration buffer 980 may have a larger or smaller buffer size than 10 bits/pixel.

The product computation block 981 can multiply running sums stored in the integration buffer 980 by the contrast threshold parameter c, which is equivalent to $C_{log\text{-}TH}$ (described above with reference to Equations 6-12, 15-17, 19, and 20) and is assumed to remain constant. Thus, for each EVS pixel, the output of the product computation block 981 can be equivalent to $c\Sigma_{i\in[0,t]}p_i$ assuming the contrast threshold parameter c remains constant. Thereafter, for each EVS pixel, the exponential computation block 982 can determine the exponential of the output of the product computation block 981, resulting in exp $(c\Sigma_{i\in[0,t]}p_i)$ at the output of the exponential computation block 982. The exponential of the output of the product computation block 981 determined by the exponential computation block 982 can be output (i) to the latent frame computation block 972 of the deblur circuit 970*a* and (ii) to a downstream application processor, such as an off-chip application processor of an imaging system that includes a hybrid image sensor incorporating the deblur circuit 970*a*. As discussed in greater detail below, the application processor can be configured to use the output of the exponential computation block 982 to perform video frame interpolation. Because the exponential at the output of the exponential computation block 982 includes accumulated EVS data, corresponding raw EVS data read out of the EVS pixels of a corresponding hybrid image sensor can be discarded in some embodiments without reading the corresponding raw EVS data out of the hybrid image sensor and/or to the application processor. Alternatively, the corresponding raw EVS data can be read out of the hybrid image sensor and/or to the application processor, such as in addition to the accumulated EVS data and/or the output of the exponential computation block 976.

In some embodiments, computations performed by the product computation block 981 and/or the exponential computation block 982 can be performed in floating point representation, such as 9-bit mantissa and 4-bit exponent. Additionally, or alternatively, although operation of the counter 979 and/or the integration buffer 980 can be clocked by the control signal EVS_CLK or another control signal, the product computation block 981 and/or the exponential computation block 982 can be enabled to continuously perform their respective operations over time. Alternatively, operation of the product computation block 981 and/or the exponential computation block 982 can also be clocked by the control signal EVS_CLK.

As discussed above, after an exposure period for CIS pixels ends, CIS data captured by the CIS pixels can be read out into the latent frame computation block 972 of the deblur circuit 970*a*. Per the discussion above, the latent frame computation block 972 can deblur the CIS data by combining/fusing the CIS data with accumulated EVS data stored in the second integration buffer 978 of the computation block 971*a*. In addition, the latent frame computation block 972 can correct the CIS data for rolling shutter distortion using the corresponding output from the exponential computation block 982 of the computation block 971*a*. More specifically, the latent frame computation block 972 can compute a latent image frame L(s) corresponding to time $t_s$ (the start of the exposure period) by performing the operation specified in Equation 17 above for each EVS pixel. Furthermore, the latent frame computation block 972 can, for each pixel, compute a latent image frame L(0) corresponding to time $t_0$ (the start of the corresponding image frame, such as the start of the first exposure period for the corresponding image frame) using (i) the latent image frame L(s), (ii) the corresponding output from the exponential computation block 982, and/or (iii) the operation specified in Equation 20 above. The latent image frame L(0) can correspond to deblurred, rolling-shutter-distortion-corrected CIS data, and can be output from the latent frame computation block 972 to the application processor and/or an image signal processor of a corresponding imaging system.

The deblur circuit 970*a* of FIG. 9A can be used when exposure periods for consecutive image frames do not overlap in time. Stated another way, as long as exposure periods for immediately adjacent frames do not overlap in time, a single (e.g., only one) instance of the counter 979 and the integration buffer 980 can be used in the rolling shutter distortion correction components of the computation block 971*a* of the deblur circuit 970*a* of FIG. 9A. Such a relationship, however, limits a maximum framerate usable by a corresponding image sensor.

For example, a maximum framerate usable by a corresponding image sensor can be increased by starting a first exposure period for a second frame before an end of a last exposure period for a first frame. Such an arrangement, however, requires tracking both (a) events corresponding to a first image frame and (b) events corresponding to a consecutive image frame. Implementing a ping pong buffer into the rolling shutter distortion correction components of a deblur circuit can enable such functionality.

Figure 9B:
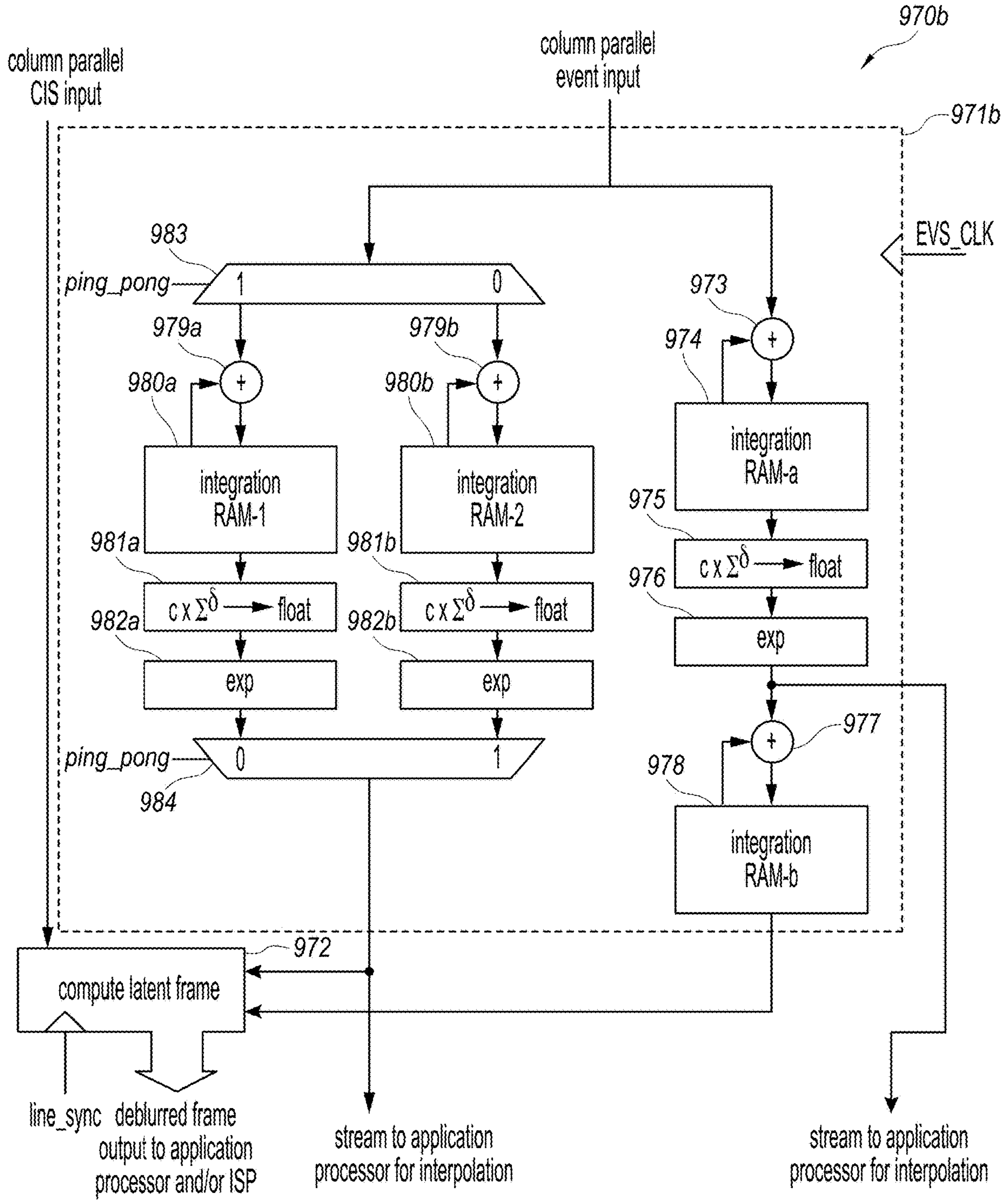
FIG. 9B is a partially schematic diagram of another deblur and rolling-shutter-distortion-correction circuit configured in accordance with various embodiments of the present technology.

For example, FIG. 9B is a partially schematic diagram of a deblur and rolling shutter distortion correction circuit 970*b* ("deblur circuit 970*b*" or "the rolling shutter distortion correction circuit 970*b*") configured in accordance with various embodiments of the present technology. The deblur circuit 970*b* can be an example of the deblur circuit 570 of FIG. 5, or of other deblur circuits configured in accordance with the present technology. As shown, the deblur circuit 970*b* is generally similar to the deblur circuit 970*a* of FIG. 9A. Therefore, similar reference numbers are used across FIGS. 9A and 9B to denote identical or at least generally similar components, and a detailed description of the deblur circuit 970*b* is largely omitted here for the sake of brevity in light of the detailed description of the deblur circuit 970*a* provided above.

As shown in FIG. 9B, the deblur circuit 970*b* includes a rolling shutter distortion correction and event-based double integral (EDI) computation block 971*b* ("computation block 971*b*") and a latent frame computation block 972. The computation block 971*b* includes EDI components (e.g., a counter 973, a first integration buffer 974, a product computation block 975, an exponential computation block 976, an integration computation block 977, and a second integration buffer 978. The counter 973 is also referred to herein as a "first counter," the product computation block 975 is also referred to herein as a "first product computation block," and the exponential computation block 976 is also referred to herein as a "first exponential computation block." The first integration buffer 974 and the second integration buffer 978 are also referred to herein as "EDI integration buffers."

The computation block 971*b* of the deblur circuit 970*b* further includes rolling shutter distortion correction components. In contrast with the rolling shutter distortion correction components of the computation block 971*a* of the deblur circuit 970*a* of FIG. 9A, the rolling shutter distortion correction components of the computation block 971*b* of the deblur circuit 970*b* of FIG. 9B include a ping pong buffer. More specifically, the rolling shutter distortion correction components include a routing switch 983, a counter 979*a* (also referred to herein as a "second counter"), a counter 979*b* (also referred to herein as a "third counter"), an integration buffer 980*a* (also referred to herein as a "third integration buffer"), an integration buffer 980*b* (also referred to herein as a "fourth integration buffer"), and a multiplexer 984. The integration buffer 980*a* and the integration buffer 980*b* are also referred to herein as "rolling shutter distortion correction (RSDC) integration buffers."

As shown, the rolling shutter distortion components of the computation block 971*b* also include a product computation block 981*a* (also referred to herein as a "second product computation block"), a product computation block 981*b* (also referred to herein as a "third product computation block), an exponential computation block 982*a* (also referred to herein as a "second exponential computation block"), and an exponential computation block 982*b* (also referred to herein as a "third exponential computation block"). In other embodiments, the rolling shutter distortion components can include a single (e.g., only one) instance of a product computation block 981 and/or a single (e.g., only one) instance of an exponential computation block 982. In such embodiments, the product computation block 981 and the exponential computation block 982 can be positioned downstream the multiplexer 984, such as between the multiplexer 984 and the latent frame computation block 972. Continuing with this example, the product computation block 981 and the exponential computation block 982 can be configured to perform operations on running sums output from the integration buffer 980*a* or the integration buffer 980*b* via the multiplexer 984.

The counter 979*a* and the counter 979*b* of the deblur circuit 970*b* can be generally similar to the counter 979 of the deblur circuit 970*a* of FIG. 9A, and the integration buffer 980*a* and the integration buffer 980*b* can be generally similar to the integration buffer 980 of the deblur circuit 970*a* of FIG. 9A. In addition, the product computation block 981*a* and the product computation block 981*b* can be generally similar to the product computation block 981 of the deblur circuit 970*a* of FIG. 9A, and the exponential computation block 982*a* and the exponential computation block 982*b* can be generally similar to the exponential computation block 982 of the deblur circuit 970*a* of FIG. 9A. Thus, a detailed description of each of these rolling shutter distortion correction components of the deblur circuit 970*b* is omitted here for the sake of brevity in light of the detailed description of the similar components of the deblur circuit 970*a* provided above with reference to FIG. 9A.

In the illustrated embodiment, the counter 979*a*, the integration buffer 980*a*, the product computation block 981*a*, and the exponential computation block 982*a* (collectively referred to herein as a "first set of rolling shutter distortion correction (RSDC) components") can correspond to different frames from the counter 979*b*, the integration buffer 980*b*, the product computation block 981*b*, and the exponential computation block 982*b* (collectively referred to herein as a "second set of RSDC components"). For example, the first set of RSDC components can be used to accumulate events detected during a first frame, and the second set of RSDC components can be used to accumulate events detected during a second, consecutive (or immediately adjacent) frame. Thereafter, the first set of RSDC components can be used to accumulate events detected during a third frame; the second set of RSDC components can be used to accumulate events detected during a fourth frame; and so on. Therefore, continuing with the above example, events detected by EVS pixels between time $t_0$ and a start time $t_s$ of a corresponding exposure period for a first frame can be accumulated using the first set of RSDC components. In addition, events detected by EVS pixels between time $t_0$ and a start time $t_s$ of a corresponding exposure period for a second frame can be accumulated using the second set of RSDC components.

Routing of events detected by EVS pixels to the appropriate set of RSDC components can be handled via the routing switch 983. More specifically, the routing switch 983 is configured to receive a control signal ping pong. In some embodiments, the control signal ping pong can be provided and/or controlled by a common control block of an image sensor corresponding to the deblur circuit 970*b*, such as the common control block 568 of the image sensor 530 of FIG. 5. Alternatively, the control signal ping pong can be provided/controlled by another control block of an image sensor corresponding to the deblur circuit 970*b*, such as the column control circuitry 562 and/or the column-scan readout circuitry 553 of the image sensor 530 of FIG. 5.

The control signal ping pong can be used to control into which counter (the counter 979*a* or the counter 979*b*) an event detected by an EVS pixel is routed via the routing switch 983. For example, between time $t_0$ and time $t_s$ for a first frame, the control signal ping pong can be transitioned or held in a first state (e.g., an asserted state, a high state, a "1" state). As such, events detected by EVS pixels between time $t_0$ and a start time $t_s$ of a corresponding exposure period for the first frame can be routed to the counter 979*a* via the routing switch 983. Thereafter, between time $t_0$ and time $t_s$ for a second frame, the control signal ping pong can be transitioned or held in a second state (e.g., a de-asserted state, a low state, a "0" state). As a result, events detected by EVS pixels between time $t_0$ and a start time $t_s$ of an exposure period of the second frame can be routed to the counter 979*b* via the routing switch 983. Events detected by an EVS pixel during an exposure period for CIS pixels corresponding to that EVS pixel can be routed to the counter 973 of the EDI components of the computation block 971*b*, consistent with the description of the EDI components of the computation block 971*a* of the deblur circuit 970*a* above with reference to FIG. 9A.

Referring now to the multiplexer 984, the control signal ping pong can be used to control which one of the inputs into the multiplexer 984 (e.g., which of the outputs of the exponential computation block 982*a* and the exponential computation block 982*b*) is output from the multiplexer 984 (e.g., to the latent frame computation block 972 and/or a downstream application processor). In the illustrated embodiment, when the control signal ping pong is transitioned or held in the first state, the output of the exponential computation block 982*b* can be routed, via the multiplexer 984, to (i) a downstream application processor and (ii) the latent frame computation block 972. On the other hand, when the control signal ping pong is transitioned or held in the second state, the output of the exponential computation block 982*a* can be routed, via the multiplexer 984, to (i) the downstream application processor and (ii) the latent frame computation block 972. Thus, as detected events are routed to the counter 979*a* via the routing switch 983, the output of the exponential computation block 982*b* can be passed to the downstream application processor and the latent frame computation block 972 via the multiplexer 984. In addition, as detected events are routed to the counter 979*b* via the routing switch 983, the output of the exponential computation block 982*a* can be passed to the downstream application processor and the latent frame computation block 972 via the multiplexer 984. In this manner, the ping pong buffer enables roller shutter distortion correction of CIS data corresponding to two different frames that at least partially overlap in time.

Figure 10:
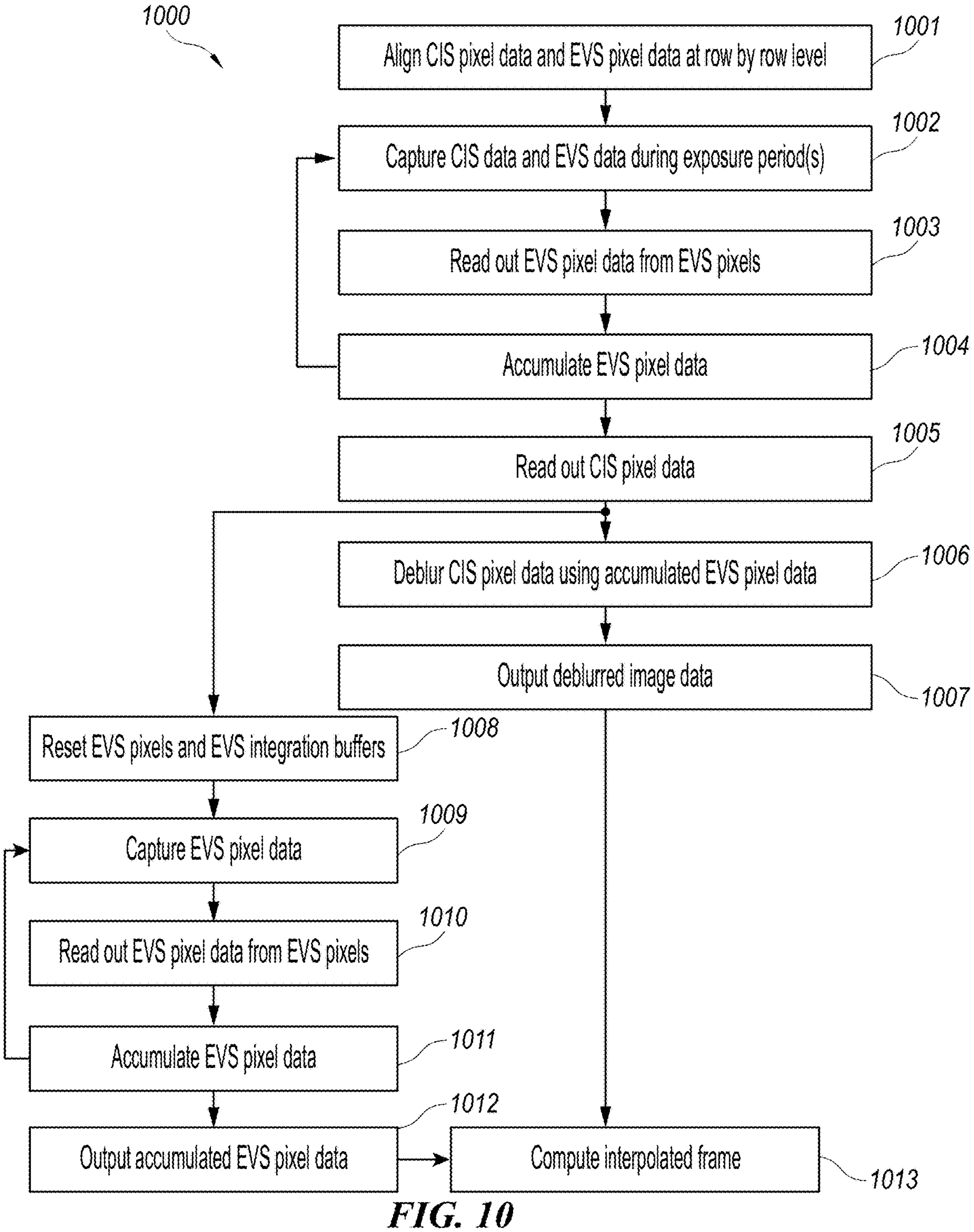
FIG. 10 is a flow diagram illustrating a method of operating an image sensor in accordance with various embodiments of the present technology.

FIG. 10 is a flow diagram illustrating a method 1000 of operating an imaging system in accordance with various embodiments of the present technology. For example, the method 1000 can be a method of (i) performing (e.g., on-chip) deblurring of CIS data and/or (ii) video frame interpolation. The method 1000 is illustrated as a series of blocks 1001-1013 or steps. All or a subset of one or more of the blocks 1001-1013 can be executed by devices or components of an imaging system configured in accordance with various embodiments of the present technology. For example, all or a subset of one or more of the blocks 1001-1013 can be performed by a hybrid image sensor, CIS pixels of a pixel array, EVS pixels of an event driven sensing array, a common control block, row/column control circuitry, column readout circuitry, column-scan readout circuitry, a deblur block or circuit, and/or an application processor. All or a subset of one or more of the blocks 1001-1013 of the method 1000 can be executed in accordance with the description of FIGS. 1-9B above and/or with the description below. Indeed, several of the blocks 1001-1013 of the method 1000 are described below with reference to FIGS. 11-13B.

The method 1000 begins at block 1001 by aligning CIS pixel data with corresponding EVS pixel data. In some embodiments, aligning CIS pixel data with corresponding EVS pixel data can be performed at least in part using a common control block of a corresponding image sensor. For example, the common control block can synchronize operations of row/column control circuitry and/or a deblur block of the image sensor, such as by using one or more control signals.

Aligning the CIS pixel data with the corresponding EVS pixel data at block 1001 can include aligning/synchronizing the timings of exposure period(s) of one or more rows of CIS pixels with event accumulation period(s) of one or more corresponding EVS pixels. In some embodiments, aligning the exposure periods(s) with an event accumulation period can include aligning the exposure period(s) with one another and/or with the event accumulation period such that the exposure period(s) and the event accumulation period have a same start time $t_s$ and/or a same end time $t_{s+T}$. For example, prior to the start of the exposure period(s) and the event accumulation period, CIS pixels of one or more CIS pixel rows can be reset at a same time as (a) one another and/or (b) one or more EVS pixels of one or more EVS pixel rows that correspond to the one or more CIS pixel rows. As a result, the exposure period(s) for the CIS pixels and the event accumulation period for the EVS pixel(s) can start at the same time as one another. In addition, assuming that the exposure period(s) and the event accumulation period have a same duration, aligning the start times of the exposure period(s) and the event accumulation period with one another can also align their stop times.

Furthermore, as discussed above with reference to FIGS. 6, 9A, and 9B, a deblur circuit of an image sensor of the present technology can be configured to (a) integrate events to compute a running summation of events detected by an EVS pixel, (b) store the running summation in a first integration buffer, (c) integrate the exponential of the product of (i) the running summation and (ii) a contrast threshold parameter, and (d) store the results of the integration of the exponential in second integration buffer. Therefore, to ensure that the running summation stored in the first integration buffer of the deblur circuit and the results of the integration of the exponential stored in the second integration buffer correspond to only events detected by the EVS pixel during the corresponding event accumulation period (which, as discussed above, can be aligned with exposure period(s) of corresponding CIS pixels), the first integration buffer and/or the second integration buffer can be reset before the aligned start time of the event accumulation period and the exposure period(s). In some embodiments, the first integration buffer and/or the second integration buffer can be reset at a same time as the EVS pixels and/or the corresponding CIS pixels.

In addition, accumulated EVS pixel data can be output to and stored in one or more EVS frame buffers (e.g., of a downstream application processor) during and/or after integration periods for CIS pixels used to capture CIS pixel data. For example, the running summation stored in the first integration buffer and/or exponentials output from an exponential computation block can be provided to one or more EVS frame buffers. Thus, to ensure that accumulated EVS pixel data stored in the EVS frame buffer(s) corresponds to only events that relate to a given image frame, corresponding portions of the EVS frame buffer(s) can be reset before the aligned state time of the event accumulation period and the exposure period(s). Corresponding portions of CIS key frame buffer(s) (e.g., of a downstream application processor) may also be reset before the aligned start time of the event accumulation period and the exposure period(s). In some embodiments, corresponding portions of the EVS frame buffer(s) and/or the CIS key frame buffer(s) can be reset at a same time as the EVS pixels and/or the corresponding CIS pixels.

Figure 11:
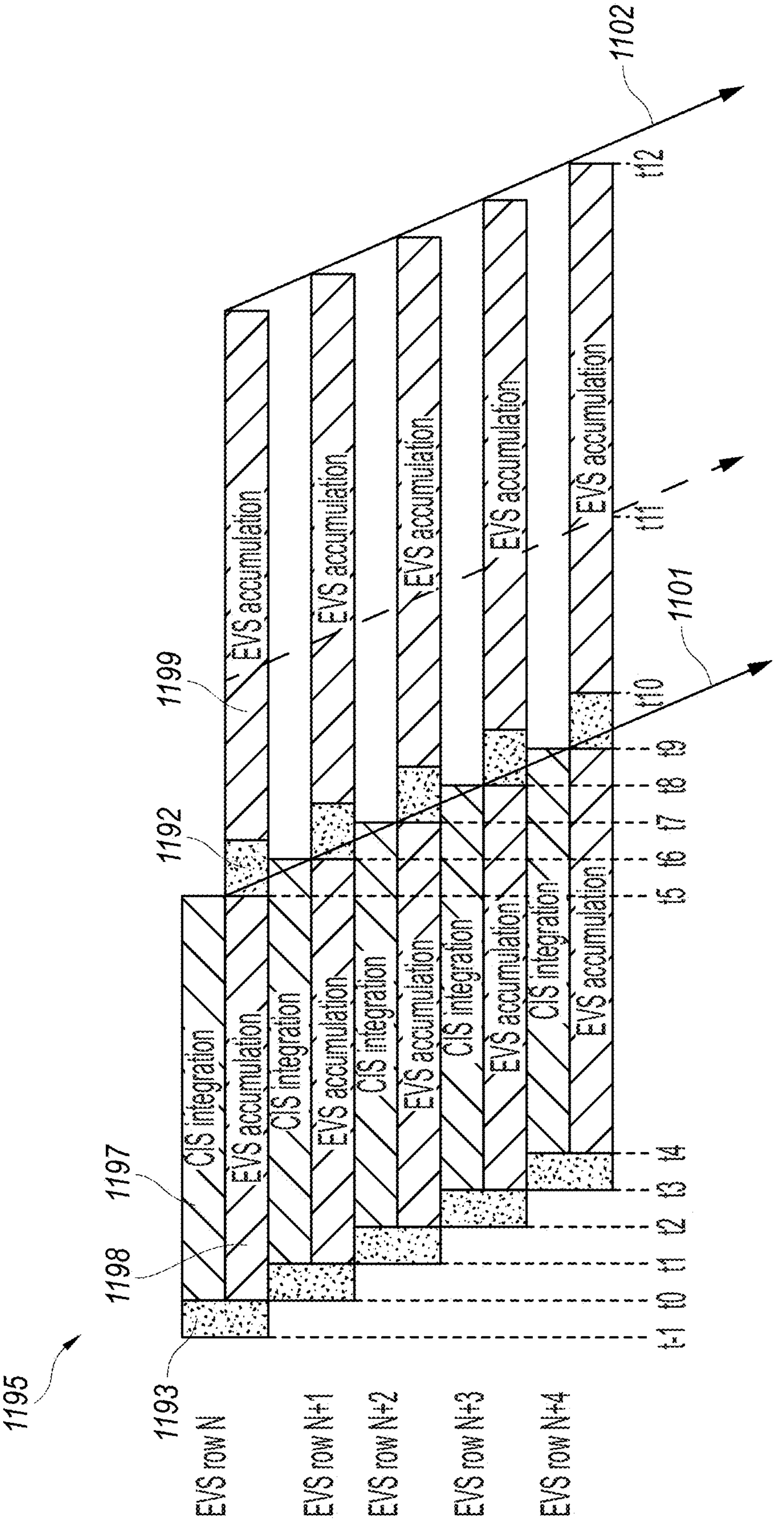
FIGS. 11 and 12 are timing diagrams corresponding to methods of operating an image sensor and/or a corresponding imaging system in accordance with various embodiments of the present technology.
Figure 12:
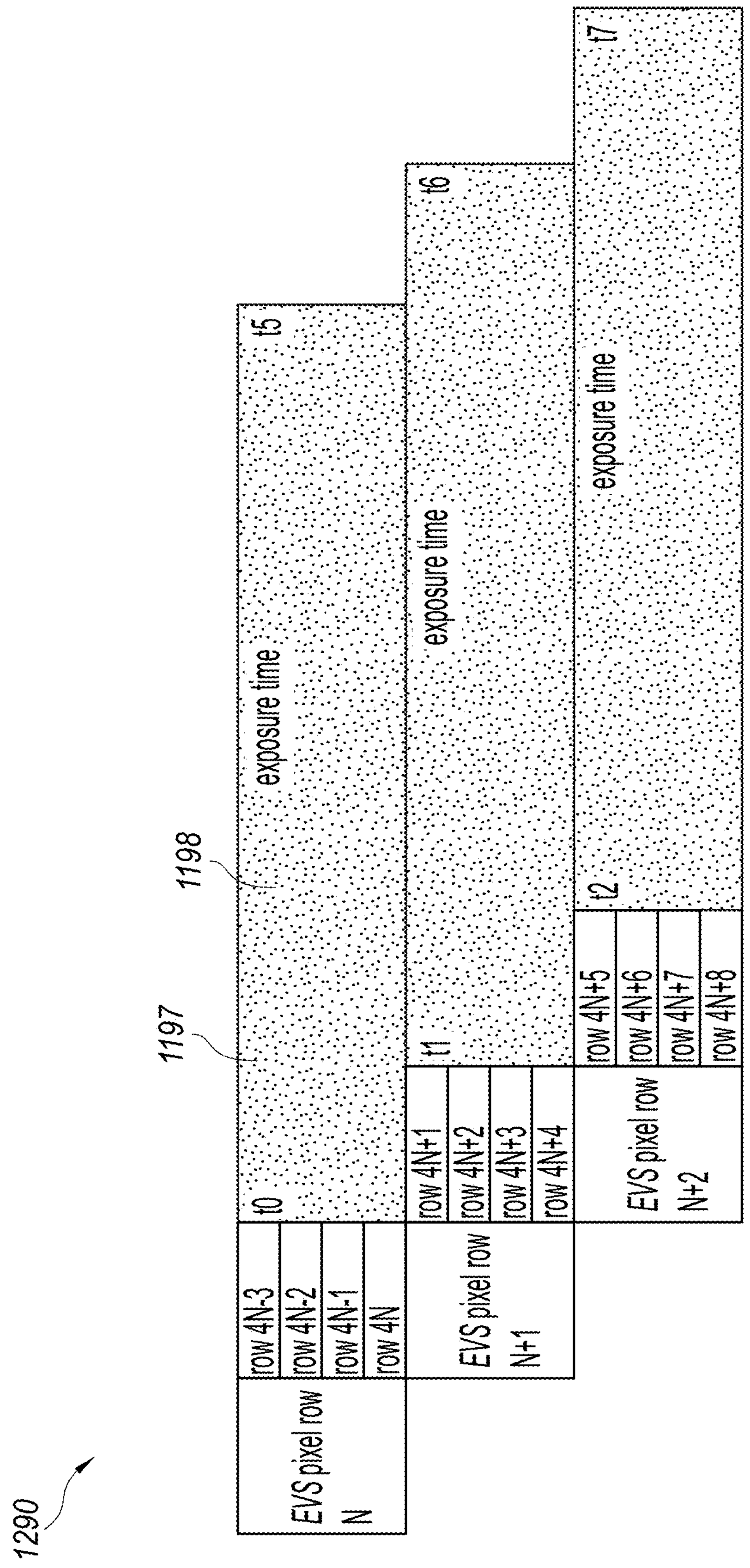

For the sake of clarity and understanding of the alignment conducted at block 1001 of the method 1000, consider FIGS. 11 and 12 that illustrate timing diagrams 1195 and 1290, respectively, in accordance with various embodiments of the present technology. Referring first to FIG. 12, the timing diagram 1290 illustrates three EVS pixel rows (EVS pixel rows N, N+1, and N+2) and twelve CIS pixel rows (CIS pixel rows 4N−3 to 4N+8). In the illustrated embodiment, each of the EVS pixel rows N, N+1, and N+2 corresponds to four of the twelve CIS pixel rows shown. For example, EVS pixel row N corresponds to CIS pixel rows 4N, 4N−1, 4N−2, and 4N−3. In other words, EVS data captured by EVS pixel(s) of EVS pixel row N can be used for event-guided deblur of CIS data captured by CIS pixels of CIS pixel rows 4N, 4N−1, 4N−2, and 4N−3.

CIS data captured by CIS pixels of the CIS pixel rows 4N, 4N−1, 4N−2, and 4N−3 is frame-based and is synchronously read out after each corresponding exposure period ends. In many active pixel sensors, CIS data is read out row-by-row. In such configurations, different exposure period start and stop times are often used for the different rows. For example, in many active pixel sensors, CIS pixels of CIS pixel row 4N often will have a first exposure period that starts and stops at different times from a second exposure period used for CIS pixels of CIS pixel row 4N−1. This can be problematic for event-guided deblur when the CIS pixel row 4N and the CIS pixel row 4N−1 correspond to a same EVS pixel row because the misalignment between the first exposure period and the second exposure period means that the start and/or stop times for an event accumulation period used for the corresponding EVS pixel row will be different from the start and/or stop times of the first exposure period and/or the second exposure period. As a result, EVS data captured by an EVS pixel of the EVS pixel row will be misaligned from CIS data captured by CIS pixels of CIS pixel row 4N and/or CIS pixel row 4N−1. Such misalignment can affect the accuracy and/or efficacy of event-guided deblur operations performed on the CIS data and/or may require additional memory/processing to align the CIS data with the EVS data post data capture and/or readout.

To address this concern, at block 1001 of the method 1000, the exposure periods of CIS pixels rows corresponding to a same EVS pixel row can be aligned with one another and with an event accumulation period of the EVS pixel row. For example, as shown in FIG. 12, the CIS pixel rows 4N, 4N−1, 4N−2, and 4N−3 all correspond to EVS pixel row N. Thus, at block 1001, exposure periods 1197 for CIS pixel rows 4N, 4N−1, 4N−2, and 4N−3 can be aligned with one another and with an event accumulation period 1198 of the EVS pixel row N. As a result, the exposure periods 1197 and the event accumulation period 1198 can each start at time t0. In addition, because the durations of the exposure periods 1197 and the event accumulation period 1198 are the same, alignment of the start times at time t0 can align the ends times of the exposure periods 1197 and the event accumulation period 1198 at time t5. In this manner, EVS data captured by EVS pixels of the EVS pixel row Nis aligned with CIS data captured by CIS pixels of CIS pixel rows 4N, 4N−1, 4N−2, and 4N−3. The alignment between (i) the exposure/integration periods 1197 for CIS pixel rows and (ii) the event/EVS accumulation period 1198 for the EVS row N is further shown in the timing diagram 1195 of FIG. 11.

Continuing with the above example, alignment between the exposure periods 1197 and the event accumulation period 1198 can be achieved by resetting the EVS pixels of the EVS pixel row N and the CIS pixels of the CIS pixel rows 4N, 4N−1, 4N−2, and 4N−3 at a same time and/or before the start time t0. For example, referring to FIG. 11, the EVS pixels of the EVS pixel row N and the CIS pixels of the CIS pixel rows 4N, 4N−1, 4N−2, and 4N−3 can each be reset in a time period 1193 preceding the start time t0 of the exposure periods 1197 and the event accumulation period 1198.

In addition, to ensure that deblur computations performed by a deblur circuit of a corresponding image sensor correspond to only the exposure periods 1197 of the CIS pixel rows 4N, 4N−1, 4N−2, and 4N−3 and the event accumulation period 1198 of the EVS pixel row N, a first integration buffer and/or a second integration buffer of the deblur circuit can be reset before the start time t0, such as (i) within the time period 1193 of FIG. 11 and/or (ii) at a same time as the EVS pixels of the EVS pixel row N and the CIS pixels of the CIS pixel rows 4N, 4N−1, 4N−2, and 4N−3. In some embodiments, portions of an EVS frame buffer (e.g., of a downstream application processor) that correspond to the EVS pixels of EVS pixel row N and/or portions of a CIS key frame buffer (e.g., of a downstream application processor) that correspond to the CIS pixels of the CIS pixel rows 4N, 4N−1, 4N−2, and 4N−3, can additionally be reset before the start time t0, such as (i) within the time period 1193 of FIG. 11 and/or (ii) at a same time as the EVS pixels of the EVS pixel row N and the CIS pixels of the CIS pixel rows 4N, 4N−1, 4N−2, and 4N−3. The other EVS pixels rows (e.g., the EVS pixel rows N+1, N+2, N+3, N+4, etc.) and the other CIS pixel rows (e.g., 4N+1, 4N+2, . . . , 4N+8, etc.) can be operated in a similar manner.

Referring again to FIG. 10, the method 1000 can continue by at block 1002 by (a) capturing CIS data using CIS pixels during corresponding exposure periods and (b) capturing EVS data (also referred to herein as "EVS pixel data" or as "event data") using EVS pixels. Referring again to FIG. 11 for the sake of example, CIS pixels of CIS pixel rows that correspond to EVS pixel row N can integrate photogenerated charge in the CIS pixels during the exposure period 1197 that extends from start time t0 to stop time t5. Simultaneously, the EVS pixel(s) of the EVS pixel row N can asynchronously detect events during the aligned EVS accumulation period 1198 that also extends from start time t0 to stop time t5.

In some embodiments, EVS pixels can be selectively enabled to capture EVS data (e.g., selectively enabled to detect events) during a corresponding event accumulation period. For example, referring to FIG. 11, an EVS pixel of EVS pixel row N can be enabled at (or shortly before) the start time t0 of the event accumulation period 1198 such that the EVS pixel is configured to detect events that occur during the event accumulation period 1198 between time t0 and time t5.

At block 1003, the method 1000 continues by reading out events detected by the EVS pixels of the event driven sensing array. Block 1003 can be performed while performing block 1002. For example, when an EVS pixel detects an event, the event can be read out from the EVS pixel. When an event detected by an EVS pixel is read out from the EVS pixel, the EVS pixel can be reset and thereby enabled to detect subsequent events.

A single EVS pixel may detect hundreds of events over a single event accumulation period. In some embodiments, each of these events can be read out of the EVS pixel and/or provided to a deblur circuit of the corresponding image sensor for accumulation. Therefore, for a single CIS frame, a relatively large amount of EVS data can be provided to the deblur circuit for accumulation and subsequent use in event-guided deblur of CIS data corresponding to the CIS frame.

Such a large amount of EVS data can, in some cases, complicate and/or slow down deblur computations performed by the deblur circuit of the corresponding image sensor, which may not be appropriate or acceptable for certain applications. Therefore, in some embodiments, EVS data can be readout of EVS pixels using a row-by-row scan readout. More specifically, the image sensor can scan/step through the event driven sensing array row-by-row and spend a uniform amount of time reading out each EVS pixel row. In this manner, the scan readout can limit a number of EVS readouts per CIS frame, which can simplify and/or speed up deblur computations performed by the deblur circuit.

Figure 13A:
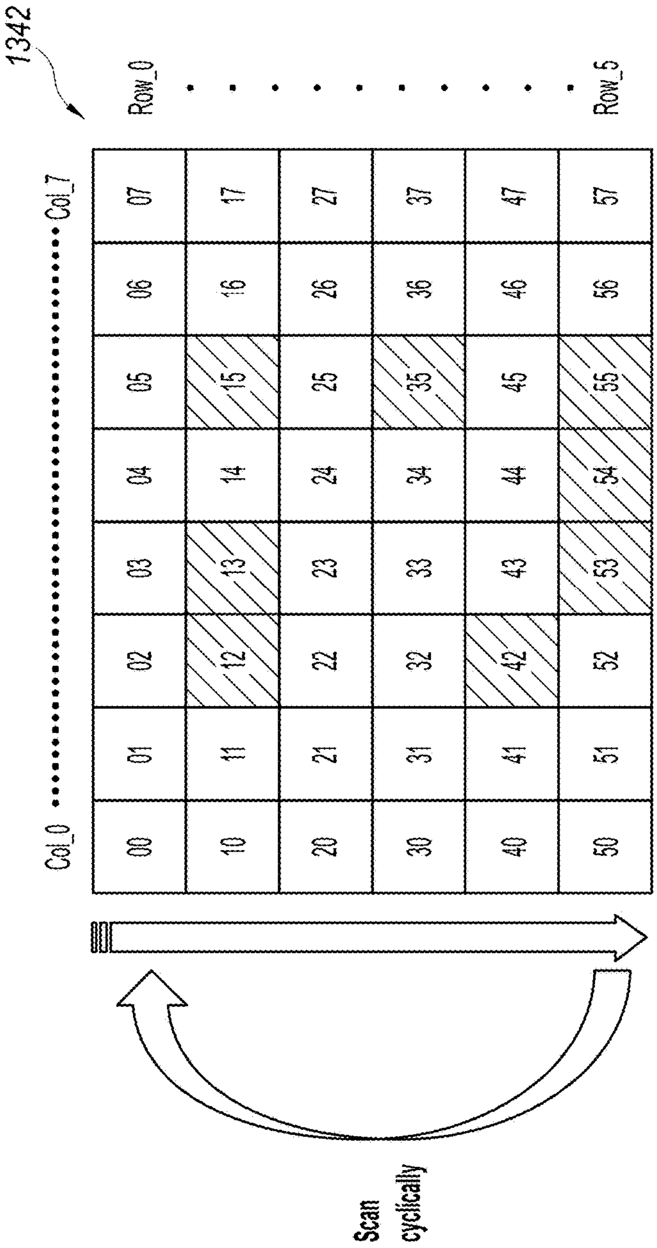
FIG. 13A is a partially schematic diagram illustrating an event driven sensing array and a row scan readout scheme configured in accordance with various embodiments of the present technology.
Figure 13B:
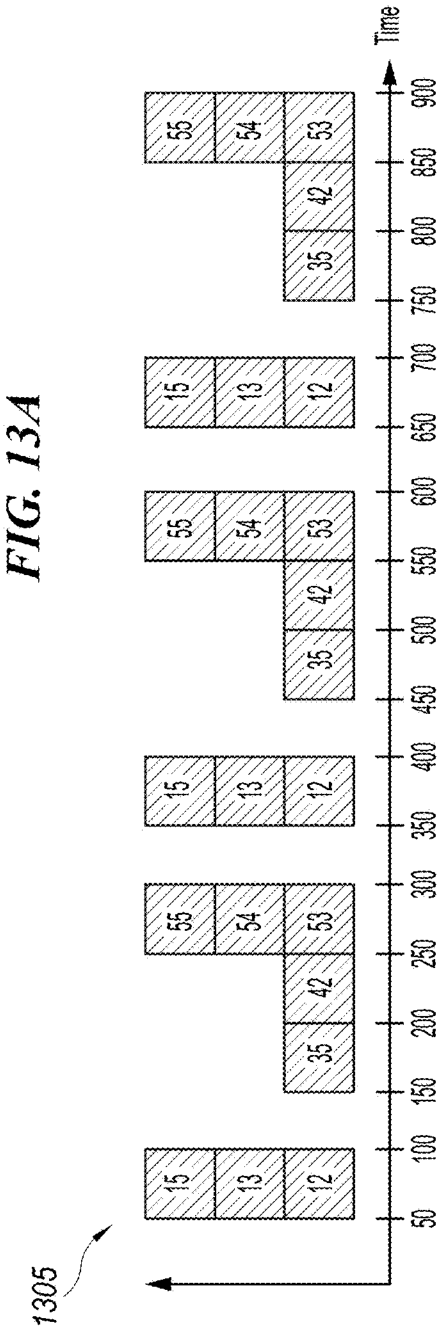
FIG. 13B is a plot of detected events readout from the event driven sensing array of FIG. 13A using the row scan readout scheme of FIG. 13A in accordance with various embodiments of the present technology.

For the sake of clarity and example, consider FIGS. 13A and 13B that illustrate (i) an example event driven sensing array 1342 and (ii) a corresponding plot 1305 of detected events readout from the event driven sensing array 1342 for a single CIS frame, respectively. As shown in FIG. 13A, the event driven sensing array 1342 includes a plurality of EVS pixels 00-57 arranged in a plurality of rows Row_0-Row_5 and a plurality of columns Col_0-Col_7. EVS pixels 12, 13, 35, 42, 53, 54, and 55 in the sensing array 1342 have detected events.

To read out EVS data captured by the EVS pixels 00-57 of the event driven sensing array 1342, the image sensor can scan cyclically, row-by-row, through the rows Row_0-Row_5 of the event driven sensing array 1342, spending a same amount of time at each row to read out events from EVS pixels of that row. For example, although none of the EVS pixels 00-07 of the row Row_0 have detected events, the image sensor can spend a fixed/preset amount of time (e.g., 50 ns) at Row_0 before moving on the row Row_1. Then, at row Row_1, the image sensor can spend the same fixed amount of time (e.g., 50 ns) reading out events detected by the EVS pixels 10-17. In the illustrated example, EVS pixels 12, 13, and 15 in row Row_1 have detected events. Therefore, during the fixed/preset amount of time allocated for row Row_1, the image sensor can (i) read out the events detected by EVS pixels 12, 13, and 15, and/or (ii) reset EVS pixels 12, 13, and 15 such that they are enabled to detect subsequent events. At the end of the fixed/preset amount of time allocated for row Row_1, the image sensor can move on to row Row_2 of the event driven sensing array 1342 to read out events (if any) detected by EVS pixels 20-27 of row Row_2. The plot 1305 of FIG. 13B illustrates the results of the scan readout performed on the event driven sensing array 1342 of FIG. 13A.

The row-by-row scan readout scheme described above therefore limits the total number of EVS readouts per CIS frame and keeps the time required to scan every row in the event driven sensing array constant through each scan cycle. For example, given (i) an event driven sensing array having 2,000 rows of EVS pixels and (ii) a 50 ns preset amount of time to read out each row of EVS pixels in the event driven sensing array, the scan readout can take 100 μs (2,000 EVS pixel rows×50 ns) to scan one time through the entire event driven sensing array. Thus, assuming a CIS exposure period is 32 ms in duration, the scan readout can limit the number of EVS readouts per EVS pixel to 320 (320 ms divided by 100 μs) for each CIS readout. Stated another way, each CIS frame readout can correspond to a maximum number of 320 EVS readouts per EVS pixel. This can limit the amount of EVS data fed to the deblur circuit, which can simplify computations performed by the deblur circuit and/or speed up availability of final results of such computations.

In the examples of the row-by-row scan readout described above, the image sensor spends a fixed/preset amount of time at each EVS pixel row reading out detected events (if any). As discussed above, this can keep the total time required to scan once through the entire event driven sensing array unchanged for each cycle of the scan readout. In other embodiments, the image sensor can skip EVS pixel rows in which no events have been detected. For example, referring again to FIG. 13A, none of the EVS pixels 20-27 of row Row_2 of the event driven sensing array 1342 have detected events. Thus, during scan readout, the image sensor can spend a preset amount of time (e.g., 50 ns) reading out the events detected by EVS pixels 12, 13, and 15 of row Row_1, skip over row Row_2, and then spend the next preset amount of time (e.g., 50 ns) reading out the event detected by EVS pixel 35 of row Row_3. In such embodiments, the total time spent by the scan readout cycling through the entire event driven sensing array 1342 can vary across cycles depending on which of the rows Row_0-Row_5 include EVS pixels that have detected events.

Referring again to FIG. 10, the method 1000 can continue at block 1004 by, for each EVS pixel of the event driven sensing array, accumulating EVS data read out from the EVS pixel during a corresponding event accumulation period. Block 1004 can be performed while performing blocks 1002 and/or 1003, as is shown by the arrow returning from block 1004 to block 1002. Additionally, or alternatively, block 1004 can be performed by an on-chip deblur circuit of the image sensor.

As discussed above, accumulating EVS data can include, for each EVS pixel, computing and maintaining a running sum of events, such as using a counter and a first integration buffer (e.g., of a deblur circuit of a hybrid image sensor). In addition, accumulating EVS data can include, for each EVS pixel, (a) computing a product of the running sum with a contrast threshold parameter, (b) determining the exponential of the product, and (c) integrating the exponential continuously over a corresponding EVS accumulation period. The results of the integration for each EVS pixel can be stored in a second integration buffer (e.g., of a deblur circuit of a hybrid image sensor).

In some embodiments, such as at block 1004, block 1005, or block 1007 of the method 1000, running sum of events stored in the first integration buffer and/or the exponential of the product (e.g., output from an exponential computation block of a deblur circuit of a hybrid image sensor) can be output to a downstream application processor, such as to an EVS frame buffer of the application processor and/or for use in video frame interpolation computations. For example, the running sum of events stored in the first integration buffer and/or the exponential of the product for each EVS pixel can be output to the downstream application processor and/or loaded into the EVS frame buffer at a timing corresponding to when the running sum of events is stored in the first integration buffer and/or when the exponential of the product is computed. As another example, the running sum of events stored in the first integration buffer and/or the exponential of the product can be output to the downstream application processor and/or loaded into the EVS frame buffer at specified timings, such as at ends of accumulation periods, at interpolation frame timing points, at ends of exposure periods, at starts of exposure periods, etc. Running sums of events stored in the first integration buffer and/or the exponentials of the products for all EVS pixels can be output to the downstream application processor and/or loaded into the EVS frame buffer row by row. Additionally, or alternatively, loading of (a) the running sums of events (e.g., from the first integration buffer) and/or (b) the exponentials of the products (e.g., from the exponential computation block) into the application processor and/or a corresponding EVS frame buffer can be gated or otherwise controlled via a trigger and a corresponding switch, as discussed in greater detail below.

As discussed above, for each EVS pixel, EVS data is accumulated over a corresponding event accumulation period. For example, for each EVS pixel, a corresponding portion of the first integration buffer and a corresponding portion of the second integration buffer can be reset prior to a start of an event accumulation period of the EVS pixel to reset (i) a running sum stored in the first integration buffer and (ii) integration results stored in the corresponding portion of the second integration buffer. Event accumulation can then be enabled at the start of the event accumulation period and thereafter disabled at the end of the event accumulation period such that integration results stored in the corresponding portion of the second integration buffer at the end of the event accumulation period correspond to only events detected by the corresponding EVS pixel during the event accumulation period. In some embodiments, once event data has been accumulated, the corresponding raw event data can be discarded.

Referring to FIG. 11 again for the sake of clarity and example, portions of the first integration buffer(s) and the second integration buffer(s) corresponding to the EVS pixel(s) of EVS pixel row N can be reset during the time period 1193 prior to the start to of the event accumulation period 1198. In some embodiments, corresponding portions of an EVS frame buffer and/or corresponding portions of a CIS key frame buffer (e.g., of a downstream application processor) may also be reset during the time period 1193. At the start to of the event accumulation period 1198, event accumulation in the deblur circuit can be enabled for the EVS pixel(s) of EVS pixel row N. As events are detected by the EVS pixel(s) during the event accumulation period 1198, the corresponding running count(s)/sum(s) maintained in the corresponding first integration buffer(s) is/are updated. In addition, the running sum(s) are multiplied by a contrast threshold, exponentials of the resulting products are computed, and the exponentials are integrated. The integration result(s) corresponding to the EVS pixel(s) of the EVS pixel row N are stored to the corresponding portion(s) of the second integration buffer. Furthermore, in some embodiments, the running sum(s) and/or exponentials can be output (e.g., streamed) to a downstream application processor, such as to an EVS frame buffer of the application processor.

At block 1005, the method 1000 continues by reading out CIS data at the end of the corresponding exposure period(s). In some embodiments, reading out the CIS data can include reading out the CIS data into the deblur circuit, such as into a latent frame computation block of the deblur circuit. In these and other embodiments, reading out the CIS data can include reading out the CIS data from CIS pixel in rows or groups of rows. For example, in embodiments in which multiple CIS pixel rows correspond to a same EVS pixel row, CIS data captured by CIS pixels of the multiple CIS pixel rows can be read out together/at the same time at or after the end of the corresponding exposure period. In some embodiments, reading out the CIS data can include skipping readout of one or more rows and/or columns of CIS pixels (e.g., to reduce resolution of the CIS data, to match a resolution of EVS data captured by EVS pixels of the event driven sensing array, and/or to reduce a mismatch between resolution of CIS data captured by CIS pixels and resolution of the EVS data captured by the EVS pixels of the event driven sensing array). In these and other embodiments, reading out the CIS data can include binning one or more rows and/or columns of CIS pixels (e.g., to reduce resolution of the CIS data, to match a resolution of EVS data captured by EVS pixels of the event driven sensing array, and/or to reduce a mismatch between resolution of CIS data captured by CIS pixels and resolution of the EVS data captured by the EVS pixels of the event driven sensing array). Additional details on (a) skipping readout of one or more rows and/or columns of CIS pixels and/or (b) binning one or more rows and/or columns of CIS pixels during readout, are provided in the cofiled, copending, and coassigned application titled "METHODS FOR OPERATING HYBRID IMAGE SENSORS HAVING DIFFERENT CIS-TO-EVS RESOLUTIONS," which has been incorporated by reference herein in its entirety above.

Referring again to FIGS. 11 and 12 for the sake of clarity and example, CIS pixel rows 4N, 4N−1, 4N−2, and 4N−3 all correspond to the EVS pixel row N and, after alignment with an event accumulation period 1198 for the EVS pixel(s) of the EVS pixel row N, have a common exposure period 1197 that extends between time t0 and time t5. Thus, at or after the end time t5 of the exposure period 1197, CIS data captured by CIS pixels of the CIS pixel rows 4N, 4N−1, 4N−2, and 4N−3 can be read out from the CIS pixels at the same time. Additionally, or alternatively, one or more of the CIS pixel rows 4N, 4N−1, 4N−2, and 4N−3 can be skipped or binned together during readout.

At block 1006, the method 1000 continues by deblurring the CIS data (read out from CIS pixels at block 1005) using accumulated EVS data generated and stored in a corresponding portion of the second integration buffer at block 1004. In some embodiments, deblurring the CIS data can include combining the CIS data with the accumulated EVS data to compute one or more latent image frames, such as (a) the latent image frame L(s) corresponding to the start time $t_s$ of the exposure periods of the CIS pixels. In some embodiments, combining the CIS data with the accumulated EVS data can include interpolating the EVS data to generate additional EVS data corresponding to additional rows and/or columns of EVS pixels (e.g., to increase resolution of the EVS data, to match a resolution of CIS data captured by CIS pixels of the CIS pixel array, and/or to reduce a mismatch between resolution of CIS data captured by CIS pixels and resolution of the EVS data captured by the EVS pixels of the event driven sensing array). Additional details on interpolating EVS data corresponding to additional rows and/or columns of EVS pixels are provided (a) in the cofiled, copending, and coassigned application titled "METHODS FOR OPERATING HYBRID IMAGE SENSORS HAVING DIFFERENT CIS-TO-EVS RESOLUTIONS," which has been incorporated by reference herein in its entirety above.

At block 1007, the method 1000 continues by outputting deblurred image data. Outputting the deblurred image data can include outputting the deblurred image data from the image sensor to a downstream application processor. As a specific example, outputting the deblurred image data can include outputting the deblurred image data to a CIS key frame buffer and/or a video frame interpolation computation block of the downstream application processor. Additionally, or alternatively, outputting the deblurred image data can include outputting the deblurred image data to an image signal processor, such as for previewing the deblurred image data. In these and other embodiments, outputting the deblurred image data can include outputting the deblurred image data (e.g., the latent image frame L(s)) computed at block 1006, such as in addition to or in lieu of outputting raw CIS data that is read out from the CIS pixels at block 1005 and/or raw EVS data that is generated and read out from EVS pixels at block 1003.

The timing diagram 1195 of FIG. 11 provides a visual summary of the method 1000 of FIG. 10. For example, the time period 1193 of the timing diagram 1195 corresponds to a period of time before exposure start time t0 in which EVS pixel(s) of EVS pixel row N, CIS pixels of CIS pixel rows corresponding to EVS pixel row N, the corresponding first integration buffer(s), and/or the corresponding portion(s) of the second integration buffer are reset. Corresponding portions of an EVS frame buffer and/or corresponding portions of a CIS key frame buffer of a downstream application processor may also be reset at this timing. As a result of the reset, the CIS pixel rows have a common exposure period 1197 that is aligned with an EVS accumulation period 1198 for the EVS pixel row N. Therefore, while the CIS pixels of the CIS pixels rows capture CIS data during the exposure period 1197, the EVS pixel(s) of the EVS pixel row detect events during the aligned EVS accumulation period 1198. As events are detected and read into a deblur circuit of a corresponding image sensor (e.g., using a row-by-row scan readout scheme), the events are accumulated such that an integral of a running sum of the events over the entire EVS accumulation period 1198 is available at the end of the exposure period 1197 and/or such that accumulated event data is provided to a downstream application processor at one or more times throughout the exposure periods. As shown by arrow 1101 in FIG. 11, at the end of the exposure period 1197, CIS data can be read out from the CIS pixels of the CIS pixel rows corresponding to the EVS pixel row N and combined with the accumulated event data to compute final (deblurred) image data (e.g., one or more latent images, such as a latent image L(s)) that can be output from the image sensor row-by-row, such as to a CIS frame buffer of a downstream application processor. In some embodiments, loading of the latent image L(s) into the CIS frame buffer of the downstream application processor can be gated, such as using a trigger and a corresponding switch (as discussed in greater detail below).

Referring again to block 1005 of the method 1000, after reading out the CIS pixel data at block 1005 at the ends of the exposure periods, the method 1000 can additionally proceed to blocks 1008-1012 to collect additional EVS pixel data outside of the CIS exposure periods. More specifically, at block 1008, the method 1000 can continue by resetting EVS pixels and/or corresponding EVS integration buffers (e.g., of EDI components of a deblur circuit) at ends of corresponding CIS integration periods. As a specific example, referring again to FIG. 11, EVS pixels of EVS row N (corresponding to CIS pixels having the exposure period 1197 shown in FIG. 11) can be reset in a time period 1192 that extends between time t5 and time t6. As shown, time period 1192 follows (a) the end of the exposure period 1197 for corresponding CIS pixels and (b) the end of the accumulation period 1198 for the EVS pixels that was aligned with the exposure period 1197 at block 1001 of the method 1000.

At blocks 1009-1011, the method 1000 of FIG. 10 continues by capturing EVS pixel data using EVS pixels, reading out the EVS pixel data from the EVS pixels to a deblur circuit, and accumulating the EVS pixel data using one or more EVS integration buffers, respectively. Blocks 1009-1011 can be generally similar to blocks 1002-1004 of the method 1000 described above. Therefore, a detailed discussion of blocks 1009-1011 is largely omitted here for the sake of brevity.

Referring to EVS row N shown in FIG. 11 for the sake of example and clarity, at blocks 1009-1011, the method 1000 captures, reads out, and accumulates EVS pixel data over an accumulation period 1199 that runs outside of (e.g., after) the exposure period 1197 for corresponding CIS pixels. Thus, the method 1000 captures, reads out, and accumulates EVS pixels data (e.g., event data) corresponding to times during which CIS pixel data is not being captured by corresponding CIS pixels. As discussed in greater detail below, the EVS pixel data captured and accumulated during the accumulation period 1199 can be used in video frame interpolation calculations (in combination with (i) the CIS pixel data captured during the exposure period 1197 and/or (ii) EVS pixel data captured during the accumulation period 1198) to generate interpolation frame information.

Accumulated EVS pixel data can, at block 1011 or block 1012 of the method 1000, be output to a downstream application processor, such as to an EVS frame buffer of an application processor. For example, the running sums of events and/or the exponentials of the running sums multiplied by a contrast threshold can be output to the downstream application processor and/or loaded into the EVS frame buffer at timings corresponding to when the running sums are stored in the first integration buffer and/or when the exponentials of the are computed. As another example, the running sums and/or the exponentials can be output to the downstream application processor and/or loaded into the EVS frame buffer at specified timings, such as at ends of accumulation periods (e.g., at the end of the accumulation period 1199 of FIG. 11), at interpolation frame timing points, etc. The running sums and/or the exponentials can be output to the downstream application processor and/or loaded into the EVS frame buffer row by row. Additionally, or alternatively, loading of (a) the running sums (e.g., stored in the first integration buffer) and/or (b) the exponentials (e.g., output from the exponential computation block) into the application processor and/or a corresponding EVS frame buffer can be gated or otherwise controlled via a trigger and a corresponding switch, as discussed in greater detail below.

Referring again to FIGS. 6, 10, and 11 for the sake of example, during the accumulation period 199 (FIG. 11), EVS pixel data captured by EVS pixels of EVS row N at block 1009 and read out at block 1010 can be tracked in a running sum maintained by the counter 673 and the first integration buffer 674 of the EDI computation block 671 of the deblur circuit 670. The running sum can then be (a) output to a downstream application processor, or (b) first fed to the product computation block 675 and the exponential computation block 676, and then output to an application processor, such as an application processor external a hybrid image sensor that incorporates the deblur circuit 670.

At block 1012, the method 1000 continues by outputting accumulated EVS pixel data and deblurred image data to a video frame interpolation block. For example, during the accumulation period 1198 illustrated in FIG. 11, EVS pixel data can be captured by EVS pixels of EVS row N, read out, accumulated, and/or output to an EVS frame buffer of an application processor at block 1002-1004 of the method 1000 of FIG. 10. Accumulated EVS pixel data can be output to the EVS frame buffer of the application processor continuously (e.g., as it is stored to an EVS integration buffer and/or output from an exponential computation block of a deblur circuit) or at preset timings, such as at interpolation frame timing points, starts of exposure periods for corresponding CIS pixels, ends of exposure periods for corresponding CIS pixels, and/or ends of accumulation periods for corresponding EVS pixels. In addition, during the accumulation period 1199 illustrated in FIG. 11, EVS pixel data can be captured by EVS pixels of EVS row N, read out, accumulated, and output to the EVS frame buffer of the application processor at blocks 1009-1011 of the method 1000 of FIG. 10. Accumulated EVS pixel data can be output to the EVS frame buffer of the application processor continuously (e.g., as it is stored to an EVS integration buffer and/or output from an exponential computation block of a deblur circuit) or at preset timings, such as at interpolation frame timing points, starts of accumulation periods for corresponding EVS pixels, and/or ends of accumulation periods for corresponding EVS pixels. At block 1012, at or after an end of the accumulation period 1199 (representing an interpolation frame timing point), the accumulated EVS pixel data from both the accumulation period 1198 and the accumulation period 1199 can be output from the EVS frame buffer of the application processor to a video frame interpolation computation block, such as part of a row-by-row readout of EVS pixel data from the EVS frame buffer of the application processor. More specifically, at block 1012 of the method 1000 of FIG. 10, the accumulated EVS pixel data in the EVS frame buffer of the application processor can be fed to a video frame interpolation computation block. The video frame computation block can additionally receive the latent image frame L(s) (representing deblurred image data) that is output from a deblur circuit at block 1007 of the method 1000 and/or that is read out from a CIS key frame buffer of the application processor to the video frame interpolation block at block 1007 or block 1012 of FIG. 10.

At block 1013, the method 1000 continues by computing one of more interpolated image/video frames. In some embodiments, computing an interpolated image/video frame can include computing an interpolated image/video frame for a given time t, such as by incrementing over all events starting from the latent image frame L(s) at time $t_s$ (corresponding to the starts of each CIS integration period) to the given time t. More specifically, computing an interpolated image/video frame can include computing an interpolated image/video frame for a given time t using (a) the latent image frame L(s) output at block 1007, (b) all or a subset of the accumulated EVS pixel data output at block 1012, and (c) Equation 15 above.

As a specific example, the method 1000 can compute a first interpolated image frame corresponding to time t12 shown in FIG. 11 using Equation 15, the latent image frame L(s), and all of the accumulated EVS pixel data output at block 1012. Additionally, or alternatively, the method 1000 can compute a second interpolated image frame corresponding to time t11 shown in FIG. 11 using Equation 15, the latent image frame L(s), all of the EVS pixel data accumulated during the accumulation periods (e.g., the accumulation period 1198) that are aligned with the CIS exposure periods, and a subset of the EVS pixel data accumulated during the accumulation periods (e.g., the accumulation period 1199) that extend beyond the CIS exposure periods. The subset of the EVS pixel data can include EVS pixel data captured, read out, and accumulated up to a point in time in each accumulation period that corresponds to time t11 for the bottom accumulation period shown in FIG. 11.

Although the blocks 1001-1013 of the method 1000 are described and illustrated in a particular order, the method 1000 of FIG. 10 is not so limited. In other embodiments, all or a subset of one or more of the blocks 1001-1013 of the method 1000 can be performed in a different order. In these and other embodiments, all or a subset of any of the blocks 1001-1013 can be performed before, during, and/or after all or a subset of any of the other blocks 1001-1013. Furthermore, a person skilled in the art will readily appreciate that the method 1000 can be altered and still remain within these and other embodiments of the present technology. For example, all or a subset of one or more of the blocks 1001-1013 can be omitted and/or repeated in some embodiments.

As a specific example, block 1008 of the method 1000 can be omitted in some embodiments. For example, for each EVS pixel row, the EVS pixels can continuously be enabled to detect events occurring in the external scene between time $t_s$ (representing a start time of an integration period for corresponding CIS pixels) and an interpolation frame timing point corresponding to an end of the associated accumulation period. Referring to EVS row N of FIG. 11 for the sake of example and clarity, the EVS pixels of EVS row N can remain enabled to capture EVS pixel data for the entire duration of time between time t0 (representing time $t_s$ for the integration period 1197) and the end of the accumulation period 1199, without being disabled or reset during the time period 1192. This can reduce the likelihood of EVS data that occurs during the time period 1192 going undetected by the EVS pixels of EVS row N.

As another example, although interpolated image frames are described above at block 1013 as being latent image frames that each correspond to times that occur after CIS integration periods for corresponding CIS pixels have ended, the method 1000 is not so limited. For example, at block 1013, the method 1000 can compute one or more latent image frames that correspond to one or more times that occur while the CIS integration periods for corresponding CIS pixels are ongoing. In such embodiments, EVS pixel data accumulated at times occurring outside of the integration periods can go unused in the video frame interpolation calculations. Stated another way, video frame interpolation calculations that are used to generate one of more latent image frames corresponding to times that occur during the integration periods for corresponding CIS pixels can be based on (i) the latent image frame L(s) and (ii) all or a subset of the EVS pixel data accumulated during the integration periods, such as without considering EVS pixel data that is captured and accumulated after the CIS integration periods have ended. Specific examples of this are described below with reference to FIGS. 14-15B.

Figure 14:
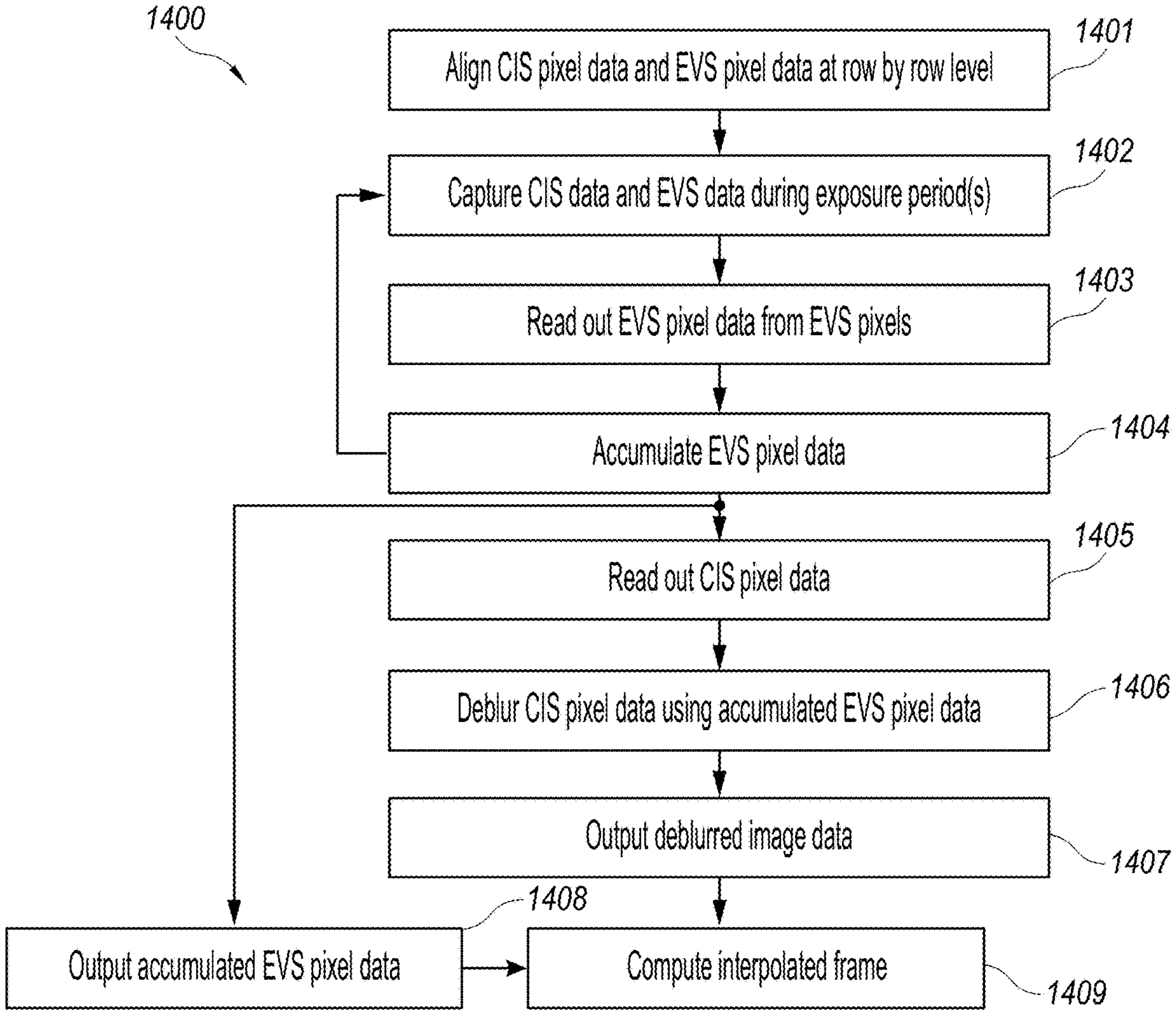
FIG. 14 is a flow diagram illustrating another method of operating an image sensor in accordance with various embodiments of the present technology.

FIG. 14 is a flow diagram illustrating a method 1400 of operating an imaging system in accordance with various embodiments of the present technology. For example, the method 1400 can be a method of (i) performing (e.g., on-chip) deblurring of CIS data and/or (ii) video frame interpolation. The method 1400 is illustrated as a series of blocks 1401-1409 or steps. All or a subset of one or more of the blocks 1401-1409 can be executed by devices or components of an imaging system configured in accordance with various embodiments of the present technology. For example, all or a subset of one or more of the blocks 1401-1409 can be performed by a hybrid image sensor, CIS pixels of a pixel array, EVS pixels of an event driven sensing array, a common control block, row/column control circuitry, column readout circuitry, column-scan readout circuitry, a deblur block or circuit, and/or an application processor. All or a subset of one or more of the blocks 1401-1409 of the method 1400 can be executed in accordance with the description of FIGS. 1-13B above and/or with the description below. Indeed, several of the blocks 1401-1409 of the method 1400 are described below with reference to FIGS. 15A and 15B.

As shown, the method 1400 includes aligning CIS pixel data and EVS pixel data at a row-by-row level (block 1401); capturing CIS pixel data during corresponding exposure/integration periods and capturing EVS pixel data during corresponding accumulation periods aligned with the exposure/integration periods (block 1402); reading out the EVS pixel data from the EVS pixels (block 1403), accumulating the EVS pixel data, such as using (i) a deblur circuit and/or (ii) in one or more EVS integration buffers (e.g., of a hybrid image sensor) and/or an EVS frame buffer (e.g., of a downstream application processor) (block 1404); reading out the CIS pixel data at ends of the integration periods (block 1405); deblurring the CIS pixel data using the accumulated EVS pixel data to generate a latent image frame L(s) (block 1406); and outputting the latent image frame L(s) to (e.g., a CIS key frame buffer) of an application processor and/or to an image signal processor (block 1407). Blocks 1401-1407 can be identical or at least generally similar to blocks 1001-1007 of the method 1000 of FIG. 10 described above. Therefore, a detailed discussion of blocks 1401-1407 is largely omitted here for the sake of brevity.

Referring again to block 1404, the method 1400 can proceed from block 1404 to block 1408 to output accumulated EVS pixel data. For example, during an accumulation period for EVS pixels, EVS pixel data can be captured by the EVS pixels, read out, and accumulated at blocks 1402-1404 of the method 1400 of FIG. 14. In turn, at block 1408, the method 1400 can output accumulated EVS pixel data to an EVS frame buffer of a downstream application processor. For example, running sums of events and/or exponentials of products of the running sums with contrast thresholds can be output to the downstream application processor and/or loaded into the EVS frame buffer at timings corresponding to when the running sums are stored in the first integration buffer and/or when the exponentials are computed. As another example, the running sums and/or the exponentials can be output to the downstream application processor and/or loaded into the EVS frame buffer at specified timings, such as at interpolation frame timing points. The running sums and/or the exponentials of the results of the first integration can be output to the downstream application processor and/or loaded into the EVS frame buffer row by row. Additionally, or alternatively, loading of (a) the running sums (e.g., stored in the first integration buffer) and/or (b) the exponentials (e.g., output from the exponential computation block) into the application processor and/or a corresponding EVS frame buffer can be gated or otherwise controlled via a trigger and a corresponding switch, as discussed in greater detail below.

After (i) loading accumulated EVS pixel data corresponding to the interpolation frame time into the EVS frame buffer of the downstream application processor at block 1408 and (ii) accumulating event data at blocks 1402-1404 through an end of an accumulation period that aligns with an exposure period for corresponding CIS pixels, the method 1400 (at block 1408) can output the accumulated EVS pixel data from the EVS frame buffer of the application processor to a video frame interpolation computation block (e.g., of an application processor). For example, accumulated EVS pixel data stored in the EVS frame buffer and corresponding to the interpolation frame can be output to the video frame interpolation computation block at a timing corresponding to when deblurred image data is (a) output from a deblur circuit to a CIS key frame buffer (e.g., of the application processor) and/or (b) provided to the video frame interpolation computation block.

Figure 15A:
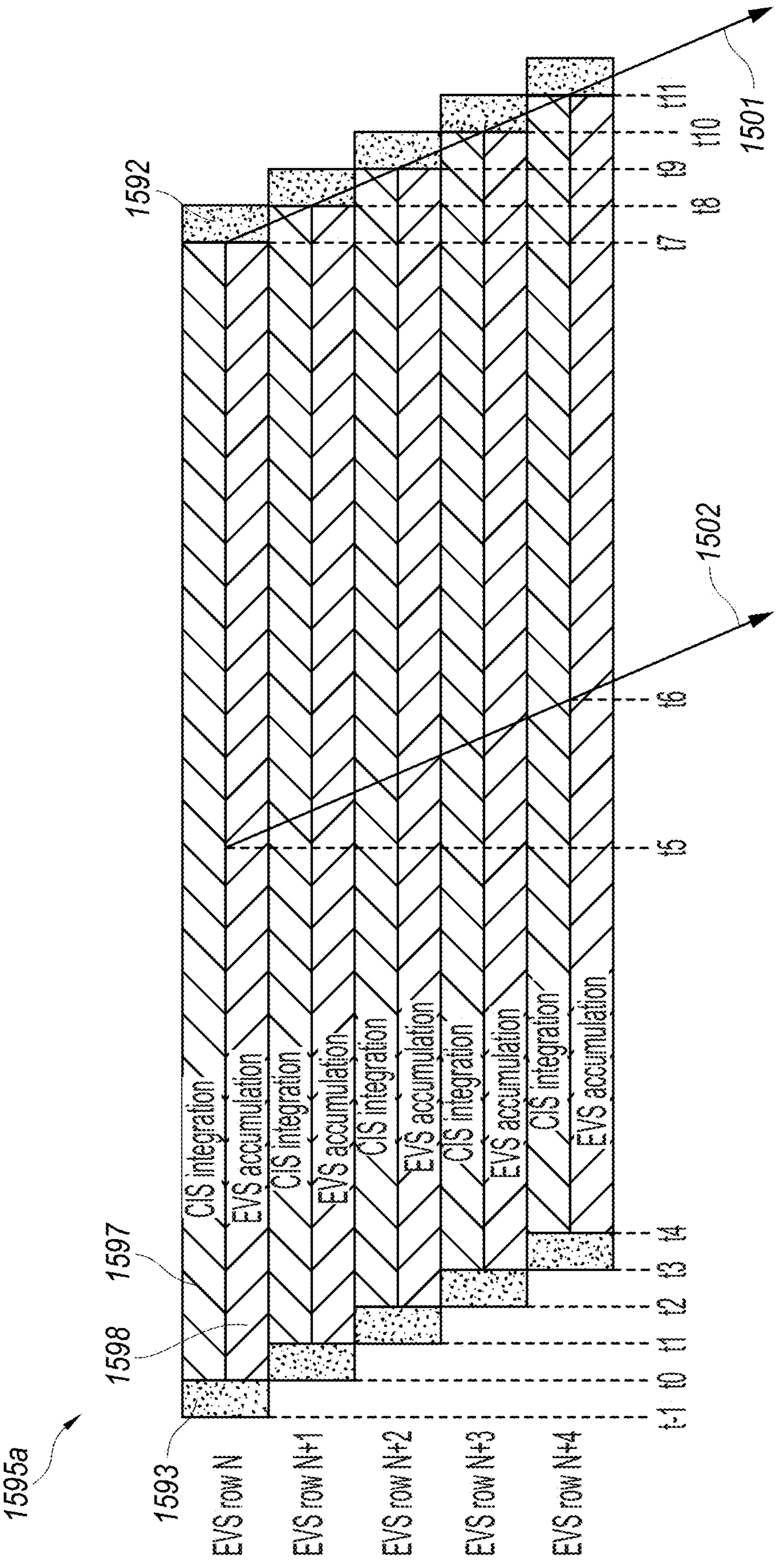
FIGS. 15A and 15B are timing diagrams corresponding to methods of operating an image sensor and/or a corresponding imaging system in accordance with various embodiments of the present technology.

As a specific example, consider FIG. 15A that illustrates a timing diagram 1595*a* in accordance with various embodiments of the present technology. Referring to FIGS. 14 and 15A together, at block 1401 of the method 1400, EVS pixels of EVS row N, corresponding portions of EVS integration buffers (e.g., of a deblur circuit of a hybrid image sensor), and/or corresponding portions of EVS frame buffers and/or CIS key frame buffers (e.g., of a downstream application processor) can be reset at a same time as corresponding CIS pixels and within a time period 1593 extending between $t_{-1}$ and time $t_0$. Resetting the EVS pixels of EVS row N and corresponding CIS pixels at the same timing can align a CIS integration period 1597 for the CIS pixels with an accumulation period 1598 for the EVS pixels of row N. At time $t_0$ in FIG. 15A, the method 1400 can proceed at block 1402 with capturing CIS pixel data during the integration period 1597 and capturing corresponding EVS pixel data during the accumulation period 1598. At blocks 1403 and 1404 of the method 1400, the EVS pixel data can be read out, accumulated, and stored in one or more EVS integration buffers (e.g., of the deblur circuit of the hybrid image sensor).

At block 1408, EVS pixel data captured by EVS pixels of EVS row N and accumulated between time t0 and time t5 can be output and stored in an EVS frame buffer (e.g., of the application processor), such as (a) by streaming the accumulated EVS pixel data to the EVS frame buffer between time t0 and time t5 or (b) reading out the accumulated EVS pixel data (e.g., row by row) to the EVS frame buffer at or after time t5. As discussed above, in some embodiments, a trigger and corresponding switch can be used to control when accumulated EVS pixel data is stored to the EVS frame buffer. For example, a trigger can be fired to selectively enable a switch at time t0 such that accumulated EVS pixel data can be streamed from the first integration buffer or the exponential computation block into the EVS frame buffer. Then, at time t5 (corresponding to the interpolation frame timing point for EVS pixel row N in FIG. 15A), the trigger can disable the switch such that accumulated EVS pixel data stored to the first integration buffer or output from the exponential computation block after time t5 (e.g., between (i) time t5 and (ii) time t7 or t8) is not loaded into the EVS frame buffer. As another example, a trigger can be fired at time t5 (corresponding to the interpolation frame timing point for EVS pixel row N in FIG. 15A) to read out, row by row, accumulated EVS pixel data stored in the first integration buffer and/or output from the exponential computation block into the EVS frame buffer.

As shown in FIG. 15A, for EVS row N, an interpolation frame timing point occurs at time t5 and partway through the accumulation period 1598. Thus, the interpolation frame timing point for EVS row N occurs at a timing that is in the middle of the integration period 1597 for corresponding CIS pixels. Indeed, the integration period for the corresponding pixels extends from time t0 to time t7, and can cover the entire frame time (e.g., in low lighting conditions). As such, accumulated EVS pixel data in the first integration buffer and/or output from the exponential computation block can be output and stored to an EVS frame buffer (e.g., of a downstream application processor) at a timing that occurs before CIS pixel data captured by corresponding CIS pixels is read out from the corresponding CIS pixels. In other embodiments, such as in bright lighting conditions, the integration period 1597 for the corresponding pixels can extend from time t0 to a time occurring before time t7 such that the integration period 1597 covers less than the entire frame time. In some such embodiments, accumulated EVS pixel data in the first integration buffer and/or output from the exponential computation block can be output and stored to an EVS frame buffer (e.g., of a downstream application processor) at a same timing as, or at a timing that occurs after, the time at which CIS pixel data captured by corresponding CIS pixels is read out from the corresponding CIS pixels.

Referring back to FIG. 14, at block 1409, the method 1400 can proceed with computing an interpolated video/image frame based (a) on the accumulated EVS pixel data output at block 1408 and (b) on a latent image frame L(s). As discussed above, the latent image frame L(s) can be computed and output at block 1407 based (i) on CIS pixel data captured at block 1402 and read out from the CIS pixels at block 1405 at the ends of corresponding integration periods and (ii) on EVS pixel data that was captured and accumulated over accumulation periods corresponding to the integration periods. Computation of the interpolated video/image frames can be identical or at least generally similar to computation of interpolated video/image frames at block 1013 of the method 1000 of FIG. 10 above. Thus, a detailed description of the computation of interpolated video/image frames at block 1409 of the method 1400 is largely omitted here for the sake of brevity.

Although the blocks 1401-1409 of the method 1400 are described and illustrated in a particular order, the method 1400 of FIG. 14 is not so limited. In other embodiments, all or a subset of one or more of the blocks 1401-1409 of the method 1400 can be performed in a different order. In these and other embodiments, all or a subset of any of the blocks 1401-1409 can be performed before, during, and/or after all or a subset of any of the other blocks 1401-1409. Furthermore, a person skilled in the art will readily appreciate that the method 1400 can be altered and still remain within these and other embodiments of the present technology. For example, all or a subset of one or more of the blocks 1401-1409 can be omitted and/or repeated in some embodiments.

Figure 15B:
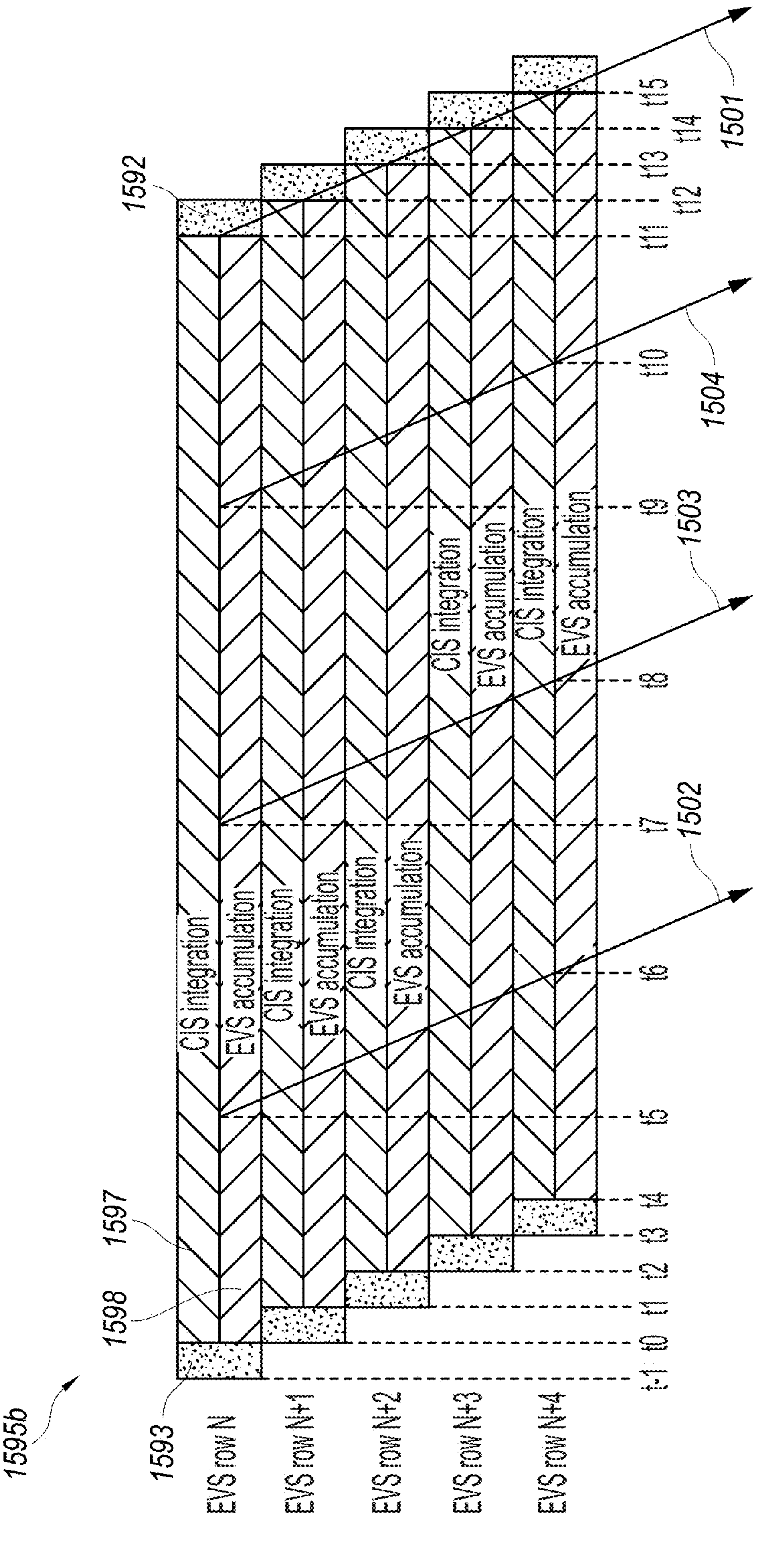

As a specific example, blocks 1408 and 1409 can be repeated to generate more than one interpolated video/image frame. For example, FIG. 15B illustrates a timing diagram 1595*b* that is generally similar to the timing diagram 1595*a* of FIG. 15A. As shown in FIG. 15B, accumulated EVS pixel data can be output at block 1408 of the method 1400 at multiple different times throughout the illustrated integration periods, as shown by arrows 1502-1504. For example, for EVS row N, EVS pixel data accumulated between time t0 and time t5 (corresponding to arrow 1502) can be loaded into an EVS frame buffer in a first instance of block 1408, EVS pixel data accumulated between time t0 and time t7 (corresponding to arrow 1503) can be loaded into an EVS frame buffer in a second instance of block 1408, and EVS pixel data accumulated between time t0 and time t9 (corresponding to arrow 1504) can be loaded into an EVS frame buffer in a third instance of block 1408. The accumulated EVS pixel data corresponding to each of the arrows 1502-1504 can be (a) stored in different EVS frame buffers (e.g., of an application processor) and/or (b) provided to a video frame interpolation computation block and used to compute three interpolated video/image frames at block 1409 of the method 1400 of FIG. 14. In some embodiments, loading of accumulated EVS pixel data into each of the different EVS frame buffers can be gated, such as using one or more triggers and one or more corresponding switches (as discussed in greater detail below).

Figure 16:
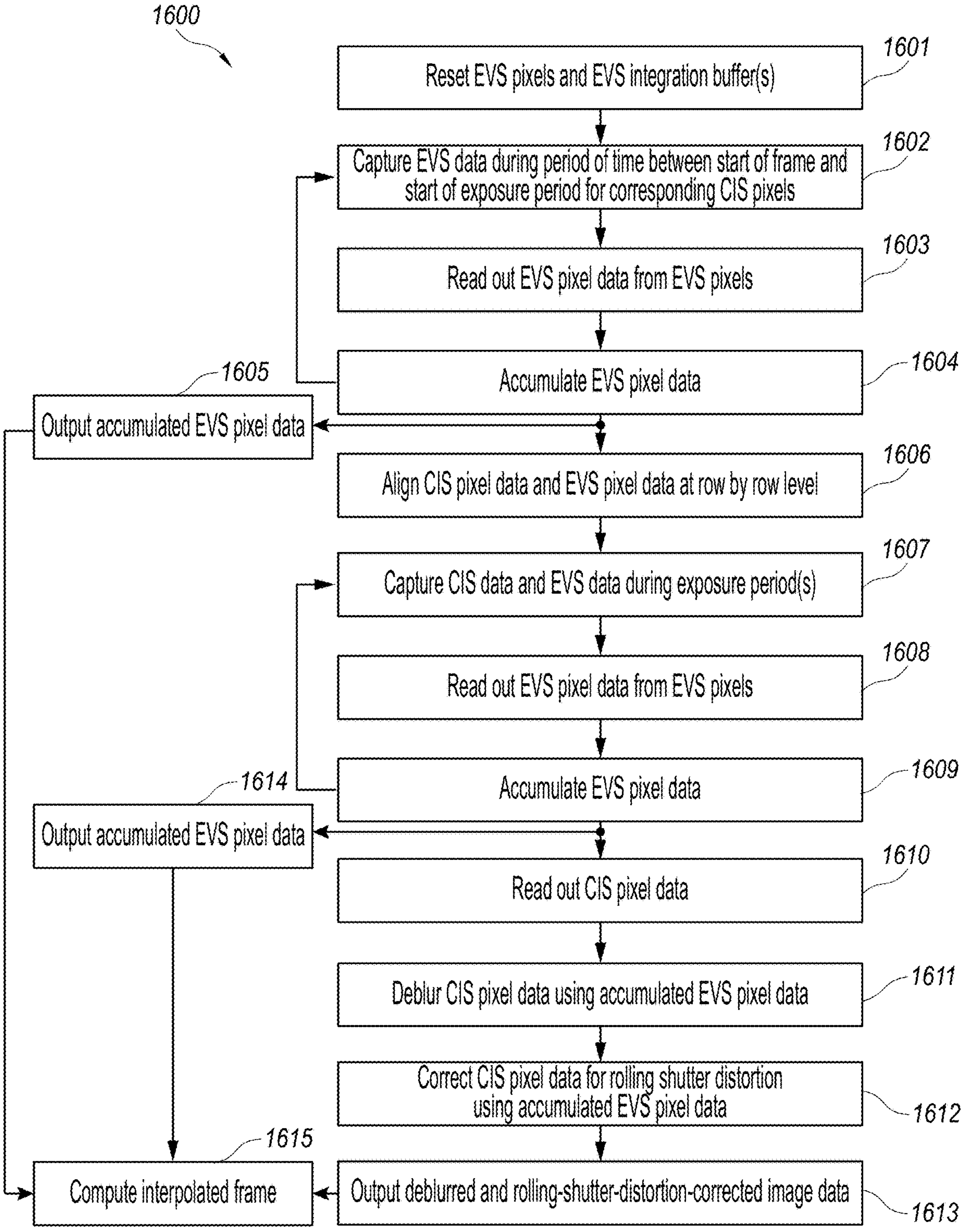
FIG. 16 is a flow diagram illustrating still another method of operating an image sensor in accordance with various embodiments of the present technology.

FIG. 16 is a flow diagram illustrating still another method 1600 of operating an imaging system in accordance with various embodiments of the present technology. For example, the method 1600 can be a method of (i) performing (e.g., on-chip) deblurring of CIS data, (ii) performing (e.g., on-chip) rolling-shutter-distortion correction, and/or (iii) video frame interpolation. The method 1600 is illustrated as a series of blocks 1601-1615 or steps. All or a subset of one or more of the blocks 1601-1615 can be executed by devices or components of an imaging system configured in accordance with various embodiments of the present technology. For example, all or a subset of one or more of the blocks 1601-1615 can be performed by a hybrid image sensor, CIS pixels of a pixel array, EVS pixels of an event driven sensing array, a common control block, row/column control circuitry, column readout circuitry, column-scan readout circuitry, a deblur block or circuit, and/or an application processor. All or a subset of one or more of the blocks 1601-1615 of the method 1600 can be executed in accordance with the description of FIGS. 1-15B above and/or with the description below. Indeed, several of the blocks 1601-1615 of the method 1600 are described below with reference to FIGS. 17A and 17B.

The method 1600 begins at block 1601 by resetting EVS pixels and corresponding portions of one or more EVS integration buffer(s), such as one or more EDI integration buffers and/or one or more RSDC integration buffers. In some embodiments, resetting the EVS pixels and the corresponding portions of the EVS integration buffer(s) can include resetting the EVS pixels and the corresponding portions of the EVS integration buffer(s) at a same time and/or at within a time period that occurs before a start of an event accumulation period that precedes an integration period of corresponding CIS pixels. In these and other embodiments, corresponding portions of one or more EVS frame buffer(s) and/or of one or more CIS key frame buffer(s) (e.g., of a downstream application processor) can also be reset at block 1601, such as at a same timing as the EVS pixels and/or the corresponding portions of the EVS integration buffer(s). The resetting can be generally similar to the resetting performed at block 1001 of the method 1000 described above with reference to FIG. 10. Thus, a detailed discussion of the resetting performed at block 1601 is largely omitted here for the sake of brevity. In contrast with the resetting performed at block 1001 described above, the resetting performed at block 1601 can omit resetting corresponding CIS pixels and/or resetting CIS key frame buffers.

Figure 17A:
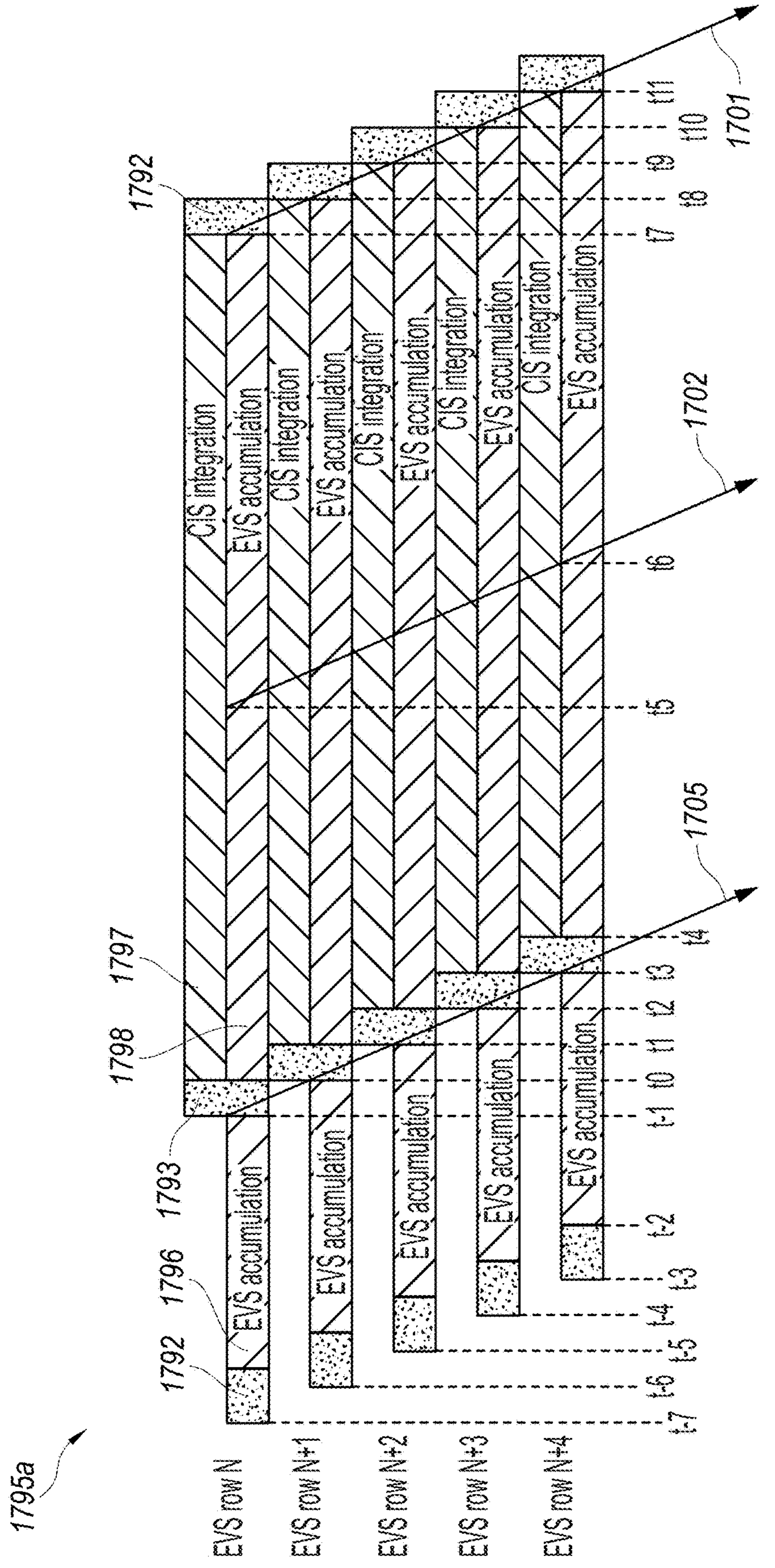
FIGS. 17A and 17B are timing diagrams corresponding to methods of operating an image sensor and/or a corresponding imaging system in accordance with various embodiments of the present technology.

FIG. 17A illustrates a timing diagram 1795*a* in accordance with various embodiments of the preset technology. Referring to FIGS. 16 and 17A together, at block 1601 of the method 1600, EVS pixels of EVS row N can be reset during a time period 1792 extending between time t−7 and time t−6 and preceding an accumulation period 1796 for the EVS pixels of EVS row N. Portions of one or more EDI integration buffers corresponding to the EVS pixels of EVS row N, portions of one or more RSDC integration buffers corresponding to the EVS pixels of EVS row N, and/or portions of one or more EVS frame buffers (e.g., of an application processor) corresponding to the EVS pixels of EVS row N, can be reset during the time period 1792 and/or at a same time as the EVS pixels of EVS row N are reset.

Referring again to FIG. 16, at blocks 1602-1604, the method 1600 continues by, for each EVS pixel, capturing, reading out, and accumulating EVS pixel data over corresponding accumulation periods. The corresponding accumulation periods can precede an integration period of corresponding CIS pixels. For example, accumulation period 1796 corresponding to EVS pixels of EVS row N is shown in FIG. 17A as preceding integration period 1797 for CIS pixels corresponding to the EVS pixels of EVS row N. In the illustrated example, an integration/exposure period of corresponding CIS pixels begins in the middle of an interpolation frame. Thus, the accumulation period 1796 precedes the start of the integration period 1797 for CIS pixels corresponding to the EVS pixels of EVS pixel row N.

Reading out the EVS data from the EVS pixels at block 1603 of the method 1600 can be performed subsequent to and/or while performing block 1602. For example, when an EVS pixel detects an event, the event can be read out from the EVS pixel. When the event is read out from the EVS pixel, the EVS pixel can be reset and thereby enabled to detect subsequent events. Reading out the EVS data can include reading out the EVS data to RSDC components of a computation block of a deblur circuit. Additionally, or alternatively, reading out the EVS data can include reading out the EVS data to EDI components of a computation block of a deblur circuit. In these and other embodiments, reading out the EVS data can include reading out the EVS data using a scan readout technique, such as the scan readout technique described in greater detail above with reference to FIGS. 13A and 13B.

Accumulation performed at block 1604 of the method 1600 can include, for each EVS pixel, accumulating EVS pixel data read out from the EVS pixel during the corresponding accumulation period. The corresponding accumulation period (e.g., the accumulation period 1796 of FIG. 17A) can extend between (i) a start of an interpolation frame (e.g., time $t_{-7}$) and (ii) a start of an image frame (e.g., time t0). Alternatively, the corresponding accumulation period can extend between (i) a start of an interpolation frame (e.g., time $t_{-7}$) and (ii) the start (e.g., time $t_{-1}$) of a reset period (e.g., the time period 1793 of FIG. 17A) preceding the start of an image frame. Block 1604 can be performed subsequent to and/or while performing blocks 1602 and/or 1603, as is shown by the arrow returning from block 1604 to block 1602. Additionally, or alternatively, block 1604 can be performed by EDI components and/or RSDC components of a deblur circuit (e.g., of a hybrid image sensor).

As discussed above, accumulating EVS data can include, for each EVS pixel, computing and maintaining a running sum of events, such as using a counter and an integration buffer (e.g., of a deblur circuit of a hybrid image sensor). In addition, accumulating EVS data can include, for each EVS pixel, (a) computing a product of the running sum with a contrast threshold parameter, and (b) determining the exponential of the product.

At block 1605, the method 1600 can continue by outputting accumulated EVS pixel data. For example, during an accumulation period for EVS pixels, EVS pixel data can be captured by the EVS pixels, read out, and accumulated at blocks 1602-1604 of the method 1600 of FIG. 16. In turn, at block 1605, the method 1600 can output accumulated EVS pixel data to an EVS frame buffer of a downstream application processor. For example, the running sums of events stored in the integration buffer and/or the exponential of the product for each pixel can be output to the downstream application processor and/or loaded into the EVS frame buffer at timings corresponding to when the the running sums are stored in the integration buffer and/or when the exponentials are computed. As another example, the running sums and/or the exponentials can be output to the downstream application processor and/or loaded into the EVS frame buffer at specified timings, such as at ends of corresponding accumulation periods, at starts of corresponding exposure periods, at interpolation frame timing points, etc. The running sums and/or the exponentials can be output to the downstream application processor and/or loaded into the EVS frame buffer row by row. Additionally, or alternatively, loading of (a) the running sums (e.g., stored in the integration buffer) and/or (b) the exponentials (e.g., output from the exponential computation block) into the application processor and/or a corresponding EVS frame buffer can be gated or otherwise controlled via a trigger and a corresponding switch, as discussed above (e.g., with reference to FIG. 14) and in greater detail below.

Additionally, or alternatively, outputting the accumulated EVS pixel data at block 1605 can include outputting all or a subset of the accumulated EVS pixel data to a latent frame computation block of a deblur circuit, such as to perform rolling-shutter-distortion correction of corresponding CIS pixel data. In these and other embodiments, outputting the accumulated EVS pixel data can include outputting the accumulated EVS pixel data from one or more EVS frame buffers to a video frame interpolation block (e.g., of an application processor), such as at a timing corresponding to when CIS key frames are output to the video frame interpolation block. In some embodiments, the accumulated EVS pixel data can be output at block 1605 from the EDI integration buffer(s), the RSDC buffer(s), the exponential computation block, and/or the EVS frame buffers as part of a row-by-row readout of the accumulated EVS pixel data that occurs before a start of CIS integration (as shown by arrow 1705 in FIG. 17A).

As a specific example, referring again to FIG. 17A, all EVS pixel data (i) captured by EVS pixels of EVS row N+2, (ii) read out, and (iii) accumulated during the EVS accumulation period extending roughly between time $t_{-4}$ and $t_1$, can be stored to an EVS integration buffer, output to an EVS frame buffer, and/or provided to a video frame interpolation computation block of an application processor. Additionally, or alternatively, EVS pixel data captured by EVS pixels of EVS row $N+_2$ between time t0 (corresponding to the start of the image frame) and time t1 can be stored to an RSDC integration buffer and output to a latent frame computation block of a corresponding deblur circuit to enable the latent frame computation block to perform rolling-shutter distortion correction on CIS pixel data that is captured during a subsequent integration period (extending between time t2 and time t9) by CIS pixels that correspond to the EVS pixels of EVS row N+2. Additional details on rolling shutter distortion correction are provided in the cofiled, copending, and coassigned application titled “HYBRID IMAGE SENSORS WITH ON-CHIP IMAGE DEBLUR AND ROLLING SHUTTER DISTORTION CORRECTION,” which has been incorporated by reference herein in its entirety above.

At blocks 1606-1613, the method 1600 continues by aligning CIS pixel data and EVS pixel data at a row-by-row level (block 1606); capturing CIS pixel data during corresponding exposure/integration periods and capturing EVS pixel data during corresponding accumulation periods aligned with the exposure/integration periods (block 1607); reading out the EVS pixel data from the EVS pixels (block 1608), accumulating the EVS pixel data, such as (i) using a deblur circuit and/or (ii) in one or more EVS integration buffers (e.g., of a hybrid image sensor) and/or an EVS frame buffer (e.g., of a downstream application processor) (block 1609); reading out the CIS pixel data at ends of the integration periods (block 1610); deblurring the CIS pixel data using the accumulated EVS pixel data to generate a latent image frame L(s) (block 1611); correcting the CIS pixel data for rolling-shutter distortion using all or a subset of the EVS pixel data accumulated between a start of the image frame and starts of corresponding integration periods to generate a latent image frame L(0) (block 1612); and outputting the latent image frame L(s) and/or the latent image frame L(0) to (e.g., a CIS key frame buffer) of an application processor and/or to an image signal processor (block 1613). Blocks 1606-1611 can be identical or at least generally similar to blocks 1001-1006 of the method 1000 of FIG. 10 and blocks 1401-1406 of the method 1400 of FIG. 14 described above. Therefore, a detailed discussion of blocks 1606-1611 is largely omitted here for the sake of brevity.

Correcting the CIS data for rolling shutter distortion at block 1612 of the method 1600 can include correcting the CIS data for rolling shutter distortion using accumulated EVS data stored in corresponding portions of RSDC integration buffers at block 1604. More specifically, accumulated EVS data stored in an RSDC integration buffer of a deblur circuit between a start time t0 of the image frame and a start of a corresponding exposure period for the CIS pixels that are aligned with integration periods of the image frame, can be multiplied by a contrast threshold. In turn, the deblur circuit can determine an exponential of the product of the accumulated EVS data with the contrast threshold, and can output the exponential to a latent frame computation block of the deblur circuit. Thereafter, the exponential can be used to correct the CIS data (e.g., the CIS data captured by the CIS pixels at block 1607 and/or the deblurred CIS data from block 1611) for rolling shutter distortion, such as using Equation 20 above to determine a corresponding latent image frame L(0).

Outputting the deblurred and/or rolling-shutter-distortion-corrected image data at block 1613 of the method 1600 can include outputting one or more latent image frames (e.g., a latent image frame L(s) and/or a latent image frame L(0)) computed at block 1611 and/or block 1612, such as in addition to or in lieu of outputting raw CIS data that is read out from the CIS pixels at block 1610 and/or raw EVS data that is generated and read out from EVS pixels at blocks 1607 and 1608. Outputting the deblurred and/or rolling-shutter-distortion-corrected image data can include outputting the deblurred image data from an image sensor to a downstream application processor. As a specific example, outputting the deblurred and/or rolling-shutter-distortion-corrected image data can include outputting the deblurred and/or rolling-shutter-distortion-corrected image data to a CIS key frame buffer and/or a video frame interpolation computation block of the downstream application processor. In some embodiments, a trigger and a corresponding switch can be used to gate or control loading of the deblurred and/or rolling-shutter-distortion-corrected image data into the CIS key frame buffer. Additionally, or alternatively, outputting the deblurred and/or rolling-shutter-distortion-corrected image data can include outputting the deblurred and/or rolling-shutter-distortion-corrected image data to an image signal processor, such as for previewing the deblurred and/or rolling-shutter-distortion-corrected image data.

Referring again to block 1607, the method 1600 can proceed from block 1607 to block 1614 to output accumulated EVS pixel data. For example, during an accumulation period for EVS pixels, EVS pixel data can be captured by the EVS pixels, read out, and accumulated at blocks 1607-1609 of the method 1600 of FIG. 16. In turn, at block 1614, the method 1600 can output accumulated EVS pixel data to an EVS frame buffer of a downstream application processor. For example, running sums of events and/or exponentials of the running sums multiplied by a contrast threshold can be output to the downstream application processor and/or loaded into the EVS frame buffer at timings corresponding to when the running sums are stored in the first integration buffer and/or when the exponentials are computed. As another example, the running sums and/or the exponentials can be output to the downstream application processor and/or loaded into the EVS frame buffer at specified timings, such as at interpolation frame timing points. The running sums and/or the exponentials can be output to the downstream application processor and/or loaded into the EVS frame buffer row by row. Additionally, or alternatively, loading of (a) the running sums (e.g., stored in the first integration buffer) and/or (b) the exponentials (e.g., output from the exponential computation block) into the application processor and/or a corresponding EVS frame buffer can be gated or otherwise controlled via a trigger and a corresponding switch, as discussed above with reference to FIG. 14 and in greater detail below.

After (i) loading accumulated EVS pixel data corresponding to the interpolation frame time into the EVS frame buffer of the downstream application processor at block 1614 and (ii) accumulating event data at blocks 1607-1609 through an end of an accumulation period that aligns with an exposure period for corresponding CIS pixels, the method 1600 (at block 1614) can output the accumulated EVS pixel data from the EVS frame buffer to a video frame interpolation computation block (e.g., of an application processor). For example, accumulated EVS pixel data stored in the EVS frame buffer and corresponding to the interpolation frame time can be output to the video frame interpolation computation block at a timing corresponding to when deblurred image data is (a) output from a deblur circuit to a CIS key frame buffer (e.g., of the application processor) and/or (b) provided to the video frame interpolation computation block.

As a specific example, referring to FIGS. 16 and 17A together, at block 1606 of the method 1600, EVS pixels of EVS row N, corresponding portions of EVS integration buffers (e.g., of a deblur circuit of a hybrid image sensor), and/or corresponding portions of EVS frame buffers and/or CIS key frame buffers (e.g., of a downstream application processor) can be reset at a same time as corresponding CIS pixels and within a time period 1793 extending between $t_{-1}$ and time $t_0$. Resetting the EVS pixels of EVS row N and corresponding CIS pixels at the same timing can align a CIS integration period 1797 for the CIS pixels with an accumulation period 1798 for the EVS pixels of EVS row N. At time $t_0$ in FIG. 17A, the method 1600 can proceed at block 1607 with capturing CIS pixel data during the integration period 1797 and capturing corresponding EVS pixel data during the accumulation period 1798. At blocks 1608 and 1609 of the method 1600, the EVS pixel data can be read out, accumulated, and stored in one or more EVS integration buffers (e.g., an EDI integration buffer of the deblur circuit of the hybrid image sensor).

At block 1614, EVS pixel data captured by EVS pixels of EVS row N and accumulated between time t0 and time t5 can be output and stored in an EVS frame buffer (e.g., of the application processor), such as (a) by streaming the accumulated EVS pixel data to the EVS frame buffer between time t0 and time t5 or (b) reading out the accumulated EVS pixel data (e.g., row by row) to the EVS frame buffer at or after time t5. As discussed above, in some embodiments, a trigger and corresponding switch can be used to control when accumulated EVS pixel data is stored to the EVS frame buffer. For example, a trigger can be fired to selectively enable a switch at time t0 (corresponding to a start of the exposure period 1797 for CIS pixels corresponding to the EVS pixels of EVS row N) such that accumulated EVS pixel data can be streamed from the first integration buffer or the exponential computation block into the EVS frame buffer. Then, at time t5 (corresponding to the interpolation frame timing point for EVS pixel row N in FIG. 17A), the trigger can disable the switch such that accumulated EVS pixel data stored to the first integration buffer or output from the exponential computation block after time t5 (e.g., between (i) time t5 and (ii) time t7 or t8) is not loaded into the EVS frame buffer. As another example, a trigger can be fired at time t5 (corresponding to the interpolation frame timing point for EVS pixel row N in FIG. 17A) to read out, row by row, accumulated EVS pixel data stored in the first integration buffer and/or output from the exponential computation block into the EVS frame buffer.

As shown in FIG. 17A, for EVS row N, an interpolation frame timing point occurs at time t5 and partway through the accumulation period 1798. Thus, the interpolation frame timing point for EVS row N occurs at a timing that is in the middle of the integration period 1797 for corresponding CIS pixels. Indeed, the integration period for the corresponding pixels extends from time t0 to time t7, and can cover the entire frame time (e.g., in low lighting conditions). As such, accumulated EVS pixel data in the first integration buffer and/or output from the exponential computation block can be output and stored to an EVS frame buffer (e.g., of a downstream application processor) at a timing that occurs before CIS pixel data captured by corresponding CIS pixels is read out from the corresponding CIS pixels. In other embodiments, such as in bright lighting conditions, the integration period 1797 for the corresponding pixels can extend from time t0 to a time occurring before time t7 such that the integration period 1797 covers less than the entire frame time. In some such embodiments, accumulated EVS pixel data in the first integration buffer and/or output from the exponential computation block can be output and stored to an EVS frame buffer (e.g., of a downstream application processor) at a same timing as, or at a timing that occurs after, the time at which CIS pixel data captured by corresponding CIS pixels is read out from the corresponding CIS pixels.

Referring back to FIG. 16, at block 1615, the method 1600 can proceed with computing an interpolated video/image frame based (a) on the EVS pixel data accumulated at block 1604 and output at block 1605, (b) on the EVS pixel data accumulated at block 1609 and output at block 1614 and (c) on a latent image frame L(s) and/or a latent image frame L(0) that is/are computed at blocks 1611 and 1612, respectively, and output at block 1613. For example, referring to FIG. 17A, computing the interpolated video/image frame can include computing the interpolated image frame as a latent image frame L(t5) using (i) the accumulated EVS pixel data output at block 1605, (ii) the accumulated EVS pixel data output at block 1614, (iii) the latent image frame L(0) output at block 1613, and (iv) Equation 21 above.

Although blocks 1601-1615 of the method 1600 are described and illustrated in a particular order, the method 1600 of FIG. 16 is not so limited. In other embodiments, all or a subset of one or more of the blocks 1601-1615 of the method 1600 can be performed in a different order. In these and other embodiments, all or a subset of any of the blocks 1601-1615 can be performed before, during, and/or after all or a subset of any of the other blocks 1601-1615. Furthermore, a person skilled in the art will readily appreciate that the method 1600 can be altered and still remain within these and other embodiments of the present technology. For example, all or a subset of one or more of the blocks 1601-1615 can be omitted and/or repeated in some embodiments.

Figure 17B:
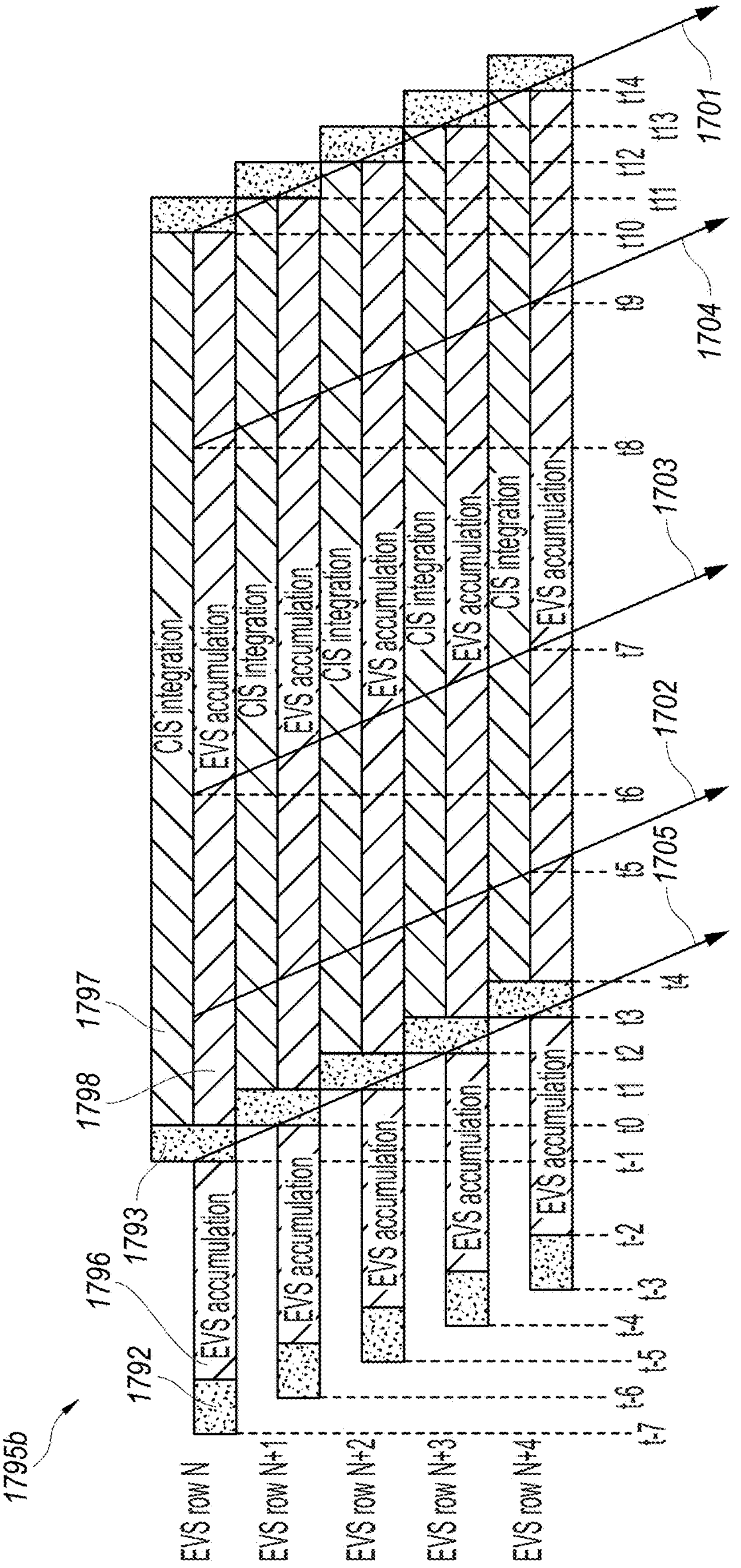

As a specific example, blocks 1605, 1614, and/or 1615 can be repeated to generate more than one interpolated video/image frame. For example, FIG. 17B illustrates a timing diagram 1795*b* that is generally similar to the timing diagram 1795*a* of FIG. 17A. As shown in FIG. 17B, accumulated EVS pixel data can be output at block 1605 of the method 1600 at times corresponding to the arrow 1705 shown in the timing diagram 1795*b*. For example, for EVS row N, EVS pixel data accumulated between roughly time t−6 and time t−1 (corresponding to arrow 1705) can be loaded into an EVS frame buffer at block 1605 of the method 1600. In addition, accumulated EVS pixel data can be output at block 1614 at multiple different times throughout the illustrated integration periods, as shown by arrows 1702-1704. For example, for EVS row N, EVS pixel data accumulated between time t0 and time t3 (corresponding to arrow 1702) can be loaded into the EVS frame buffer in a first instance of block 1614, EVS pixel data accumulated between time t0 and time t6 (corresponding to arrow 1703) can be loaded into the EVS frame buffer in a second instance of block 1614, and EVS pixel data accumulated between time t0 and time t8 (corresponding to arrow 1704) can be loaded into the EVS frame buffer in a third instance of block 1614. The accumulated EVS pixel data corresponding to each of arrows 1702-1704 can be (a) stored in different EVS frame buffers (e.g., of an application processor) and/or (b) provided to a video frame interpolation computation block and used to compute three interpolated video/image frames at block 1615 of the method 1600 of FIG. 16. The accumulated EVS pixel data corresponding to the arrow 1705 can be (a) loaded into all or a subset of the different EVS frame buffers and/or (b) provided to the video frame interpolation computation block and used to compute the three interpolated video/image frames at block 1615. In some embodiments, loading of accumulated EVS pixel data into each of the different EVS frame buffers can be gated, such as using one or more triggers and one or more corresponding switches (as discussed in greater detail below).

As another specific example, resetting the EVS pixels, corresponding portions of EVS integration buffers, corresponding portions of RSDC integration buffers, and/or corresponding portions of EVS frame buffers can be omitted from block 1606 of the method 1600 in some embodiments. For example, for each EVS pixel row, the EVS pixels can continuously be enabled to detect events occurring in the external scene between the start of the corresponding accumulation period preceding the integration period (e.g., the integration period 1797 of FIG. 17A) for corresponding CIS pixels and an end of the integration period. Referring to EVS row N of FIG. 17A for the sake of example and clarity, the EVS pixels of EVS row N can remain enabled to capture EVS pixel data for the entire duration of time between that start of the accumulation period 1796 and time t7 corresponding to the end of the integration period 1797, and without being disabled or reset during the time period 1793. This can reduce the likelihood of EVS data that occurs during the time period 1793 going undetected by the EVS pixels of EVS row N.

As still another example, although interpolated image frames are described above with reference to FIGS. 16-17B as being latent image frames that each correspond to times that occur within (or during) the CIS integration periods for corresponding CIS pixels, the method 1600 is not so limited. For example, at block 1615, the method 1600 can compute one or more latent image frames that correspond to one or more times that occur before the CIS integration periods for the corresponding CIS pixels. Additionally, or alternatively, at block 1615, the method 1600 can compute one or more latent image frames that correspond to one or more times that occur after the CIS integration periods for the corresponding pixels. In such embodiments, EVS pixels can be enabled to capture EVS pixel data at times occurring after the ends of the integration periods such that EVS pixel data can be accumulated and provided to a video frame interpolation computation block to compute corresponding interpolated video/image frames.

Figure 18:
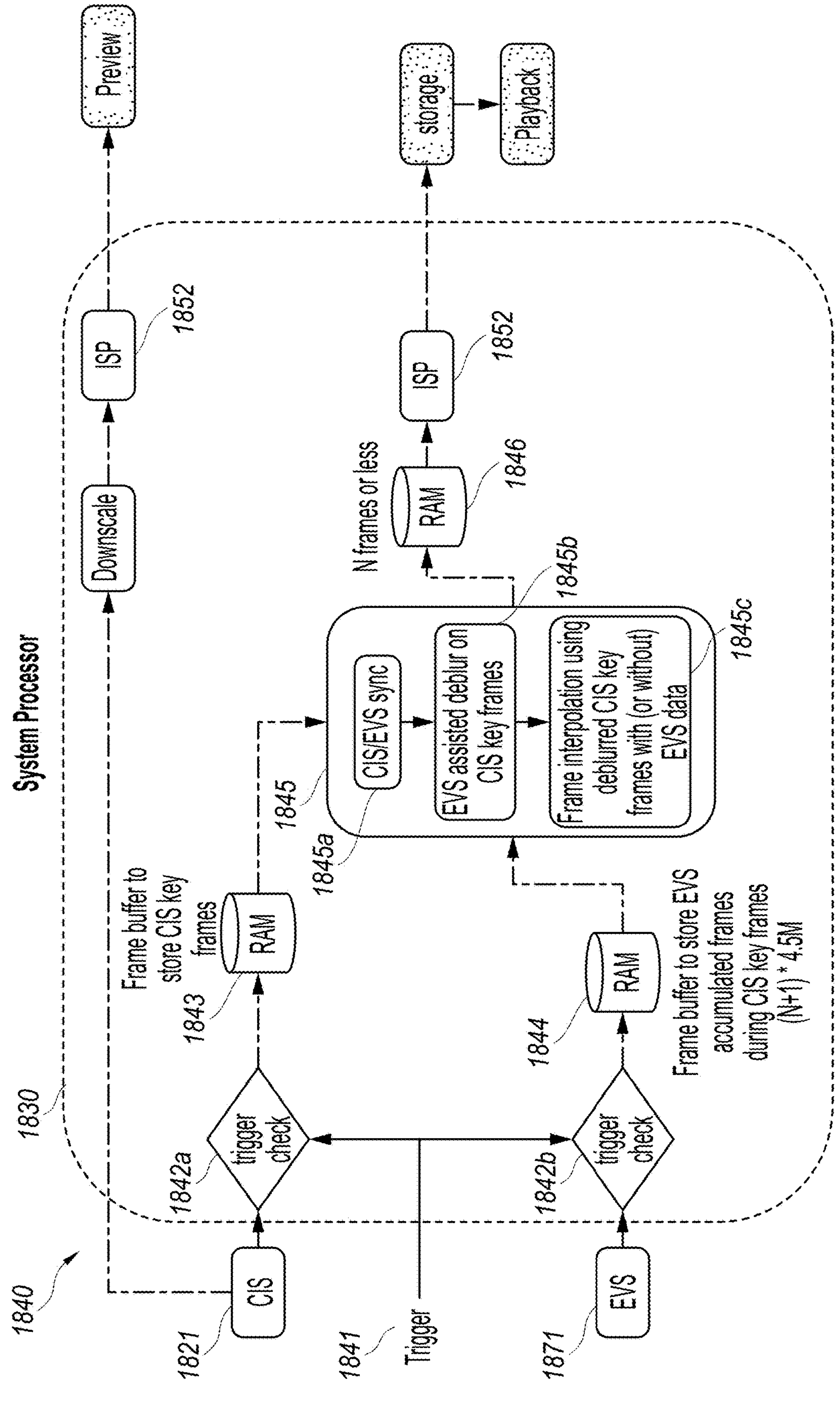
FIG. 18 is a partially schematic diagram illustrating an imaging system configured in accordance with various embodiments of the present technology.

FIG. 18 is a partially schematic diagram illustrating an imaging system 1840 configured in accordance with various embodiments of the present technology. As shown, the imaging system 1840 includes a system processor 1830, such as an application processor. The system processor 1830 includes a first frame buffer 1843, a second frame buffer 1844, a third frame buffer 1846, a video frame interpolation computation block 1845, and image signal processor (ISP) components 1852. The first frame buffer 1843 is configured to store one or more key frames of CIS data 1821. The CIS key frames can include raw CIS data captured by, for example, CIS pixels of an upstream hybrid image sensor (not shown) that is coupled to the system processor 1830. Additionally, or alternatively, the CIS key frames can include one or more latent image frames (e.g., a latent image frame L(s) including deblurred CIS data and/or a latent image frame L(0) including deblurred and rolling-shutter-distortion-corrected CIS data), such as output to the system processor 1830 by a deblur circuit (not shown) of an upstream hybrid image sensor (not shown). The second frame buffer 1844 can be configured to store one or more frames of accumulated EVS data 1871. The accumulated EVS data can include EVS data accumulated before, during, and/or after integration/exposure periods corresponding to the CIS key frames.

The video frame interpolation computation block 1845 can include a CIS/EVS synchronization block 1845*a*, an event-guided deblur block 1845*b*, and/or a video frame interpolation block 1845*c*. The CIS/EVS synchronization block 1845*a* can be configured to synchronize accumulated EVS data output from the second frame buffer 1844 with CIS key frames output from the first frame buffer 1843. After the accumulated EVS data is synchronized with the CIS key frames, the event-guided deblur block 1845*b* can be configured to deblur the CIS key frames using all or a subset of the accumulated EVS data. Furthermore, the video frame interpolation block 1845*c* can be configured to compute one or more interpolated video/image frames based at least in part on the accumulated EVS data and the CIS data of the key frames. As discussed above, the interpolated video/image frames can include one or more latent images calculated based on, for example, a latent image L(s), a latent image L(0), and/or accumulated EVS data.

In at least some embodiments in which the accumulated EVS data is synchronized with the CIS key frames upstream (e.g., by resetting EVS pixels and corresponding CIS pixels at a same time), at least a portion of the CIS/EVS synchronization performed by the CIS/EVS synchronization block 1845*a* can be skipped or omitted. Additionally, or alternatively, in at least some embodiments in which the CIS key frames are deblurred upstream (e.g., by a hybrid image sensor coupled to the system processor 1830) using accumulated EVS data, at least a portion of the deblur process performed by the event-guided deblur block 1845*b* can be skipped or omitted.

The third frame buffer 1846 is configured to store N frames of CIS data output from the video frame interpolation computation block 1845, where N represents the interpolation ratio. Thus, when Nis four, the third frame buffer 1846 can be configured to store four frames of CIS data output from the video frame interpolation computation block 1845. In some embodiments, the four frames of CIS data can include at least one CIS key frame (e.g., a latent image L(s) and/or a latent image L(0)) and up to three interpolated video/image frames (e.g., three latent images L(t), such as corresponding to three different times). In other embodiments, the four frames of CIS data can include up four interpolated video/image frames (e.g., four latent images L(t), such as corresponding to four different times).

As shown in FIG. 18, CIS data 1821 (e.g., key frames of CIS data) can be downscaled (e.g., to reduce resolution) and provided to the ISP components 1852 for previewing. Additionally, or alternatively, frames output from the third frame buffer 1846 can be provided to the ISP components 1852 for storage and/or playback.

In the illustrated embodiment, the system processor 1830 further includes a first trigger check block 1842*a* and a second trigger check block 1842*b* that are each responsive to a trigger 1841. In some embodiments, the trigger 1841 can used to control when CIS data 1821 and EVS data 1871 are provided to and/or loaded in the first frame buffer 1843 and the second frame buffer 1844, respectively. For example, a preprocessor (not shown) can perform data analysis, such as on EVS data captured by EVS pixels of an upstream hybrid image sensor (not shown), to identify when motion has occurred within an external scene. In response to identifying motion in the external scene, the trigger 1841 can enable the first trigger check block 1842*a* (e.g., a first switch or a first multiplexer) and the second trigger check block 1842*b* (e.g., a second switch or a second multiplexer) to pass CIS data 1821 to the first frame buffer 1843 and EVS data 1822 to the second frame buffer 1844, respectively.

As another example, the trigger 1481 can be fired or activated at specified timings. For example, the trigger 1481 can be fired to selectively enable the first trigger check block 1842*a* at a timing corresponding to when a corresponding deblur circuit outputs deblurred image data (e.g., a latent image frame L(s)) and/or deblurred and rolling-shutter-distortion-corrected image data (e.g., a latent image frame L(0)) to the system processor 1830 for storage in the first frame buffer 1843. Additionally, or alternatively, the trigger 1481 can be fired to selectively enable the second trigger check block 1842*b* at timings corresponding to when accumulated EVS pixel data used in video frame interpolation computations should be loaded into the second frame buffer 1844, such as at starts of exposure periods, ends of exposure periods, starts of integration periods, ends of integration periods, ends of reset periods, interpolation frame timings, etc. In other words, the trigger 1841 and the corresponding first trigger check block 1842*a* and second trigger check block 1842*b* can be used to selectively enable loading of CIS data and EVS data into the first frame buffer 1843 and the second frame buffer 1844, respectively, at given times and/or for given periods of time.

Figure 19:
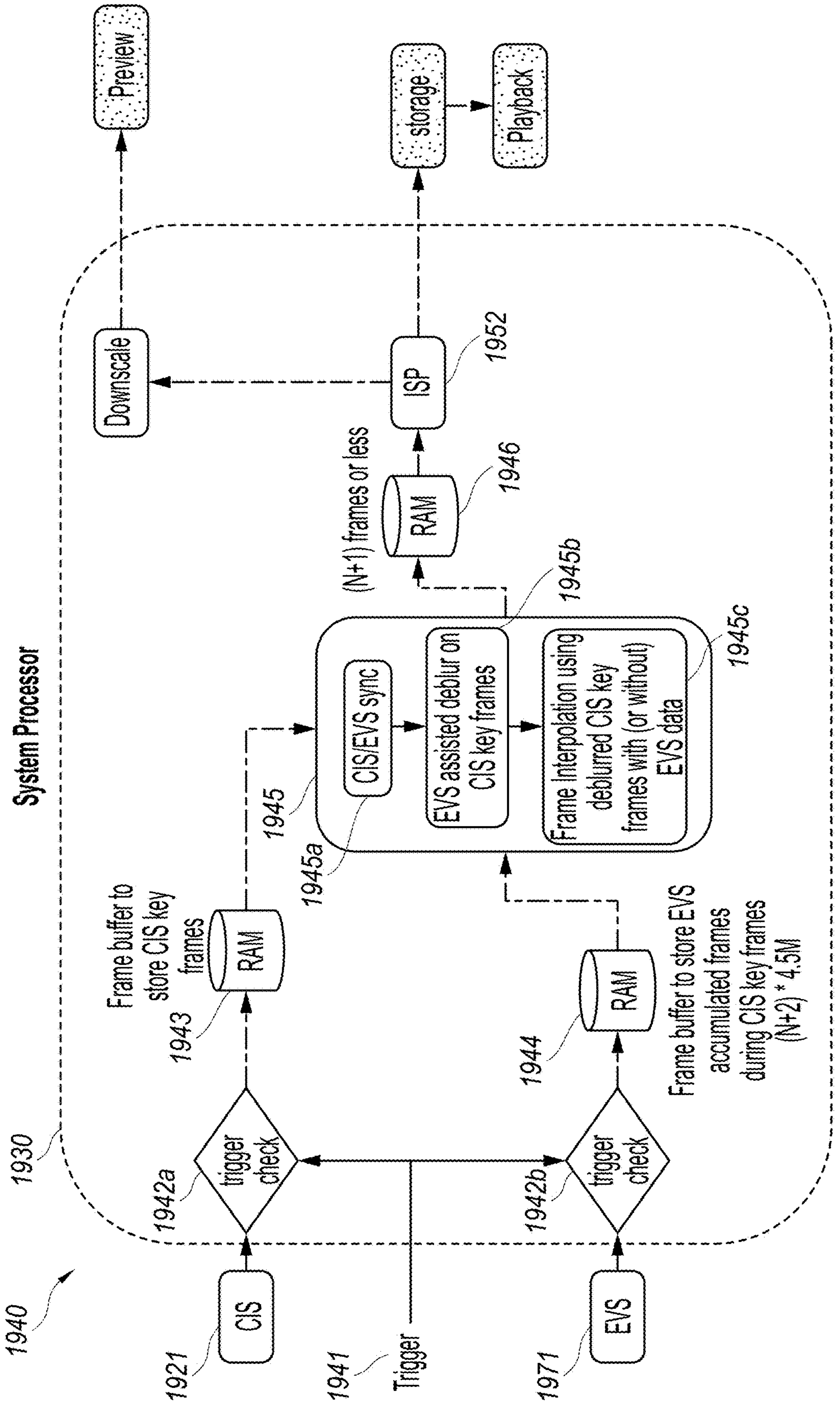
FIG. 19 is a partially schematic diagram illustrating another imaging system configured in accordance with various embodiments of the present technology.

FIG. 19 is a partially schematic diagram illustrating an imaging system 1940 configured in accordance with various embodiments of the present technology. As shown, the imaging system 1940 includes a system processor 1930, such as an application processor. The system processor 1930 includes several components generally similar to select components of the system processor 1830 of the imaging system 1840 of FIG. 18. For example, the system processor 1930 includes a first frame buffer 1943, a second frame buffer 1944, a third frame buffer 1946, a video frame interpolation computation block 1945, image signal processor (ISP) components 1952, and a first trigger check block 1942*a* and a second trigger check block 1942*b* responsive to a trigger 1941. Thus, a detailed description of each of these components of the imaging system 1940 is largely omitted here for the sake of brevity in light of the detailed description of the generally similar components of the imaging system 1840 described above with reference to FIG. 18.

As shown in FIG. 19, the imaging system 1940 has a slightly different configuration than the imaging system 1840 of FIG. 18. For example, the third frame buffer 1946 is configured to store N+1 frames of image data (as opposed to N frames of image data storable in the third frame buffer 1846 of FIG. 18), where N is the interpolation ratio. In addition, frames output from the third frame buffer 1946 to the ISP components 1952 can be downscaled and previewed. By comparison, in the imaging system 1840 of FIG. 18, CIS data 1821 can be downscaled before being provided to the ISP components 1852 as it is input into the imaging system 1840 (e.g., before being stored in the first frame buffer 1843 and/or the third frame buffer 1846, and before being processed by the video frame interpolation computation block 1845). In some embodiments, the arrangement of the imaging system 1940 illustrated in FIG. 19 can be employed when an input frame rate (e.g., 7.5 fps) is less than the display frame rate of the preview functionality. In these and other embodiments, the arrangement of the imaging system 1840 illustrated in FIG. 18 can be employed when an input frame rate (e.g., 30 fps) is greater than or equal to the display frame rate of the preview functionality.

Figure 20:
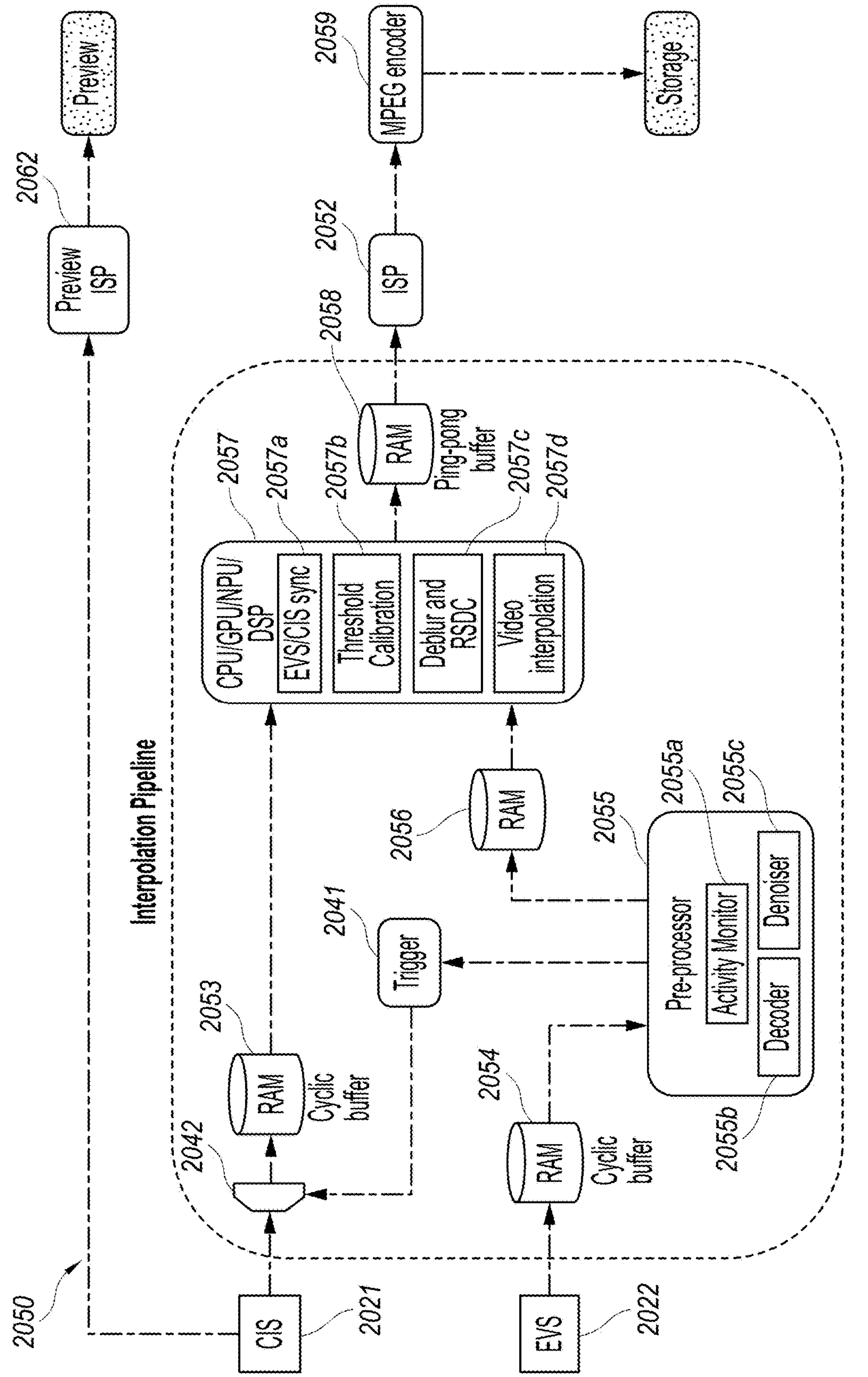
FIG. 20 is a partially schematic diagram illustrating a video frame interpolation pipeline configured in accordance with various embodiments of the present technology.

FIG. 20 is a video frame interpolation pipeline 2050 ("the VFI pipeline 2050") configured in accordance with various embodiments of the present technology. In some embodiments, the VFI pipeline 2050 can be a neural network processing unit. In these and other embodiments, the VFI pipeline 2050 can be used for generating interpolated video/image frames. For example, the VFI pipeline 2050 can be used to combine spatially-dense CIS image data with temporally-dense EVS data to generate slow-motion videos. The CIS image data can be captured using an active image sensor, and the EVS data can be captured using a separate event vision sensor. Alternatively, the CIS image data can be captured using CIS pixels of a hybrid image sensor, and the EVS data can be captured using EVS pixels of the hybrid image sensor.

As shown, CIS data 2021 can be input into the VFI pipeline 2050 via a multiplexer 2042 and stored in a first frame buffer 2053 (e.g., a cyclic buffer). As discussed in greater detail below, the multiplexer 2042 (or switch) is controllable using a trigger 2041 of the VFI pipeline 2050. Additionally, or alternatively, the CIS data 2021 can be provided to a preview ISP 2062 for previewing the CIS data 2021. In some embodiments, the CIS data 2021 includes raw CIS data. In other embodiments, the CIS data 2021 includes deblurred and/or rolling-shutter-distortion-corrected CIS data, such as one or more latent image frame (e.g., a latent image frame L(s) and/or a latent image frame L(0). For example, an upstream deblur circuit (not shown), such as of an upstream hybrid image sensor (not shown) coupled to the VFI pipeline 2050, can be configured to deblur CIS data and/or correct CIS data for rolling shutter distortion and thereafter output the CIS data 2021 to the VFI pipeline 2050.

EVS data 2022 can be input into the VFI pipeline 2050 and stored to a second frame buffer 2054 (e.g., a cyclic buffer). The EVS data 2022 can include raw EVS data. Additionally, or alternatively, the EVS data 2022 can include accumulated EVS data accumulated by (e.g., a deblur circuit of) a upstream hybrid image sensor (not shown).

EVS data 2022 stored to the second frame buffer 2054 can be output to a pre-processor block 2055 configured to pre-process events in the EVS data 2022 for further processing in the VFI pipeline 2050. As shown, the pre-processor block 2055 includes an activity monitor block

2055*a*, a decoder block 2055*b*, and a denoiser block 2055*c*. The denoiser block 2055*c* can be configured to denoise the EVS data 2022, and the decoder block 2055*b* can be configured to decode the EVS data 2022 for interpretation by the activity monitor block 2055*a* and/or other components of the VFI pipeline 2050. In embodiments in which events in the EVS data 2022 are not encoded, the decoder block 2055*b* can be omitted. The activity monitor block 2055*a* is configured to analyze the EVS data to identify motion in an external scene. When motion is identified by the activity monitor block 2055*a* in the EVS data 2022, the pre-processor block 2055 can activate the trigger 2041 to enable the multiplexer 2042 to allow CIS data 2021 to pass to the first frame buffer 2053. The CIS data 2021 and the EVS data 2022 can be buffered in the first frame buffer 2053 and a third frame buffer 2056, respectively, for synchronization.

In some embodiments, the trigger 2041 can be automatically triggered when motion is identified the external scene. In these and other embodiments, the trigger 2041 can be manually triggered, such as in response to motion being identified in the external scene and/or independent of motion identified in the external scene. In these and still other embodiments, the trigger 2041 can be triggered based on a timer (e.g., after a preset duration has elapsed), such as in response to motion being identified in the external scene and/or independent of motion identified in the external scene.

As another example, the trigger 2041 can be fired or activated at specified timings. For example, the trigger 2041 can be fired to selectively enable the multiplexer 2042 at a timing corresponding to when a corresponding deblur circuit outputs deblurred image data (e.g., a latent image frame L(s)) and/or deblurred and rolling-shutter-distortion-corrected image data (e.g., a latent image frame L(0)) to the processor(s) 2057 for storage in the first frame buffer 2053. Additionally, or alternatively, pre-processor block 2055 can be used to gate or control when EVS data and/or accumulated EVS data stored in the second frame buffer 2054 is loaded into the third frame buffer 2056, such as at starts of exposure periods, ends of exposure periods, starts of integration periods, ends of integration periods, ends of reset periods, interpolation frame timings, etc. In other words, the trigger 2041, the multiplexer 2042, and/or the pre-processor block 2055 can be used to selectively enable loading of CIS data and EVS data into the first frame buffer 2053 and the third frame buffer 2056, respectively, at given times and/or for given periods of time.

CIS data 2021 stored in the first frame buffer 2053 and EVS data 2022 pre-processed by the pre-processor block 2055 and stored to the third frame buffer 2056 can be output to one or more processors 2057 (e.g., one or more CPUs, GPUs, NPUs, and/or DSPs) of the VFI pipeline 2050. As shown, the processor(s) 2057 include an EVS/CIS synchronization block 2057*a*, a threshold calibration block 2057*b*, a deblurring and/or rolling-shutter-distortion-correction block 2057*c*, and/or a video frame interpolation block 2057*d*. The EVS/CIS synchronization block 2057*a* can be configured to synchronize CIS data 2021 output from the first frame buffer 2053 with corresponding EVS data 2022 output from the third frame buffer 2056. The threshold calibration block 2057*b* is configured to calibrate a contrast threshold. Additional details on adjusting or calibrating a contrast threshold are provided in the cofiled, copending, and coassigned application titled "HYBRID IMAGE SENSORS WITH ADJUSTABLE CONTRAST THRESHOLDS," which has been incorporated by reference herein above. The rolling-shutter-distortion-correction block 2057*c* is configured to use the EVS data 2022 to deblur the CIS data 2021 and/or correct the CIS data 2021 for rolling-shutter distortion, such as to generate a latent image frame L(s) and/or a latent image frame L(0). The video frame interpolation block 2057*d* is configured to interpolate one or more additional video/image frames using the deblurred and/or rolling-shutter-distortion-corrected CIS data 2021 and all or a subset of the EVS data 2022. As discussed above, the interpolated video/image frames can be used to generate slow-motion videos.

Interpolated video/images frames can be output from the processor(s) 2057 (e.g., from the video frame interpolation block 2057*d*) to a fourth frame buffer 2058. In some embodiments, the fourth frame buffer 2058 can be a ping-pong buffer that enables reading out one interpolated video/image frame to ISP components 2052 while another video/image frame is being interpolated. The ISP components 2052 can be configured to output interpolated video/image frames to an MPEG encoder, which in turn can be configured to provide encoded, interpolated video/image frames to memory for storage.

The VFI pipeline 2050 can include or be embodied by various components of an imaging system. In some embodiments, the VFI pipeline 2050 can be embodied by an image sensor, such as a hybrid image sensor that includes a deblur circuit. In such embodiments, the image sensor can include on-chip deblur capabilities, on-chip rolling-shutter-distortion-correction capabilities, on-chip contrast threshold calibration capabilities, and/or on-chip video frame interpolation capabilities. In other embodiments, the VFI pipeline 2050 can be embodied by an off-chip processor, such as an application processor positioned downstream from one or more images sensors. In such embodiments, the imaging system can include off-chip deblur capabilities, off-chip rolling-shutter-distortion-correction capabilities, off-chip contrast threshold calibration capabilities, and/or off-chip video frame interpolation capabilities. In still other embodiments, the VFI pipeline 2050 can be embodied in part by one or more image sensors (e.g., a hybrid image sensor) and in part by an off-chip processor (e.g., an application processor downstream from the hybrid image sensor). In such embodiments, all or a subset of the deblur processes, all or a subset of the rolling-shutter-distortion-correction processes, all or a subset of the contrast threshold calibration processes, and/or all or a subset of the video frame interpolation processes can be performed on-chip while all or a subset of the deblur processes, all or a subset of the rolling-shutter-distortion-correction processes, all or a subset of the contrast threshold calibration processes, and/or all or a subset of the video frame interpolation processes can be performed off-chip.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An imaging system, comprising:

an event driven sensing array including one or more event vision sensor (EVS) pixels, wherein each EVS pixel of the one or more EVS pixels is configured to capture event data corresponding to contrast information of light incident on the EVS pixel;

a pixel array including a plurality of CMOS image sensor (CIS) pixels arranged in one or more CIS pixel rows, wherein each CIS pixel of the plurality of CIS pixels is configured to capture CIS data corresponding to intensity of light incident on the CIS pixel;

a deblur circuit configured to deblur the CIS data captured by the plurality of CIS pixels using a first portion of the event data captured by the one or more EVS pixels; and a system processor configured to interpolate a video frame using the deblurred CIS data and all or a subset of the event data.

2. The imaging system of claim 1, wherein the deblur circuit is configured to (a) accumulate the event data, (b) deblur the CIS data using accumulated event data corresponding to the first portion of event data, and (c) output accumulated event data corresponding to a second portion of the event data to the system processor.

3. The imaging system of claim 2, wherein the accumulated event data corresponding to the second portion of the event data includes an exponential of a product of (a) a running sum of the second portion of the event data and (b) a contrast threshold.

4. The imaging system of claim 2, wherein each CIS pixel of the plurality of CIS pixels is configured to capture the CIS data during an integration period, wherein the deblur circuit is configured to accumulate the second portion of the event data during the integration period, and wherein the deblur circuit is further configured to output the accumulated event data corresponding to the second portion of the event data to the system processor at an interpolation frame timing point that occurs during the integration period.

5. The imaging system of claim 2, wherein each CIS pixel of the plurality of CIS pixels is configured to capture the CIS data during an integration period, wherein the deblur circuit is configured to accumulate the second portion of the event data during an accumulation period preceding the integration period, and wherein the deblur circuit is further configured to output the accumulated event data corresponding to the second portion of the event data to the system processor prior to a start of the integration period.

6. The imaging system of claim 2, wherein each CIS pixel of the plurality of CIS pixels is configured to capture the CIS data during an integration period, wherein the deblur circuit is configured to accumulate the second portion of the event data during a period of time following an end of the integration period, and wherein the deblur circuit is configured to output the accumulated event data corresponding to the second portion of the event data to the system processor at an interpolation frame timing point that occurs after the end of the integration period.

7. The imaging system of claim 1, wherein each CIS pixel of the plurality of CIS pixels is configured to capture the CIS data during an integration period, and wherein the deblur circuit is further configured to correct the CIS data for rolling shutter distortion using a second portion of the event data accumulated by the deblur circuit prior to a start of the integration period.

8. The imaging system of claim 7, wherein all or the subset of the event data includes the second portion of the event data, and wherein the system processor is configured to interpolate the video frame further using the rolling-shutter-distortion-corrected CIS data.

9. The imaging system of claim 1, further comprising (i) a first frame buffer configured to store a key frame of the CIS data and (ii) a second frame buffer configured to store a frame of accumulated event data corresponding to the key frame of CIS data.

10. The imaging system of claim 9, further comprising (i) a first switch and (ii) a trigger usable to control the first switch to selectively enable the first frame buffer to receive the key frame of the CIS data.

11. The imaging system of claim 10, further comprising a second switch, wherein the trigger is further usable to control the second switch to selectively enable the second frame buffer to receive the frame of accumulated event data.

12. The imaging system of claim 10, further comprising a pre-processor block configured to (a) analyze accumulated event data output from the second frame buffer to identify motion in an external scene, and (b) control the trigger to selectively enable the first switch based at least in part on identification of the motion in the external scene.

13. The imaging system of claim 12, wherein the pre-processor block is further configured to decode the accumulated event data and/or denoise the accumulated event data.

14. The imaging system of claim 9, further comprising a third frame buffer configured to store the interpolated video frame output from the system processor.

15. The imaging system of claim 14, wherein the third frame buffer includes a ping-pong buffer.

16. The imaging system of claim 1, further comprising a hybrid image sensor including the event driven sensing array and the pixel array, wherein the system processor is external to the hybrid image sensor.

17. The imaging system of claim 16, wherein the hybrid image sensor includes the deblur circuit.

18. A method of operating an imaging system, the method comprising:

accumulating, during an integration period for CMOS image sensor (CIS) pixels of the imaging system, first event data captured using one or more event vision sensor (EVS) pixels of the imaging system that correspond to the CIS pixels;

outputting at least a portion of the accumulated first event data to an EVS frame buffer;

deblurring, using the accumulated first event data, CIS data captured by the CIS pixels during the integration period; and interpolating a video frame based at least in part on the deblurred CIS data and the portion of the accumulated first event data.

19. The method of claim 18, wherein accumulating the first event data includes accumulating the first event data during a first accumulation period, and wherein the method further comprises aligning the first accumulation period with the integration period such that the first accumulation period and the integration period start at a same time.

20. The method of claim 19, wherein aligning the first accumulation period and the integration period includes resetting the one or more EVS pixels and the CIS pixels at a same time and before accumulating the first event data.

21. The method of claim 18, wherein:

the method further comprises— accumulating second event data captured using the one or more EVS pixels during a period of time after an end of the integration period, and outputting, at an interpolation frame timing point occurring after the end of the integration period, at least a portion of the accumulated second event data, wherein interpolating the video frame includes interpolating the video frame based at least in part on the portion of the accumulated second event data.

22. The method of claim 21, further comprising resetting the one or more EVS pixels at the end of the integration period and before the period of time.

23. The method of claim 18, wherein outputting at least the portion of the accumulated first event data to the EVS frame buffer includes outputting at least the portion of the accumulated first event data to the EVS frame buffer at an interpolation frame timing point that occurs during the integration period.

24. The method of claim 18, wherein:

the method further comprises— accumulating second event data captured using the one or more EVS pixels during a period of time before a start of the integration period, and outputting at least a portion of the accumulated second event data to the EVS frame buffer at an end of the period of time and before the start of the integration period, wherein interpolating the video frame includes interpolating the video frame based at least in part on the portion of the accumulated second event data.

25. The method of claim 24, further comprising resetting the one or more EVS pixels and the EVS frame buffer before a start of the period of time.

26. The method of claim 18, further comprising decoding and/or denoising at least the portion of the accumulated first event data stored to the EVS frame buffer.

27. The method of claim 18, further comprising:

identifying motion in an external scene based on an analysis of at least the portion of the accumulated first event data stored to the EVS frame buffer; and activating a trigger of the imaging system such that at least a portion of the CIS data captured by the CIS pixels during the integration period is stored to a CIS frame buffer of the imaging system.

* * * * *